US011750727B2

(12) United States Patent
Kwak et al.

(10) Patent No.: US 11,750,727 B2
(45) Date of Patent: *Sep. 5, 2023

(54) ELECTRONIC DEVICE INCLUDING A PLURALITY OF DISPLAYS AND METHOD FOR OPERATING SAME

(71) Applicant: Samsung Electronics Co., Ltd., Suwon-si (KR)

(72) Inventors: Myunghoon Kwak, Suwon-si (KR); Minsoo Kim, Suwon-si (KR); Joungmin Cho, Suwon-si (KR); Sanghyuk Park, Suwon-si (KR); Kibeom Kim, Suwon-si (KR); Teayoung Kim, Suwon-si (KR); Hyunggwang Kang, Suwon-si (KR); Yangwook Kim, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

This patent is subject to a terminal disclaimer.

(21) Appl. No.: 17/311,223

(22) PCT Filed: Jun. 3, 2021

(86) PCT No.: PCT/KR2021/006948
§ 371 (c)(1),
(2) Date: Jun. 4, 2021

(87) PCT Pub. No.: WO2021/246802
PCT Pub. Date: Dec. 9, 2021

(65) Prior Publication Data
US 2022/0311846 A1 Sep. 29, 2022

(30) Foreign Application Priority Data
Jun. 5, 2020 (KR) .................. 10-2020-0068591
Dec. 29, 2020 (KR) .................. 10-2020-0186849

(51) Int. Cl.
H04M 1/02 (2006.01)
H04M 1/72469 (2021.01)

(52) U.S. Cl.
CPC ..... *H04M 1/0268* (2013.01); *H04M 1/72469* (2021.01)

(58) Field of Classification Search
CPC ............. G06F 3/0488; G06F 3/04883; G06F 3/04886; G06F 2203/04803;
(Continued)

(56) References Cited

U.S. PATENT DOCUMENTS

2006/0145942 A1 7/2006 Maatta
2010/0079696 A1* 4/2010 Hwu .................. G06F 1/1616
349/57
(Continued)

FOREIGN PATENT DOCUMENTS

CN 102123187 A 7/2011
KR 10-2009-0006606 A 1/2009
(Continued)

OTHER PUBLICATIONS

International Search Report dated Sep. 6, 2021, issued in International Application No. PCT/KR2021/006948.

*Primary Examiner* — Golam Sorowar
(74) *Attorney, Agent, or Firm* — Jefferson IP Law, LLP

(57) ABSTRACT

An electronic device is provided. The electronic device includes a housing, a first display slidable through the housing, a portion of the first display being exposed to an outside through the housing, a region of the first display being capable of being changed based on a sliding of the first display through the housing, a second display spaced apart from the exposed portion of the first display and forming a flat surface with the exposed portion of the first display, an optical member positioned on a portion of the second
(Continued)

housing associated with the exposed part of the first display; and at least one processor configured to output light through a first portion of the first display associated with the optical member, the light being diffused through the optical member.

19 Claims, 60 Drawing Sheets

(58) Field of Classification Search
CPC .............. G06F 3/04817; G06F 3/0482; G06F 3/04842; G06F 3/0486; G06F 3/0412; G06F 1/1626; G06F 2203/04808; G06F 1/1652; G06F 3/04845; G06F 2203/04102; G06F 3/04847; G06F 3/0485; G06F 2203/04101; G06F 3/0481; G06F 3/041; G06F 3/0416; G06F 1/1694; G06F 2203/04104; G06F 3/017; G06F 3/0487; G06F 3/0483; G06F 1/1643; H04M 2250/22; H04M 1/0268; H04M 2250/16; H04M 1/72469; H04M 1/72403; H04M 1/0266; H04M 1/724; H04M 1/72412; H04M 1/0214; H04M 1/185; H04M 1/72409; H04M 1/72484; H04M 1/7243; H04M 2250/12; H04M 2250/52; H04M 1/72454; H04M 1/725; H04M 2201/38; H04M 1/0216; H04M 1/0237; H04M 1/0241; H04M 1/0245; H04M 1/21; H04M 2250/64; H04M 1/0235; H04M 1/05; H04M 1/22; H04M 19/04
See application file for complete search history.

(56) References Cited

U.S. PATENT DOCUMENTS

| | | | |
|---|---|---|---|
| 2010/0182738 A1* | 7/2010 | Visser | G06F 1/1615 361/679.01 |
| 2011/0078272 A1 | 3/2011 | Tamai et al. | |
| 2015/0228704 A1* | 8/2015 | Miyake | H01L 51/0097 257/40 |
| 2016/0307545 A1* | 10/2016 | Lee | G09G 5/346 |
| 2018/0213071 A1* | 7/2018 | Bao | G06F 3/0428 |
| 2019/0012025 A1* | 1/2019 | Zhu | G06F 3/0418 |
| 2019/0310686 A1 | 10/2019 | Lee et al. | |
| 2020/0022268 A1* | 1/2020 | Zuo | G09G 5/14 |

FOREIGN PATENT DOCUMENTS

| | | |
|---|---|---|
| KR | 10-2010-0057531 A | 5/2010 |
| KR | 10-2010-0139153 A | 12/2010 |
| KR | 10-2016-0141255 A | 12/2016 |
| KR | 10-2019-0117985 A | 10/2019 |
| KR | 10-2020-0052679 A | 5/2020 |

* cited by examiner

ELECTRONIC DEVICE INCLUDING A PLURALITY OF DISPLAYS AND METHOD FOR OPERATING SAME

CROSS-REFERENCE TO RELATED APPLICATION(S)

This application is a U.S. National Stage application under 35 U.S.C. § 371 of an International application number PCT/KR2021/006948, filed on Jun. 3, 2021, which is based on and claims priority of a Korean patent application number 10-2020-0068591, filed on Jun. 5, 2020, in the Korean Intellectual Property Office, and of a Korean patent application number 10-2020-0186849, filed on Dec. 29, 2020, in the Korean Intellectual Property Office, the disclosure of each of which is incorporated by reference herein in its entirety.

BACKGROUND

1. Field

The disclosure relates to an electronic device including a plurality of displays for providing texts related to contents, and a method for operating the same.

2. Description of Related Art

Portable digital communication devices have become indispensable items to many people in modern times. Consumers want to receive various high-quality services as desired, at any time and space, by using portable digital communication devices.

Portable digital communication devices may be implemented to include a plurality of displays such that various services can be provided, and may make various services available according to the user's control (for example, the user's input) received on the plurality of displays. The region of portable digital communication devices is gradually increased by a plurality of displays employed by the portable digital communication devices of consumers.

Therefore, there is a need for a technology for implementing portable digital communication devices including a plurality of displays while having a compact structure.

The above information is presented as background information only to assist with an understanding of the disclosure. No determination has been made, and no assertion is made, as to whether any of the above might be applicable as prior art with regard to the disclosure.

SUMMARY

An electronic device may include a plurality of displays (for example, a first display and a second display). The plurality of displays may be disposed in different positions on the electronic device. Contents displayed on respective displays are not visually identified to be continuous because the plurality of displays are disposed in different positions, and this may degree the degree of use continuity when the plurality of displays are used by the user. In addition, the electronic device may not be able to perform operations by integrating user inputs received through the plurality of displays, and may only be able to perform operations corresponding user inputs received through the plurality of displays, respectively, thereby degrading the efficiency of using the plurality of displays. Moreover, the space formed between the plurality of displays may degrade the aesthetic appearance, and may allow foreign substances to infiltrate the electronic device, thereby damaging the same.

According to various embodiments, an electronic device is provided. The electronic device includes two displays (for example, a first display and a second display) disposed to define a single plane for the purpose of visual continuity, and may adjust the externally exposed region of one display (for example, the first display), thereby improving use convenience. In addition, according to various embodiments, an electronic device and a method for operating the same may perform operations by integrating user inputs received through the plurality of displays, respectively, thereby improving the use efficiency when the user uses the plurality of displays. In addition, according to various embodiments, a member (for example, an optical member) may be disposed in the space formed between the plurality of displays, thereby improving the aesthetic appearance, and preventing foreign substances from infiltrating the electronic device. Furthermore, at least one piece of information may be provided through the disposed member, thereby improving the convenience when using the electronic device.

Additional aspects will be set forth in part in the description which follows and, in part, will be apparent from the description, or may be learned by practice of the presented embodiments.

According to various embodiments, the electronic device may include: a housing; a first display configured to be slidable through the housing, wherein a portion of the first display is exposed to an outside through the housing, and wherein a region of the first display, exposed to the outside, is capable of being changed based on sliding of the first display through the housing; a second display spaced a certain distance apart from the exposed portion of the first display and disposed to form a flat surface with the exposed portion of the first display; and an optical member positioned on a portion of the second housing associated with the exposed at least part of the first display; at least one processor disposed in the housing, wherein the at least one processor is configured to: output a light through a first portion of the first display associated with the optical member, wherein the light is diffused through the optical member.

According to various embodiments, the electronic device may include: a housing; a first display configured to be slidable through the housing, wherein at least portion of the first display is exposed to an outside through the housing; and a second display having a length smaller than a length of the exposed portion of the first display; an optical member positioned on a portion of the second housing associated with the exposed at least part of the first display; and at least one processor disposed in the housing, wherein the at least one processor is configured to: output a light through a first portion of the first display associated with the optical member, wherein the light is diffused through the optical member.

According to various embodiments, the electronic device may include: a housing; a first display configured to be slidable through the housing, wherein at least portion of the first display is exposed to an outside through the housing; a second display spaced a certain distance apart from the exposed portion of the first display and disposed to form a flat surface with the exposed portion of the first display, a length of the second display being smaller than a length of the first display, a width of the second display corresponding to a width of the first display; an optical member positioned on a portion of the second housing associated with the exposed at least part of the first display; at least one processor disposed in the housing, wherein the at least one processor is configured to: output a light through a first portion of the first display associated with the optical member, wherein the light is diffused through the optical member.

Technical solutions according to various embodiments are not limited to the above-mentioned technical solutions, and other technical solutions not mentioned herein will be clearly understood by a person skilled in the art from the specification and the accompanying drawings.

Various embodiments are to address at least the above-mentioned problems and/or disadvantages and to provide at least the advantages described below.

According to various embodiments, an electronic device may be provided, the electronic device including two displays (for example, a first display and a second display) disposed to define a single plane for the purpose of visual continuity such that the externally exposed region of one display (for example, the first display) can be adjusted, thereby improving use convenience.

According to various embodiments, an electronic device and a method for operating the same may be provided, wherein operations are performed by integrating user inputs received through a plurality of displays, respectively, thereby improving the use efficiency when the user uses the plurality of displays.

According to various embodiments, an electronic device and a method for operating the same may be provided, wherein a member (for example, an optical member) is disposed in the space formed between a plurality of displays, thereby improving the aesthetic appearance, and preventing foreign substances from infiltrating the electronic device. Furthermore, at least one piece of information may be provided through the disposed member, thereby improving the convenience when using the electronic device.

Other aspects, advantages, and salient features of the various embodiments will become apparent to those skilled in the art from the following detailed description, which, taken in conjunction with the annexed drawings, discloses various embodiments.

BRIEF DESCRIPTION OF THE DRAWINGS

The above and other aspects, features, and advantages of various embodiments will be more apparent from the following description taken in conjunction with the accompanying drawings, in which.

DETAILED DESCRIPTION

The following description with reference to the accompanying drawings is provided to assist in a comprehensive understanding of various embodiments as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the various embodiments. In addition, descriptions of well-known functions and constructions may be omitted for clarity and conciseness.

The terms and words used in the following description and claims are not limited to the bibliographical meanings, but, are merely used by the inventor to enable a clear and consistent understanding of the various embodiments. Accordingly, it should be apparent to those skilled in the art that the following description of various embodiments is provided for illustration purpose only and not for the purpose of limiting the various embodiments as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
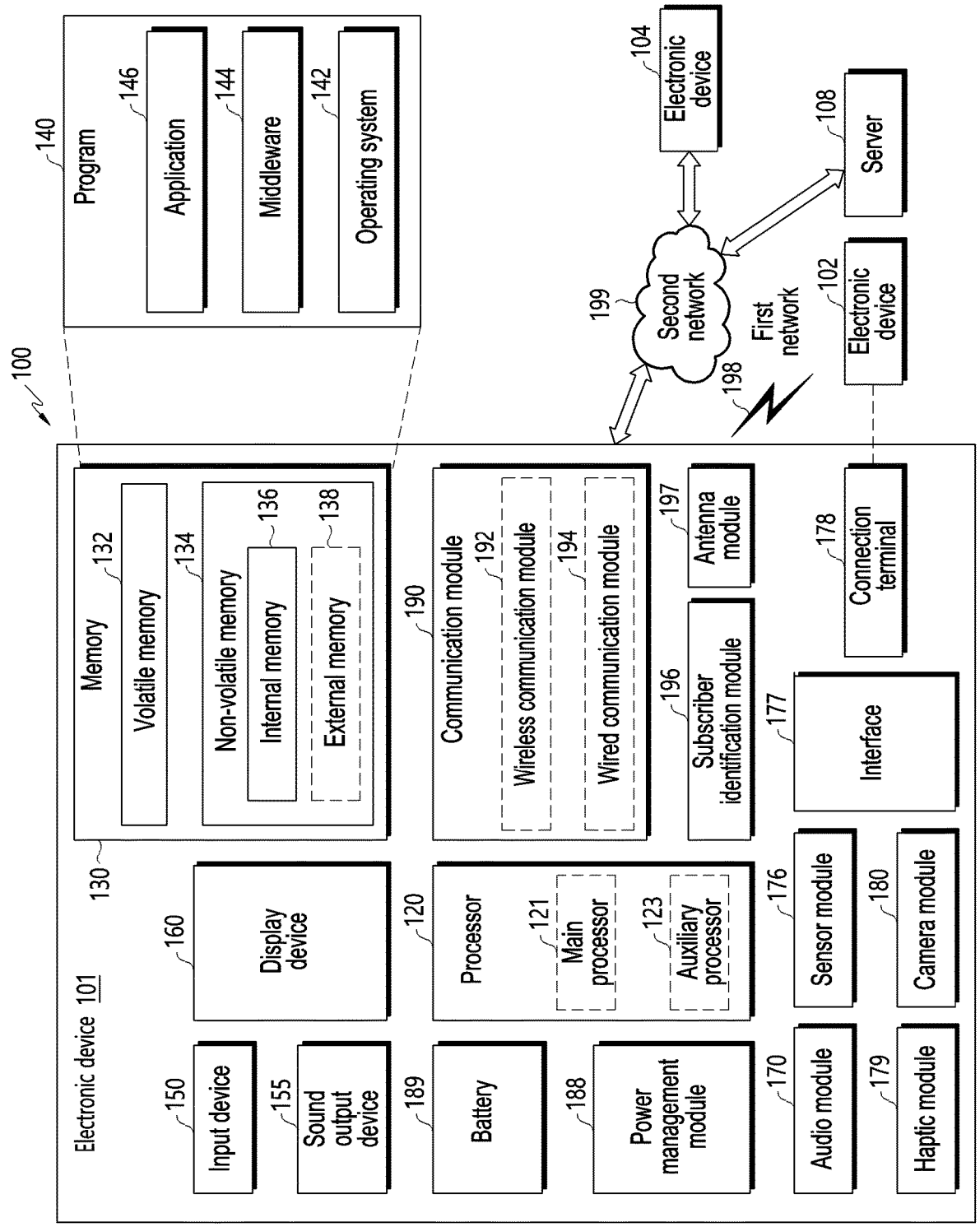
FIG. 1 is block diagram of an electronic device in a network environment according to various embodiments.

FIG. 1 is a block diagram illustrating an electronic device in a network environment according to various embodiments. Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. Non-volatile memory 134 may include internal memory 136 and/or external memory 138. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive a plurality of-input and a plurality of-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Hereinafter, an example of the electronic device 101 will be further described with reference to FIGS. 2A to 2C.

Figure 2A:
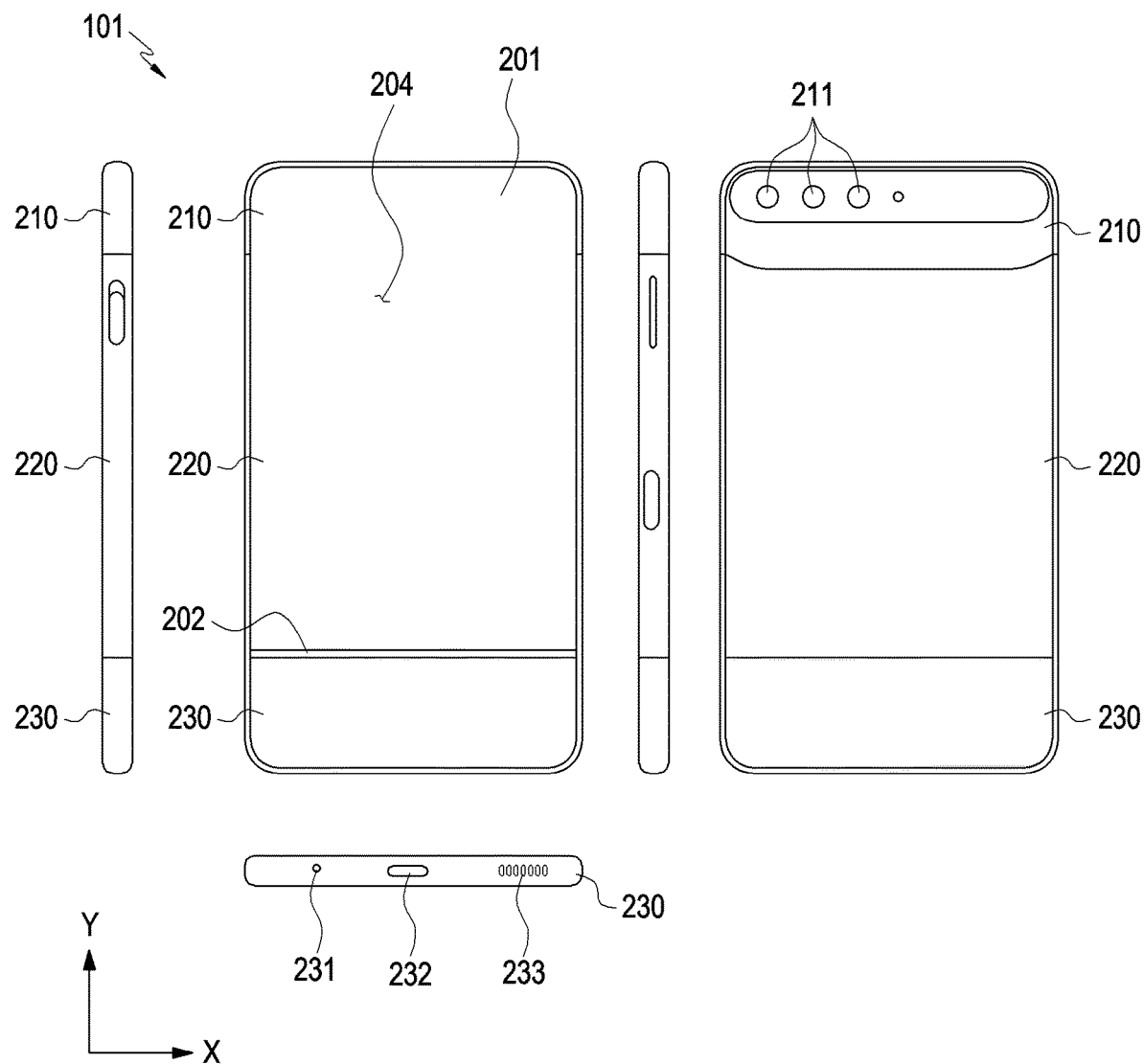
FIG. 2A illustrates an example of an electronic device according to various embodiments.
Figure 2B:
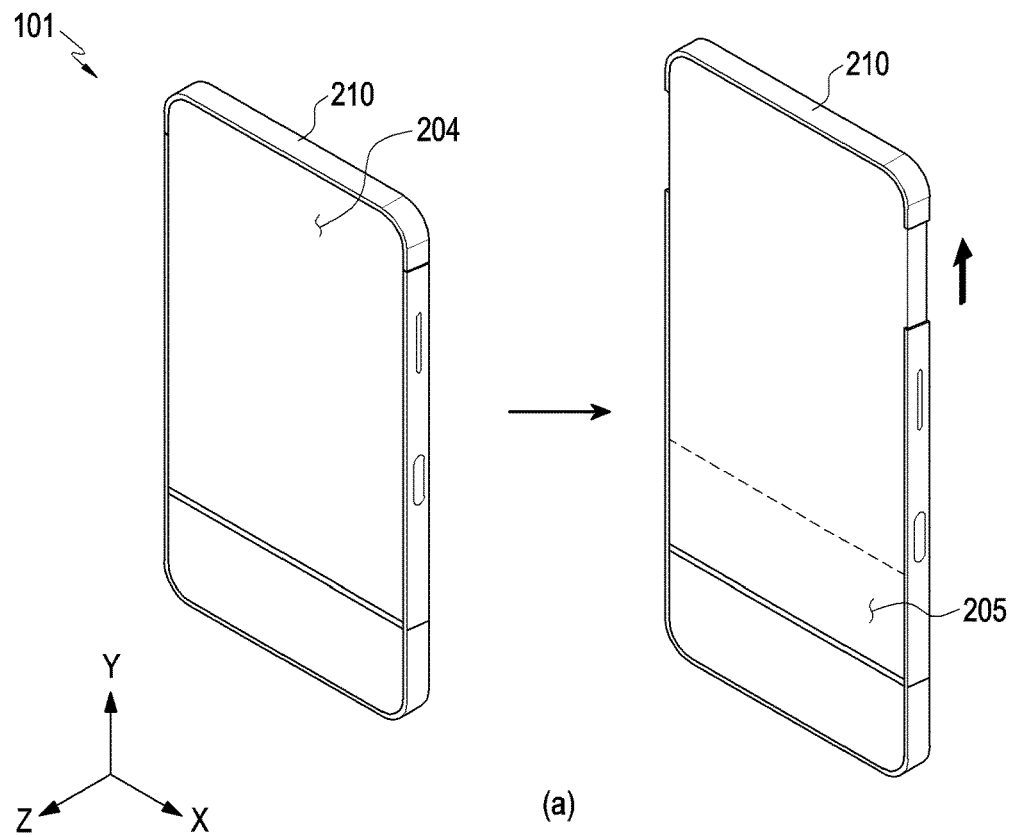
FIG. 2B illustrates an example in which an exposed region of a first display included in an electronic device according to various embodiments is changed.
Figure 2B:
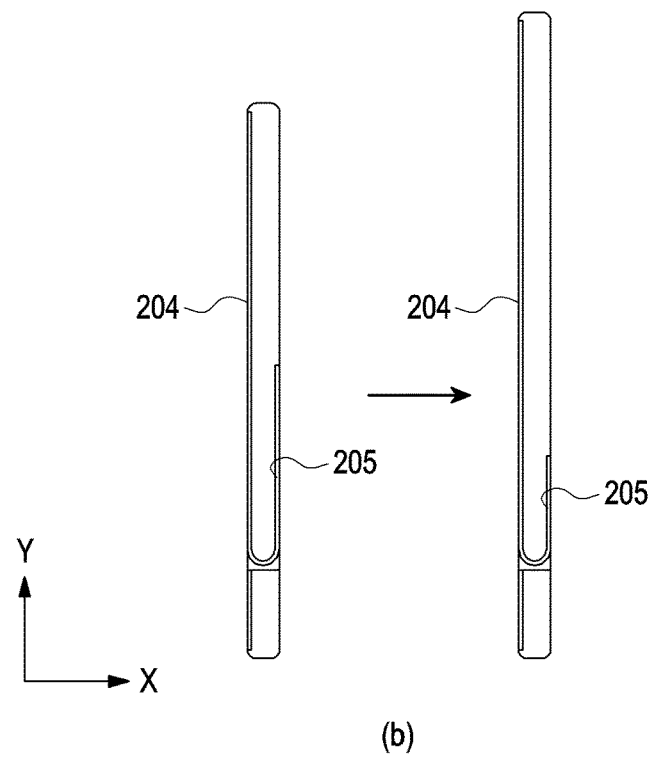
Figure 2C:
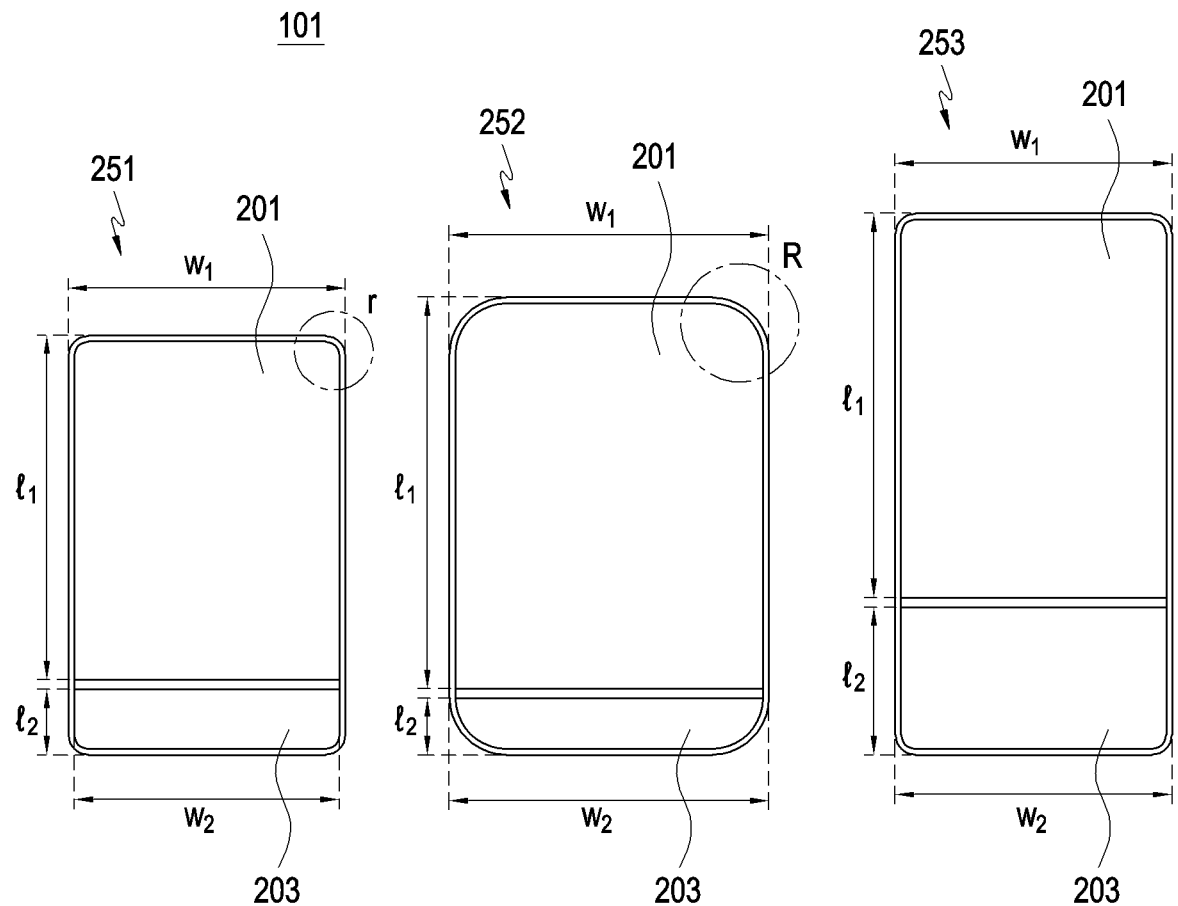
FIG. 2C illustrates various implementation examples of an electronic device according to various embodiments.

FIG. 2A illustrates an example of an electronic device according to various embodiments. FIG. 2B illustrates an example in which an exposed region, or area, of a first display included in an electronic device according to various embodiments is changed. FIG. 2C illustrates various implementation examples of an electronic device according to various embodiments.

According to various embodiments, the electronic device 101 may include a plurality of displays (e.g., first display 201 and second display 203). For example, as illustrated in FIG. 2A, an electronic device 101 may include a first display 201 and a second display 203. The first display 201 may be a display, at least partial region of which can be bent (deformed) by a user input (e.g., a force applied by a portion of a user's body). For example, the first display 201 may be a flexible display. When compared with the first display 201, the second display 203 may be relatively less bent (or deformed) by an external force. For example, the second display 203 may be a rigid display. In another example, the second display 203 may include a flexible display and glass (e.g., a cover window) disposed on the outer surface of the flexible display (e.g., the upper surface of the flexible display), wherein the glass is rigid glass. A predetermined space 202 may be formed between the first display 201 and the second display 203 of the electronic device 101, predetermined members are further arranged in the space 202, and a description thereof will be made later with reference to FIGS. 6A and 6B. The first display 201 and the second display 203 may be supported by or disposed in a plurality of housings (e.g., first through third structures 210, 220, and 230), the ratio of a region of the first display 201 exposed to the outside to a region of the second display 203 exposed to the outside may be changed depending on the relative position change (e.g., sliding) of the housings, and a description thereof will be made later. The housing forms the physical structure of the electronic device 101, and thus may be defined as a structure.

According to various embodiments, the plurality of displays (e.g., at least a portion of the first display 201 and the second display 203) may form one flat surface (or may be disposed on one flat surface) for visual continuity, and a size of the entire region of the display (e.g., the sum of the size of an exposed portion of the first display 201 and the size of the second display 203) may be changed. For example, in a particular state (e.g., a closed state, an open state, or an intermediate state, which will be described below), at least a portion 204 of the first display 201 of the electronic device 101 may be exposed to the outside as illustrated in FIG. 2A (e.g., may be disposed to be visible by a user), the remaining portion thereof may be received in the electronic device 101, and the entire region of the second display 203 may be exposed to the outside. The size of the exposed region of the first display 201 may be changed, and the size of the exposed region of the second display 203 may be maintained (or fixed). For example, as illustrated in FIG. 2B, a first display 201 may move (e.g., slide-out) such that at least a portion 205 received in the electronic device 101 is exposed to the outside, or may move (e.g., slide in) so as to be received in an electronic device 101, and thus the size of the exposed region of a first display 201 may be changed. The exposed at least portion of the first display 201 may be disposed to be spaced a predetermined distance apart from the second display 203 such that the first display 201 can slide out of and/or into the electronic device 101, and thus the space 202, in which the first display 201 can move, may be ensured (or, the inlet, into or from which the first display 201 can be inserted or drawn, may be formed). Hereinafter, an additional description will be made of the housings supporting the plurality of displays and sliding of the first display 201 based on a position change operation of the housings (e.g., sliding-in and sliding-out).

According to various embodiments, the first display 201 may be disposed on a flat surface of a first housing 210, and the second display 203 may be disposed on a flat surface of a third housing 230. The first housing 210 may be disposed so as to be capable of sliding on a second housing 220, and the third housing may be coupled to the second housing 220.

The first housing 210 (or a first structure) in which the first display 201 is disposed may slide on the second housing 220 in one direction of the fixed third housing 230 (e.g., in an upward direction of the y-axis or in a direction from the lower surface of the third housing 230 toward the upper surface of the first housing 210), and the first display 201 may slide out of the space 202 (e.g., portions of the first display 201, received in the electronic device 101, may be exposed to the outside). Further, when the first housing 210 moves in another direction (e.g., in a downward direction of the y-axis or in a direction from the upper surface of the first housing 210 toward the lower surface of the third housing 230), the first display 201 may slide in the space 202 (e.g., the exposed portion of the first display 201 is received inward). That is, in the state in which the position of the third housing 230, in which the second display 203 is disposed, is fixed, the first housing 210 moves and thus the relative position of the first housing 210 and the third housing 230 may be changed. When the relative position of the housing as described above, the size of the exposed region of the first display 201 may be changed but the size of the exposed region of the second display 203 may be maintained (or fixed). Sliding-out and sliding-in of the first display 201 according to the movement (e.g., sliding) of the housing (e.g., the first housing 210) will be further described with reference to FIGS. 3A to 3C later.

According to various embodiments, the plurality of displays included in the electronic device 101 may have structural features related to each other. For example, the first display 201 and the second display 203 may be disposed to form one imaginary flat surface. At least a portion of the first display 201 and the second display 203 may be disposed on the one imaginary flat surface such that there is not a step (that is, height difference) between the surface of the exposed at least portion 204 of the first display 201 and the surface of the second display 203. In another example, the length (e.g., width) of the first display 201 in one direction (e.g., x-axis direction) may correspond to (e.g., may be equal to) the length (e.g., width) of the second display 203 in one direction. Referring to reference numeral 251 in FIG. 2C, the first display 201 and the second display 203 may be implemented such that the width (w1) a region of the exposed at least portion 204 of the first display 201 that is adjacent to the second display 203 (or a region adjacent to the space 202) corresponds to the width (w2) of the region of the second display 203. Thus, when the electronic device 101 displays a content on each of the first display 201 and the second display 203, the content displayed on each of the displays (e.g., the first display 201 and the second display 203) may look like a single content to a user. In another example, corners (or edge portions) of the first display 201 and the second display 203 may be formed to have predetermined curvatures. For example, two upper-end corners (e.g., the left and right upper-end corners) of the first housing 210, in which the first display 201 is disposed, and two lower-end corners (e.g., the left and right lower-end corners) of the third housing 230, in which the second display 203 is disposed may be implemented so as to have a predetermined curvature. In response, two corners of the upper-end portion of the first display 201 and two corners of the lower-end portion of the second display 203 may be implemented so as to have a predetermined curvature. The corners are formed to have the curvature, and thus may provide improved holding convenience when a user holds the electronic device 101. Without being limited to the illustration, the curvatures of the corners are not limited to the illustrated curvatures, and may be implemented as various curvatures depending on implementation purposes. For example, the curvature of a corner of the first display 201 may correspond (be equal) to the curvature of a corner of the second display 203, or may be different from the curvature of the corner of the second display 203. In another example, as illustrated in FIG. 2C, a curvature of a corner of each of a first display 201 and a second display 203 may be implemented as a different curvature depending on the implementation or design purpose (e.g., a first curvature (r) of reference numeral 251 in FIG. 2C and a second curvature (R) of reference numeral 252 in FIG. 2C).

According to various embodiments, the plurality of displays included in the electronic device 101 may have different structural features. For example, referring to reference numeral 251 in FIG. 2C, the length (l1) of the first display 201 in one direction (e.g., a direction from the bottom surface of the third housing 230 toward the top surface of the first housing 210) may be implemented so as to be longer than the length (l2) of the second display 203 in one direction. As shown in reference numerals 252 and 253 in FIG. 2C, the length (l1) and width (w1) of the first display 201 and the length (l2) and width (w2) of the second display 203 may be implemented as various lengths and widths depending on the implementation or design purpose.

According to various embodiments, various types of elements (e.g., units, modules, and holes) may be provided in the housing included in the electronic device 101. Hereinafter, various types of elements will be described.

For example, various devices may be arranged in the first housing 210. In an example, at least one camera 211 may be arranged in a surface (or the rear surface) opposite to one surface of the first housing 210 in which the first display 201 is disposed. The at least one camera 211 may capture an image of a subject in a direction opposite to the direction faced by the exposed region of the first display 201. The at least one camera 211 may include a wide-angle camera, a telephoto camera, or a close-up camera, and according to an embodiment, may include an infrared projector and/or infrared receiver so as to measure the distance to a subject. The at least one camera 211 may include one lens or a plurality of lenses, an image sensor, and/or an image signal processor. Although not illustrated, the electronic device 101 may further include at least one camera (e.g., a front camera) which is disposed on the exposed region of the first display 201 and captures an image of a subject. For example, the front camera may be disposed at the periphery of the exposed region of the first display 201 of the first housing 210 or in a region overlapping the first display 201. When the front camera is disposed in the region overlapping the first display 201, the front camera may capture an image of a subject through the first display 201.

In another example, a plurality of holes (e.g., holes 231, 232, and 233) may be implemented in the bottom surface of the third housing 230, in which the second display 203 is disposed. In an example, a plurality of connector holes, which include a connector hole 232 for accommodating a connector (e.g., a USB connector) configured to transmit or receive power and/or data to or from an external electronic device and a connector hole 231 for transmitting or receiving data (e.g., an audio signal) to or from the external electronic device, may be implemented in the bottom surface of the third housing 230. In another example, holes 233 (e.g., speaker holes, a microphone hole) for outputting or receiving sound may be implemented in the bottom surface of the third housing 230. Some of the speaker holes may be provided as receiver holes for a voice call, and others may be provided as outer speaker holes. A microphone configured to obtain sound from the outside may be disposed in the microphone hole. In an embodiment, a plurality of microphones may be disposed in the microphone hole so as to sense the direction of sound. In an embodiment, the speaker holes and the microphone hole may be implemented as one hole, or a speaker may be provided without any speaker hole (e.g., a Piezo speaker). The above-described a plurality of holes are not limited the illustrated holes, and may be implemented not only in the bottom surface of the third housing 230 but also in the side surface of the first housing 210, the side surface of the second housing 220, and the side surface of the third housing 230.

In another example, although not illustrated, an indicator (not shown) configured to provide various types of information may be disposed in a first structure 401 or a second structure 402, and may include a light-emitting diode so as to provide state information of the electronic device 101 in the form of a visual signal.

In another example, a sensor module (not shown) may be provided in the electronic device 101 in order to generate an electrical signal or a data value that corresponds to an operation state inside the electronic device 101 or an environment state outside the electronic device 101. The sensor module may include, for example, a proximity sensor, a fingerprint sensor, or a biometric sensor (e.g., an iris/face recognition sensor or an HRM). In another embodiment, the sensor module may further include at least one among, for example, a gesture sensor, a gyro sensor, a barometric pressure sensor, a magnetic sensor, an accelerator sensor, a grip sensor, a color sensor, an infrared (IR) sensor, a temperature sensor, a humidity sensor, or an illumination sensor. The fingerprint sensor will be described with reference to FIGS. 35 and 36 later, but may be overlapplingly implemented in a region in which the second display 203 is disposed.

Hereinafter, another example of the structural features of the electronic device 101 with reference to FIGS. 2A to 2C, described above, will be described with reference to FIG. 2D.

Figure 2D:
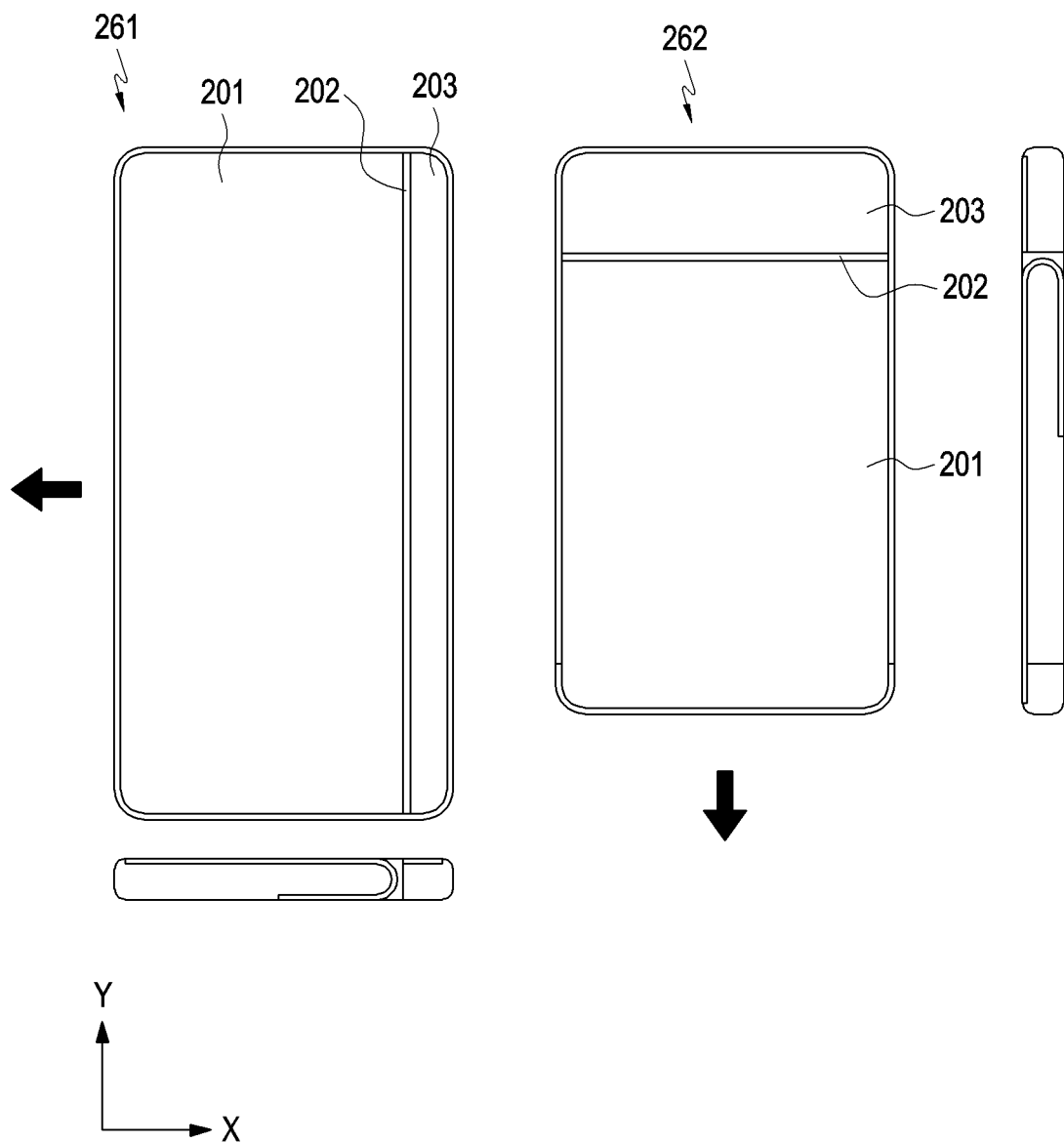
FIG. 2D is a view for describing various implementation examples of an electronic device according to various embodiments.

FIG. 2D is a view for describing various implementation examples of an electronic device according to various embodiments According to various embodiments, the first display 201 and the second display 203, included in the electronic device 101, may be variously disposed. For example, as shown in reference numeral 261 in FIG. 2D, the electronic device 101 may be implemented such that the first display 201 is disposed at the left side and the second display 203 is disposed at the right side. Without being limited to the illustrated implementation, the electronic device 101 may be implemented such that the first display 201 is disposed at the right side and the second display 203 is disposed at the left side. In another example, as shown in reference numeral 262 in FIG. 2D, the second display 203 may be disposed at the upper side, and the first display 201 may be disposed at the lower side.

Even when variously implemented as described above, the electronic device 101 may be implemented so as to have the structural features described with reference FIGS. 2A to 2C. For example, as shown in reference numerals 261 and 262 in FIG. 2D, the first display 201 and the second display 203 may be disposed such that the region of the second display 203 is maintained but the region of an exposed region of the first display 201 can be changed.

Hereinafter, the electronic device illustrated in FIGS. 2A, 2B, 2C, and 2D will be further described with reference to FIGS. 3A and 3B.

Figure 3A:
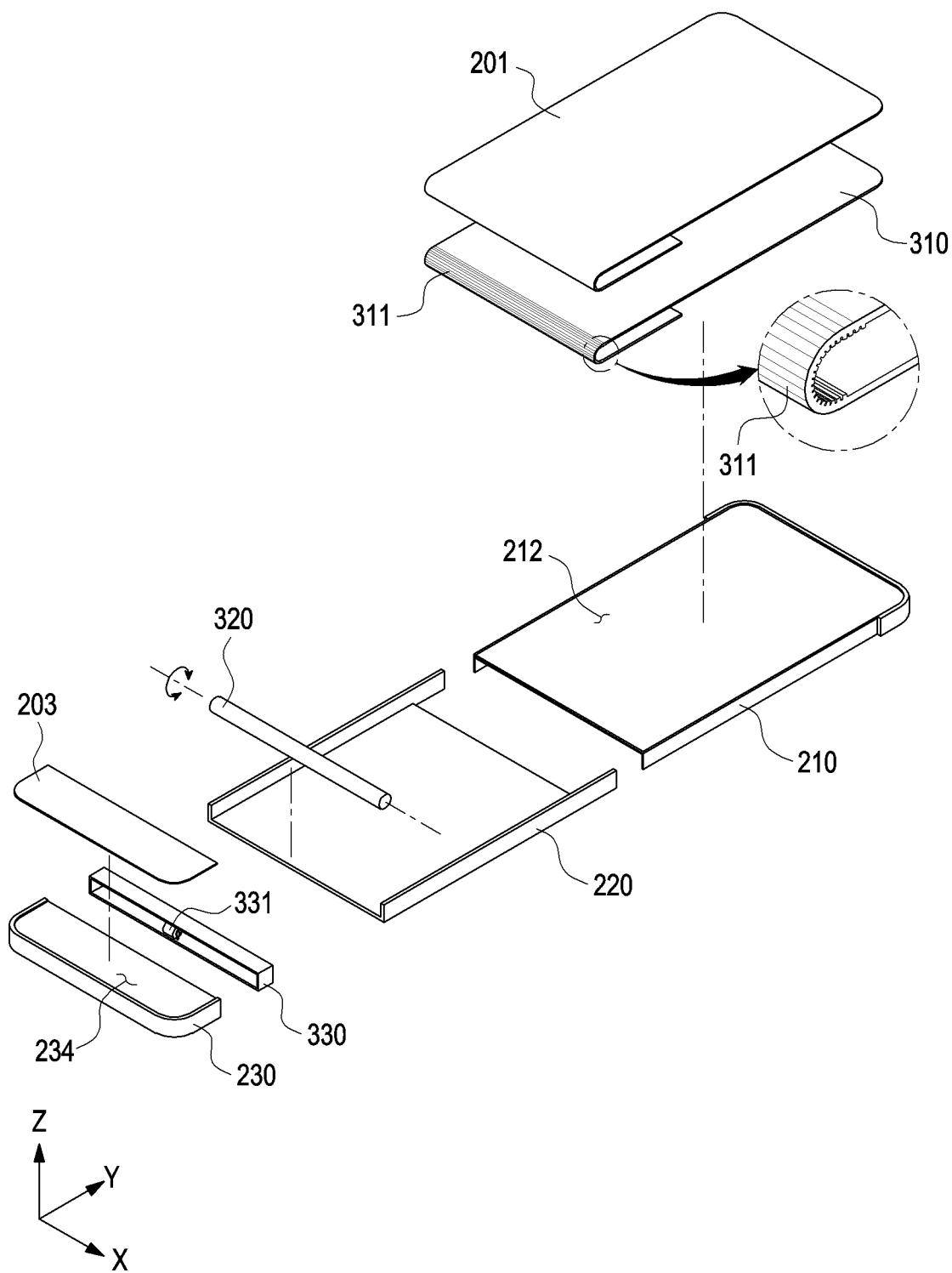
FIG. 3A is an exploded perspective view showing an electronic device (an electronic device illustrated in FIGS. 2A, 2B, and 2C) according to various embodiments.

FIG. 3A is an exploded perspective view showing an electronic device (an electronic device illustrated in FIGS. 2A to 2C) according to various embodiments. According to various embodiments, without being limited to the elements illustrated in FIG. 3A, the electronic device 101 may be implemented so as to include more elements or fewer elements. For example, although not illustrated, a circuit board, on which the processor 120 illustrated in FIG. 1 is implemented, may be further included in the electronic device 101.

Figure 3B:
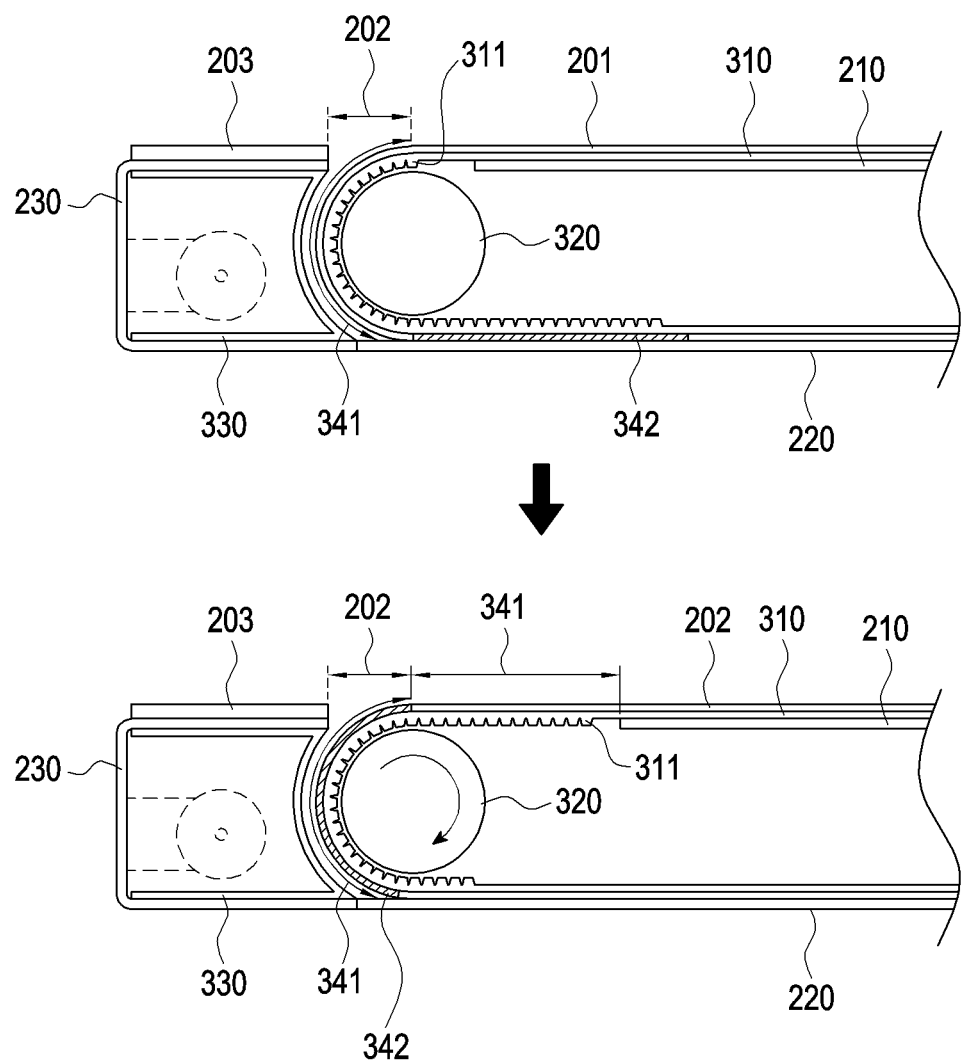
FIG. 3B is a view for describing an example of a sliding operation of a first display included in an electronic device according to various embodiments.
Figure 3C:
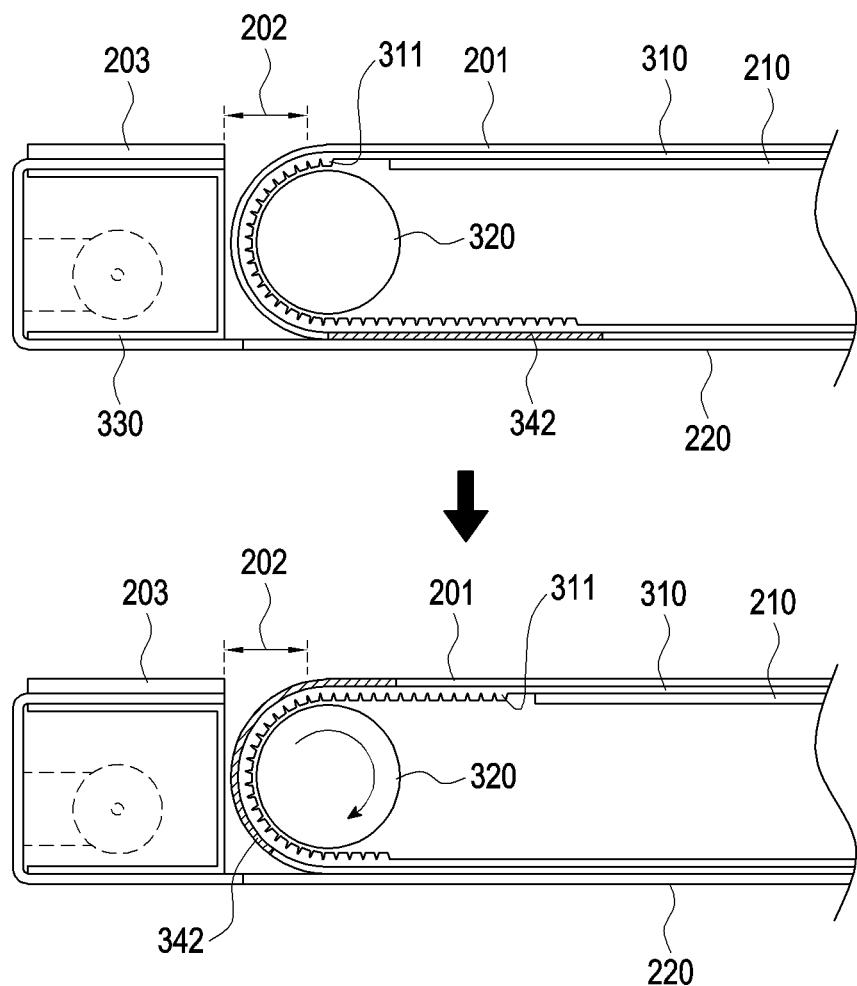
FIG. 3C is a view for describing another example of a sliding operation of a first display included in an electronic device according to various embodiments.

FIG. 3B is a view for describing an example of a sliding operation of a first display included in an electronic device according to various embodiments. FIG. 3C is a view for describing another example of a sliding operation of a first display included in an electronic device according to various embodiments.

Referring to FIG. 3A, an electronic device may include: a first structure 210 (or a first housing 210); a second structure 220 (or, a second housing 220); a third structure 230 (or a third housing 230); a fourth structure 330 disposed in the third structure 230; a moving member (e.g., a servo motor 331) configured to move the fourth structure 330; a first display 201; a second display 203; a guide member (e.g., a roller 320); and a plate 310 having a bendable region (e.g., a multi-bar hinge structure region 311 including a plurality of bars). A partial region (e.g., a bent region) of the first display 201 may be received into or exposed out of the third structure 230 by the rotation of the roller 320. The state in which the first display 201 is maximally received (or inserted) into the electronic device 101 (e.g., the third structure 230) (or the state in the size of the exposed region is minimal) may be defined as a "closed state", the state in which the first display 201 is maximally exposed (or drawn) out of the electronic device 101 (or the state in which the size of the exposed region is maximal) may be defined as an "open state", and the state in which the first display 201 has an area of which a size is larger than a size of the area corresponding to the closed sated and smaller than a size of the area corresponding to the open state may be defined as an "intermediate state". Hereinafter, elements included in the electronic device 101 will be further described. Hereinafter, the structures (e.g., the first structure 210, the second structure 220, and the third structure 230) are described as being able to be coupled to and separated from each other, but at least some of the structures may be implemented in an integrated type in which at least some of the structures cannot be separated from each other. For example, the second structure 220 and the third structure 230 may be implemented so as to be integrated with each other.

According to various embodiments, the first structure 210 may include a region 212 in which the first display 201 is disposed. The region 212 may be formed as a flat surface as illustrated FIG. 3A, or may be formed in the form of a protrusion on the inner wall of the first structure 210 in order to support the first display 201. Further, the first structure 210 may include a portion (e.g., a bracket (not shown)) at which the plate 310 is mounted. The bracket may be made of a metal material and/or a non-metal material (e.g., polymer). At least a portion of the plate 310 (e.g., the remaining region except for a bendable region (e.g., the multi-bar hinge structure region 311)) may be mounted on the bracket of the first structure 210, and may form one surface together with the first structure 210. As the portion of the plate 310 is mounted to the first structure 210, at least a portion of the first display 201 (e.g., a region exposed to the outside) may be disposed on the formed surface. The at least portion (e.g., the remaining region except for a bendable region) of the plate 310, disposed in the first structure 210, may be moved in one direction together with the first structure 210 by the rotation of the roller 320, and thus the at least portion of the display (e.g., the region exposed to the outside) may be inserted into the electronic device 101 (e.g., into the third structure 230) or the remaining portion (e.g., the received region) of the first display 201 may be exposed to the outside. In order for the first structure 210 and the plate 310 to be moved by the rotation of the roller 320, an element (e.g., a support sheet) capable of being wound by the roller 320 may be implemented at the remaining portion of the plate 310 (e.g., the bendable region) and will be described later with reference to FIG. 3B. The plate 310 is not limited to the illustrated plate, and may be implemented integrally with the first structure 210. In another example, at least a portion of the first structure 210 may be implemented so as to have a narrower width than the remaining portion (e.g., the top portion). For example, at least a portion of the first structure 210, disposed at the second structure 220, may be implemented so as to have a width corresponding to the distance between the inner surface of the left side wall of the second structure 220 and the inner surface of the right side wall thereof. Thus, the at least portion of the first structure 210 is disposed at the second structure 220, and the first structure 210 may slide on the second structure 220.

According to various embodiments, the second structure 220 may support the first structure 210, the roller 320, the remaining portion (e.g., the bendable region) of the plate 310, and the remaining portion of the first display 201 (e.g., the region received in the electronic device 101). For example, the second structure 220 may include a bottom wall and side walls provided at the left and right sides of the bottom wall, wherein the bottom wall forms an inner surface, and the upper side, the lower side, and the top portion thereof may be open. Therefore, the first structure 210 may be disposed (or supported) on the inner surface of the bottom of the second structure 220 so as to be able to slide through (while extending through) the second structure 220. When the first structure 210 is disposed at the second structure 220, the first structure 210 may be disposed such that outer walls of at least a portion of the first structure 210 are facing (or come into contact with) the inner surfaces of the left and right side walls of the second structure 220. For example, the width of the first structure 210 may be implemented so as to be smaller than the width of the second structure 220, and thus the first structure 210 may be inserted into the second structure 220. In the state in which the first display 201 of the electronic device 101 is maximally received in the electronic device 101 (e.g., a closed state), the remaining portion (e.g., the top portion) of the first structure 210 may come into contact with the top surface of each of the side walls of the second structure 220. When the first display 201 slides out of the electronic device 101, the distance between the top surfaces of the side walls of the second structure 220 and the remaining portion of the first structure 210 increases, and the first structure 210 may slide on the second structure 220 in one direction through a space formed on the second structure 220. Further, together with the first structure 210, at least a portion the plate 310 coupled to the first structure 210 and at least a portion of the first display 201 disposed on the plate 310 may be disposed in the second structure 220. For example, each of the side walls of the second structure 220 may include a coupling part (not shown) to which the roller 320 is rotatably coupled, and in the state in which the roller 320 is coupled to the second structure 220 and the first structure 210 is disposed in the second structure 220, the remaining portion (e.g., the bendable region) of the plate 310 and the remaining portion of the first display 201 (e.g., a region received in the electronic device 101) may be positioned between the roller 320 and the second structure 220. For example, a partial region of the first display 201 may be positioned between the roller 320 and the second structure 220, and the partial region of the first display 201 and the remaining portion of the plate 310, in which the partial region of the first display 201 is disposed, may face the surface of the bottom wall of the second structure 220. According to an embodiment, the bottom wall of the second structure 220 may be made of a transparent material, and a content may be displayed in a partial region of the first display 201 so as to be viewed by a user. Regions of the plate 310 and the first display 201, corresponding to (e.g., adjacent to) the roller 320 may be bent. For example, the plurality of bars included in the multi-bar hinge structure region of the plate 310 may be arranged to form a curvature corresponding to the curvature of the roller 320, and a region of the first display 201, disposed in the multi-bar hinge structure region, may also be bent to have a curvature corresponding to the curvature of the roller 320. The second structure 220 may further include a driving part (e.g., a motor) (not shown) configured to rotate the roller 320. Alternately, without being limited thereto, the driving part may not be provided, and the roller 320 may be rotated by external force (e.g., force by which a user pulls the first structure 210). Hereinafter, a description will be made of slide-out and slide-in operations of the first structure 210 and the first display 201, coupled to the second structure 220, wherein the slide-out and slide-in operations are based on the rotation of the roller 320 of the second structure 220.

According to various embodiments, as illustrated in FIGS. 3B and 3C, a first display 201, which is based on an organic light-emitting diode, may be at least partially deformed into a curved shape while mostly maintaining a flat shape. For example, an element (e.g., a support sheet) windable by the roller 320 may be provided in a partial region (e.g., the multi-bar hinge structure region 311) of the plate 310 disposed in the first structure 210. The support sheet may be made of a material having flexibility and a predetermined elasticity (e.g., a material including an elastic body such as silicone or rubber), and may be mounted or attached to the roller 320 and may be selectively wound around the roller 320 by rotation of the roller 320. Further, as illustrated in FIGS. 3B and 3C, the support sheet may have a structure and a shape (e.g., a protrusion or a groove) for being attached to the roller 320. Thus, when the roller 320 rotates, the support sheet may be rolled by the outer circumferential surface of the roller 320, and a portion of the first display 201, disposed on a portion of the plate 310, which corresponds to the support sheet (e.g., at which the support sheet is implemented) may also be rolled (or bent). Further, when the support sheet moves away from the outer circumferential surface of the roller 320, a portion of first display 201, disposed on a portion of the plate 310 corresponding to the support sheet moved away from the outer circumferential surface of the roller 320, may also be moved in one direction while being unrolled in a flat shape. For example, as illustrated in FIGS. 3B and 3C, when the roller 320 rotates in one direction (e.g., a clockwise direction), the support sheet of the plate 310 is wound in a direction corresponding to the rotation direction of the roller 320, and the plate 310 and the first display 201 disposed on the plate 310 may be moved in one direction through the space 202 between the fourth structure 330 and the first display 201. Thus, a region 342 of the flexible display, received in the electronic device 101, may be exposed to the outside. The shape of the fourth structure 330 (FIGS. 3B and 3C) will be described at the time of description of the third structure 230 later. When the plate 310 moves in the one direction, the first structure 210 coupled to the plate 310 may move in the one direction, and thus the first display 201 may slide in one direction. In contrast, when the roller 320 rotates in a different direction (e.g., a counterclockwise direction), the support sheet of the plate 310 is wound in a direction corresponding to the rotation direction of the roller 320, and thus the plate 310 and the first display 201 may move in the different direction. When the plate 310 moves in the different direction, the first structure 210 coupled to the plate 310 may also move in the different direction, and thus the first display 201 may slide in the different direction. When an event for sliding-out or sliding-in of the first display 201 occurs, the motor may be driven under control of the processor of the electronic device 101 to rotate the roller 320, and a description thereof will be made later.

As described above, during drawing-in and drawing-out (taking-out) of the first display 201, the roller 320 and the plate 310 may maintain the predetermined radius of curvature of the first display 201 and may reduce friction against another structure (e.g., the first structure 210), thereby preventing the excessive deformation of the first display 201. The "excessive deformation" may signify that the first display 201 is deformed to have an excessively small radius so that pixels or signal wires included in the first display 201 are damaged.

According to various embodiments, the third structure 230 may include a surface 234 (e.g., the top surface) on which the second display 203 is disposed, and an inner space in which the fourth structure 330 and elements 331 (e.g., a servo motor and a sensor) configured to move the fourth structure 330 are provided may be formed in the third structure 230. In another example, the third structure 230 may include: a top wall having a surface on which the second display 203 is disposed; a bottom wall opposite to the top wall; and walls formed on the left, right, and lower sides between the top wall and the bottom wall. In order for the height of the second display 203 disposed on the top wall of the third structure 230 (e.g., the height of the upper surface of the disposed display in the z-axis direction) to correspond to (e.g., be equal to) the height of the first display 201 (e.g., the height of the upper surface of the disposed display in the z-axis direction), the height of the top wall of the third structure 230 (e.g., the height in z-axis direction) may be configured to be less (e.g., the thickness of the second display 203 less) than the height of the disposed first display 201 (e.g., the height in the z-axis direction). Each of the left and right walls of the third structure 230 may have a structure (e.g., a bracket) configured to couple the third structure 230 to the second structure 220, and thus in a state in which the third structure 230 is coupled to the second structure 220, the position of the third structure 230 may be fixed even though the first structure 210 slides. Therefore, only the size of the exposed region of the first display 201 may be adjusted while the size of the exposed region of the second display 203 is maintained. The above-described fourth structure 330 may be disposed in an inner space of the third structure 230 that is formed by the walls (e.g., the top wall, the left wall, and the right wall) of the third structure 230. One surface of the fourth structure 330 may be configured to have a curvature corresponding to the curvature of a region of the first display 201 corresponding to the roller 320. When the third structure 230 is coupled to the second structure 220, one surface of the fourth structure 330 may face a region 341 of the first display 201 corresponding to the roller 320, as illustrated in FIGS. 3B and 3C. One surface of the fourth structure 330 may be configured to have a curvature corresponding to the curvature of the region 341 of the first display 201, as illustrated in FIG. 3B, or may be configured to have a flat shape, as illustrated in FIG. 3C. As illustrated in FIG. 3B, when one surface of the fourth structure 330 has a curvature, the region 341 of the first display 201 corresponding to the roller 320 may be positioned below the bottom surface of the top wall of the third structure 230. Further, as illustrated in FIG. 3C, when one surface of the fourth structure 330 is configured to have a flat shape, the first display 201 may be positioned outside the third structure 230, and thus, if observed in a direction perpendicular to the electronic device 101, the first display 201 and the second display 203 may not have any overlapping region. When the first display 201 slides out and slides in, the fourth structure 330 may be moved by operation of the servo motor 331 and the sensor, and a description thereof will also be made later with reference with FIG. 5.

Without being limited to FIG. 3A, the top wall of the third structure 230 may not be formed, the second display 203 may be disposed in an opening of the third structure 230, and the heights of the second display 203 and the first display 201 (e.g., the heights in the z-axis direction) may correspond to (e.g., may be equal to) each other. A predetermined member may be provided between the second display 203 and the bottom wall, and the second display 203 may be disposed on the predetermined member. Further, without being limited to the description, even when the member is not provided, the height of the second display 203 disposed in the opening of the third structure 230 may correspond to (e.g., may be equal to) the height of the first display 201.

Hereinafter, an additional description will be made of the example of the electronic device 101 which has been described with reference to FIGS. 2A to 2D to FIGS. 3A to 3C.

Figure 4:
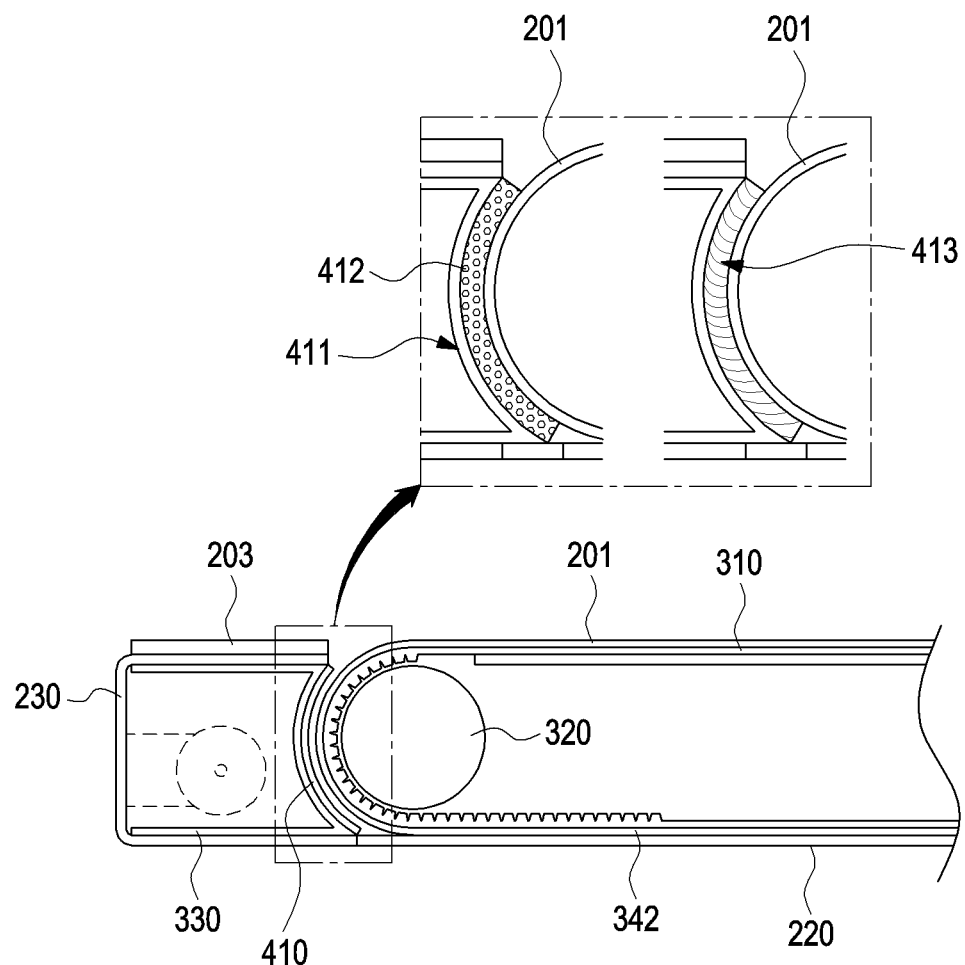
FIG. 4 is a view for describing an example of a member provided between a fourth structure and a first display according to various embodiments.

FIG. 4 is a view for describing an example of a member provided between a fourth structure and a first display according to various embodiments.

Referring to FIG. 4, an electronic device 101 may further include a member 410 disposed between a fourth structure 330 and a first display 201 in a state in which the plurality of housings (e.g., a first housing 210, a second housing 220, and a third housing 230) are coupled to each other. For example, the member 410 may be disposed on a surface of the fourth structure 330, which faces the bent region of the first display 201 received inside the electronic device 101.

The member 410 may be positioned in a space between the first display 201 and the fourth structure 330, and may come in contact with the first display 201 to prevent foreign matter from infiltrating into the electronic device 101. The member 410 may have a member having air gaps 412 as shown in reference numeral 411 in FIG. 4 or a brush member having a brush shape as shown in reference numeral 413 in FIG. 4. The first display 201 may slide while being in contact with the member 410. Therefore, foreign matter on the first display 201 may be removed by the member 410.

Hereinafter, an additional description will be made of the example of the electronic device 101 which has been described with reference to FIGS. 2A to 2D to FIGS. 3A to 3C.

Figure 5:
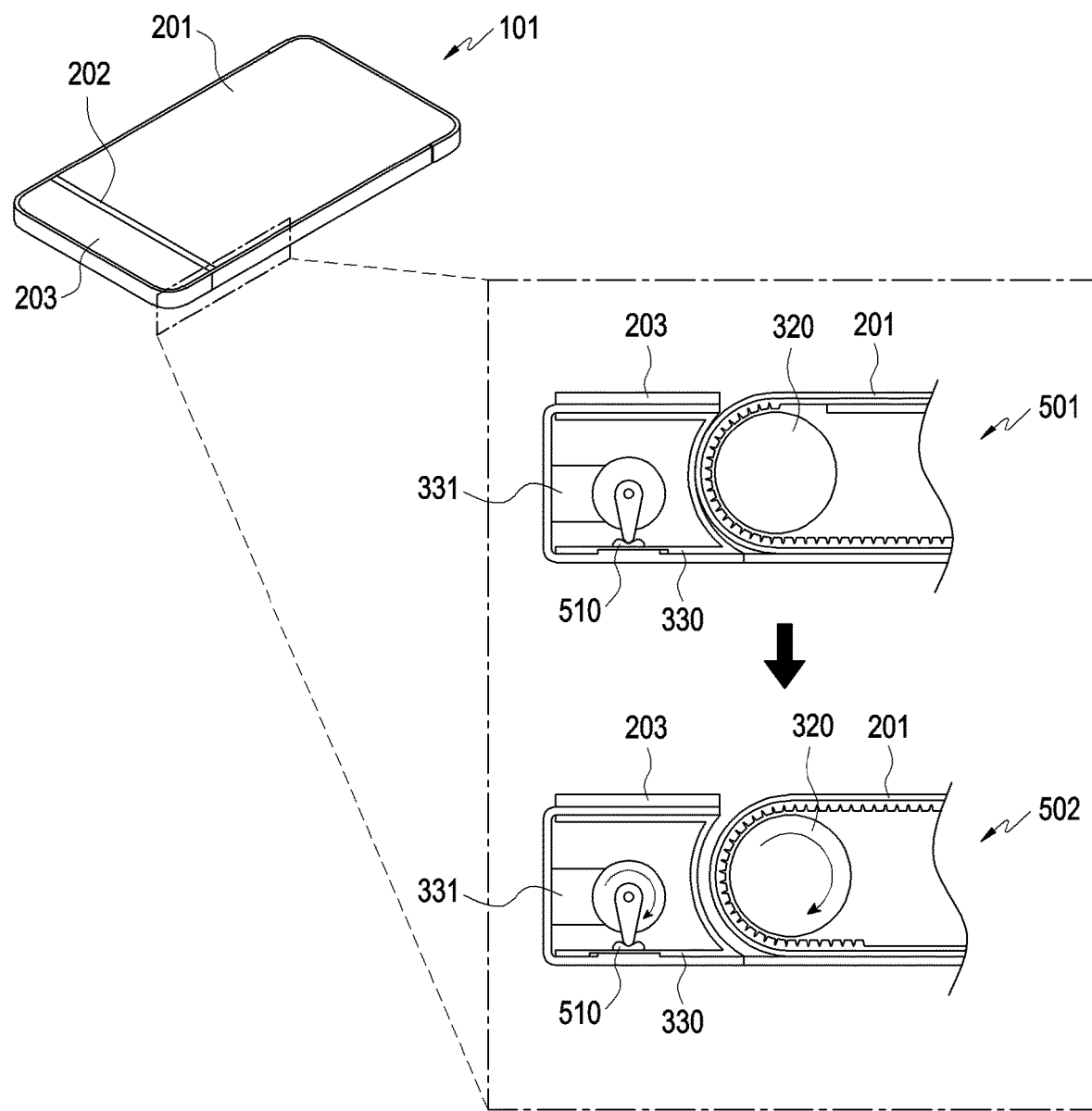
FIG. 5 is a view for describing an example of elements (e.g., a servo motor and a sensor) configured to move a fourth structure according to various embodiments.

FIG. 5 is a view for describing an example of elements (e.g., a servo motor and a sensor) configured to move a fourth structure according to various embodiments.

According to various embodiments, the electronic device 101 may further include a moving member (e.g., a servo motor 331) configured to move a fourth structure 330 and provided in a third structure 230 in which a second display 203 is disposed. The servo motor 331 may include a handle which is rotated in a particular direction (e.g., a clockwise or counterclockwise direction) by a predetermined rotation angle when the servo motor is driven, and a portion 510 (e.g., a groove) coming into contact with the handle of the servo motor may be formed in the top surface of the bottom wall of the fourth structure 330. Further, a groove (or a recess) may be formed in the bottom surface of the bottom wall of the fourth structure 330 so as to allow the fourth structure 330 to move in the third structure 230, and a protrusion portion corresponding to the groove may be formed in a surface of the third structure 230. In contrast, a protrusion may be formed on the fourth structure 330 and a groove may be formed on the third structure 230. As shown in reference numerals 501 and 502 in FIG. 5, when the handle included in the servo motor 331 may be rotated in one direction (e.g., a clockwise direction) by driving of the servo motor 331, external force is applied to the groove 510 of the fourth structure 330 in a direction (e.g., the leftward direction) corresponding to the one direction, and thus the fourth structure 330 may be moved in the one direction. In contrast, when the handle is rotated in a different direction, the fourth structure 330 may be moved in a direction corresponding to the different direction. The electronic device 101 may control, based on the occurrence of an event for moving the fourth structure 330, the moving member (e.g., the servo motor 331), and a description thereof will be made with reference to FIGS. 8, 9A, and 9B.

Hereinafter, the example of the electronic device 101 which has been described with reference to FIGS. 2A to 2D, FIGS. 3A to 3C, FIG. 4, and FIG. 5 will be further described with reference to FIG. 6A.

Figure 6A:
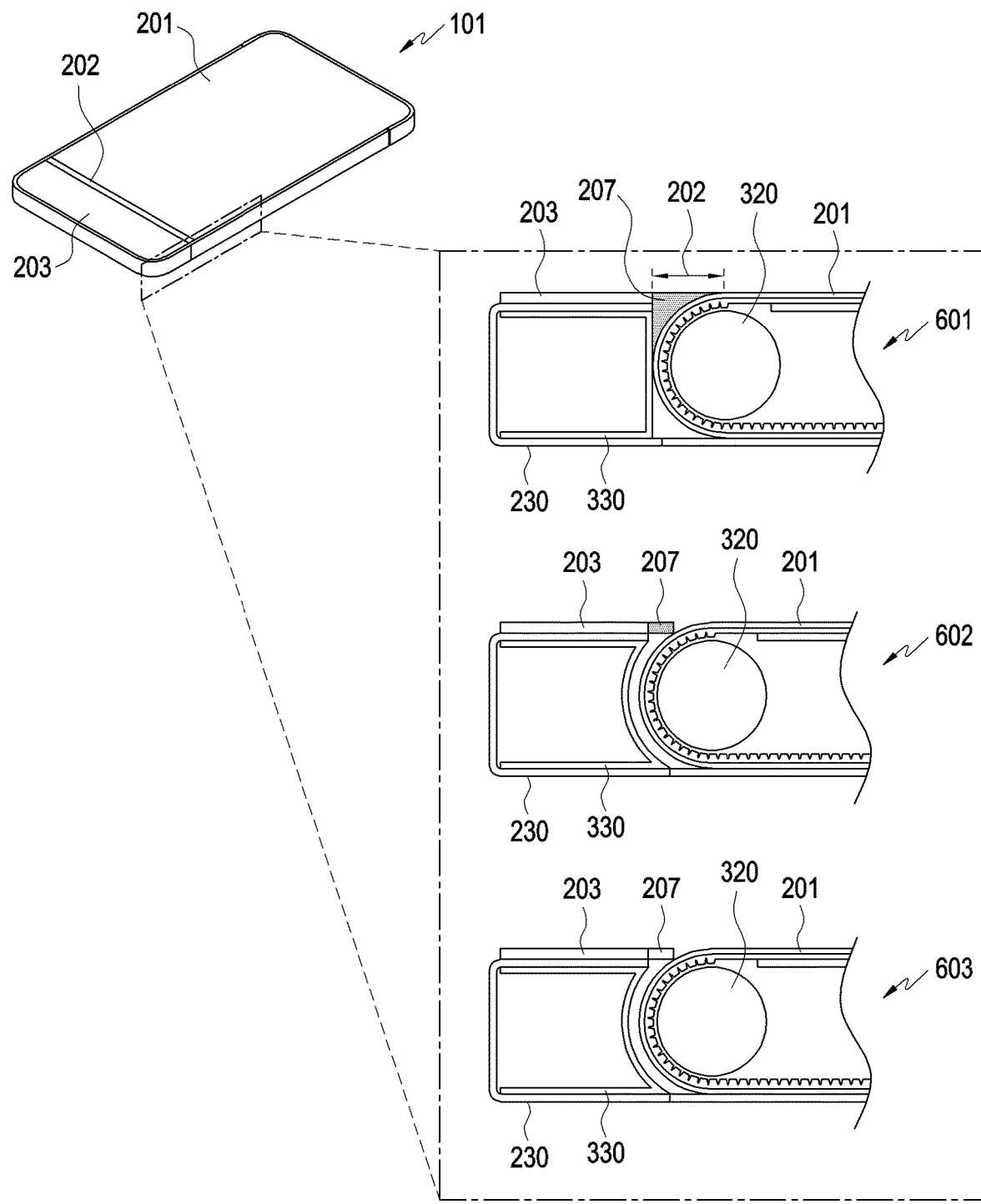
FIG. 6A is a view for describing an example of a member provided in an electronic device according to various embodiments.

FIG. 6A is a view for describing an example of a member provided in an electronic device according to various embodiments.

Figure 6B:
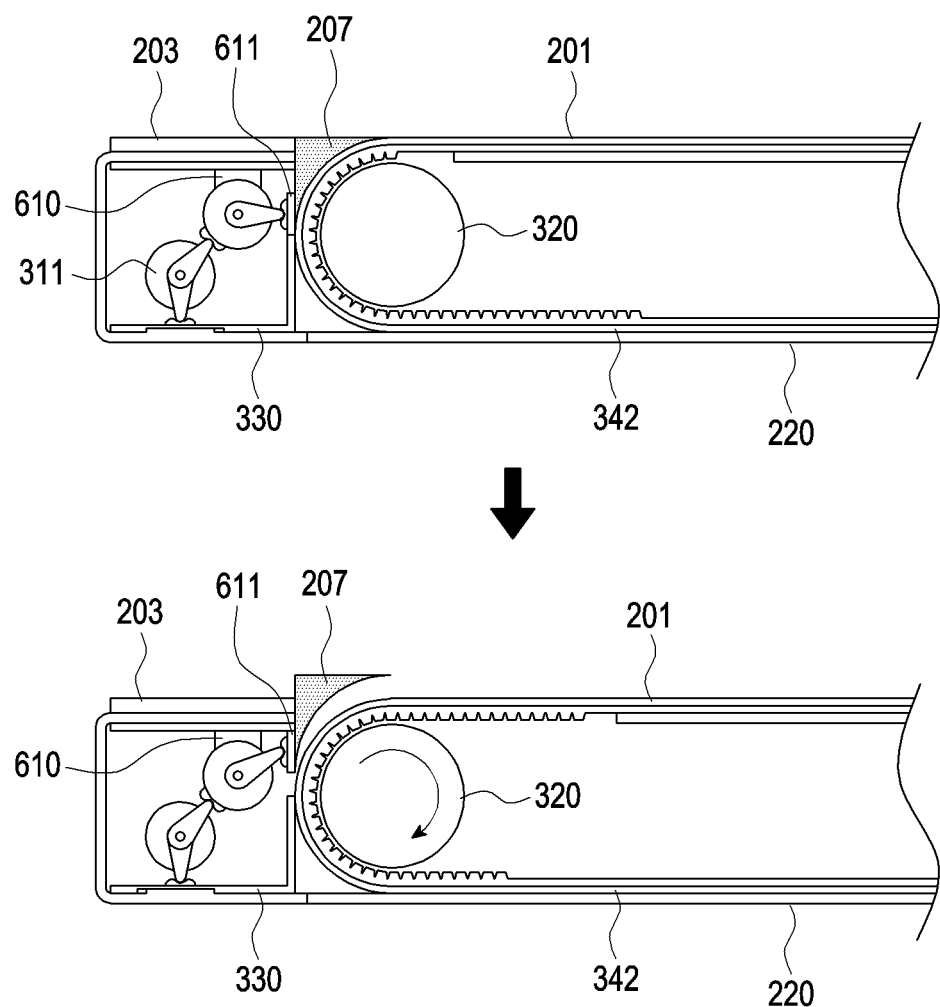
FIG. 6B is a view for describing an example of members for moving a member provided in an electronic device according to various embodiments.

According to various embodiments, the electronic device 101 may further include a member 207 disposed in the space 202 between the first display 201 and the second display 203. The member 207 may have a length and a width corresponding to the space 202, may have a smaller length than the first display 201 and the second display 203, and may have a width corresponding to those of the first display 201 and the second display 203. For example, the member 207 may made of a material (e.g., metal or metal structure, plastic) corresponding to that of at least one of the first structure 210, the second structure 220, or the third structure 230 and may have a color corresponding thereto. In another example, the member 207 may be an optical member configured to diffuse light incident to the member 207 and made of a transparent material. As illustrated in FIGS. 6A to 6B, a top surface of an member 207 may form one flat surface together with an exposed region of a first display 201 and a region of a second display 203. For example, no step may be formed between one surface of a member 207, a surface of a second display 203, and a surface of a first display 201. Therefore, it may look to a user as if the electronic device 101 includes a single display. Hereinafter, embodiments of the member 207 will be described.

For example, as shown in reference numeral 601, the member 207 may be provided to a third structure 230. The member 207 may be provided to be attached to one surface of the fourth structure 330, which is disposed in the third structure 230 and is adjacent to the first display 201, a surface of the top wall of the third structure 230, and a side surface of the second display 203. At least a portion of the bottom surface of the member 207 may be configured to have a curvature corresponding to the curvature of a bent region of the first display 201.

In another example, as shown in reference numeral 602 in FIG. 6A, the member 207 may be formed to extend from the second display 203. For example, the second display 203 may include: a region including elements for the display; and a region including the member 207. The region of the second display 203, including the member 207, may extend without being supported by the top surface of the third structure 230.

In another example, as shown in reference numeral 603 in FIG. 6A, the member 207 may be a flat member, and may be implemented so as to be coupled to and supported by the first structure 210 or the third structure 230 in the space 202 between the first display 201 and the second display 203.

Hereinafter, various features of the member 207 will be described.

According to various embodiments, the member 207 may have a surface (e.g., a bottom surface) facing a received region of the first display 201. For example, as illustrated in FIG. 6A, the member 207 may have a bottom surface having a curvature corresponding to the curvature of a region of the first display 201, which corresponds to the roller 320 and is connected to an exposed region of the first display 201. As is described below, when the electronic device 101 outputs light to a region of the first display 201 corresponding to the bottom surface of the member 207, the light may be diffused by the member 207, and thus may be visible to a user. Members coming into contact with the upper surface of the first display 201 may be provided on the bottom surface of the member 207. The members may include a member having air gaps, as shown in reference numeral 411 in FIG. 4, and a brush member having a brush shape, as illustrated in reference numeral 412 in FIG. 4.

According to various embodiments, the member 207 may include a light-blocking region. The light-blocking region may be a region containing a material having optical properties to block light. The material may include paint applicable to the surface of an optical member, or a liquid or powdered material addable into an optical member. Therefore, light incident to the member 207 may be blocked by the light-blocking region of the member 207. Unlike the light-blocking region, a region, which does not include any paint and does not block light, may be defined as a light penetration region (or, a light-receiving region). According to an embodiment, at least a partial region of the member 207 may be formed as a light-blocking region. For example, only a partial region of a region of the member 207 facing the first display 201 may be implemented as a light-blocking region, and the remaining region thereof may be implemented as a light penetration region. Thus, in the case of the member 207, light may be blocked by paint at the partial portion of the region of the member 207 facing the first display 201, and may be incident into the member 207 only through the remaining region thereof. Therefore, only light received through the remaining region of the member 207 may be diffused by the member 207. When light received through the partial region is blocked as described above, the amount of light incident to the optical member 207 is limited, and thus a light-leakage phenomenon may be prevented. The electronic device 101 may identify a particular region of the first display 201 corresponding to the light penetration region of the member 207 and may output light onto the identified particular region. A description thereof will be made later with reference to FIGS. 45 to 54. In another example, a portion of the member 207, coming in contact with the third structure, may be implemented as a light-blocking region. Therefore, light output from the second display 203 may not be incident to the member 207. Further, without being limited to the description, in the member 207, a portion coming in the second structure may be implemented as a light penetration region, and a portion facing a light-blocking region. Therefore, light output through the second display 203 may be incident to the member 207 and diffused, and may thus be visible to a user.

Hereinafter, an example of an element of the electronic device 101, configured to move the member 207, will be described with reference to FIG. 6B.

FIG. 6B is a view for describing an example of members for moving a member provided in an electronic device according to various embodiments.

According to various embodiments, when sliding of the first display 201 is detected, the electronic device 101 may move the member 207 upward to further ensure a space for movement of the first display 201 between the first display 201 and the member 207.

For example, as illustrated in FIG. 6B, an electronic device 101 may further include moving members (e.g., a servo motor 610 and a groove 611 formed on the member 207) configured to move the member 207 disposed between a first display 201 and a second display 203. The servo motor 610 may rotate in one direction, and may include a handle configured to move the member 207. The member 207 may have a portion in which the groove 611 to be connected to the handle is formed, and a partial region of the fourth structure 330 may be open such that the portion in which the groove 611 is formed moves. Therefore, when the servo motor 610 rotates the handle in one direction (e.g., a counterclockwise direction), the portion in which the groove 611 is formed may move upward, and thus the member 207 may move upward.

According to various embodiments, referring to FIG. 6B, the moving members (e.g., a servo motor 610 and a groove 611 formed on the member 207) configured to move the member 207 may operate in cooperation with the above-described moving member (e.g., the servo motor 331) configured to move the fourth structure 330. For example, the servo motor 331 (hereinafter, referred to as a first servo motor) configured to move the fourth structure 330 may further include a handle for rotating the servo motor 610 (hereinafter, referred to as a second servo motor) configured to move the member 207. When the first servo motor 331 rotates the further included handle in one direction (e.g., a clockwise direction), the handle included in the second servo motor 610 rotates in an opposite direction (e.g., a counterclockwise direction), and thus the member 207 may move upward. Therefore, referring to FIG. 6B, when the first display 201 moves, the space between the member 207 and the first display 201 in addition to the space between the fourth structure 330 and the first display 201 may become larger, and thus the first display 201 may slide more smoothly.

Hereinafter, an example of each of the elements included in the electronic device 101, described above with reference to FIGS. 1 to 6B, will be described with reference to FIGS. 7A to 7C.

Figure 7A:
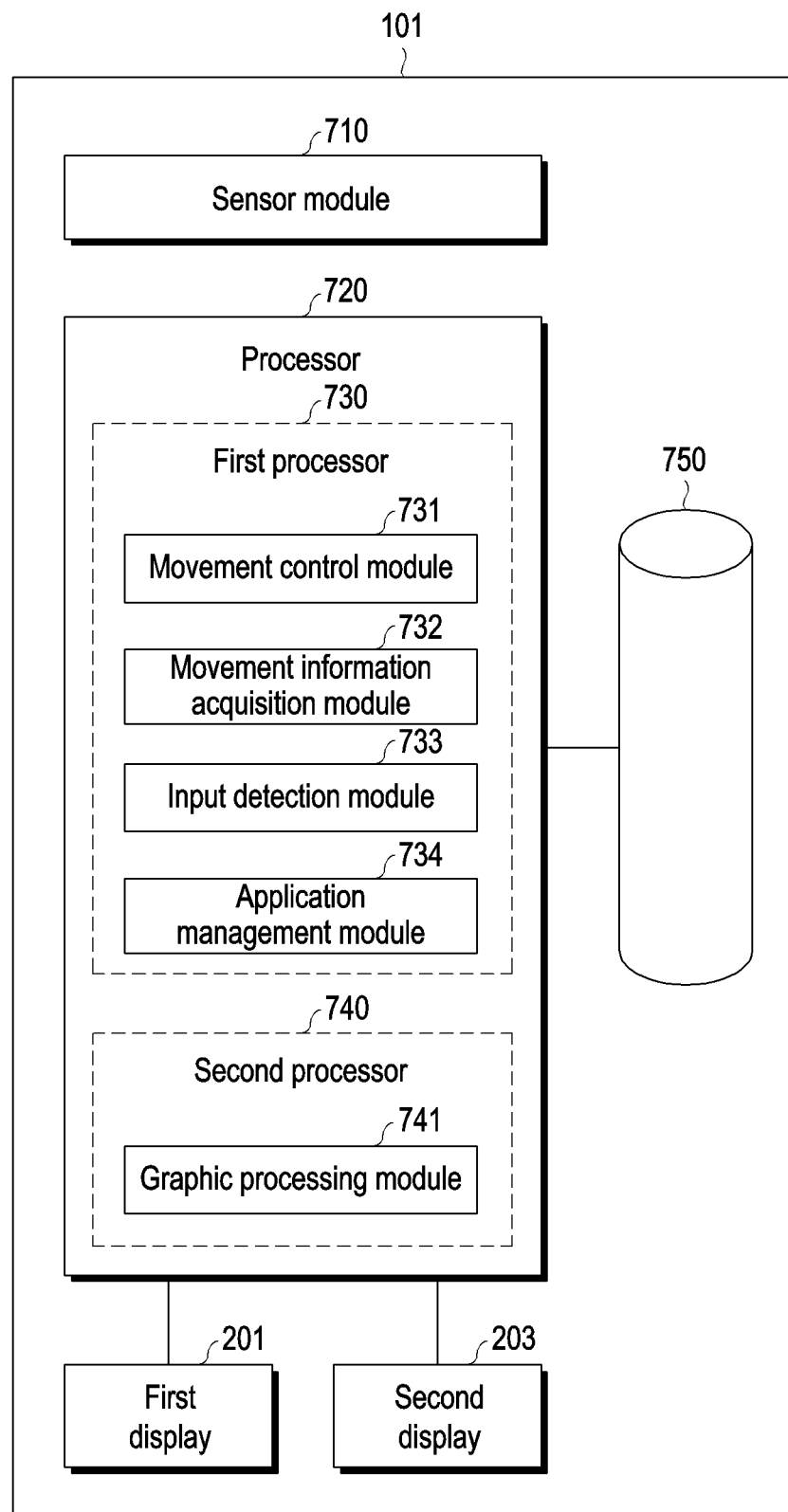
FIG. 7A is a view for describing an example of a configuration of an electronic device according to various embodiments.
Figure 7B:
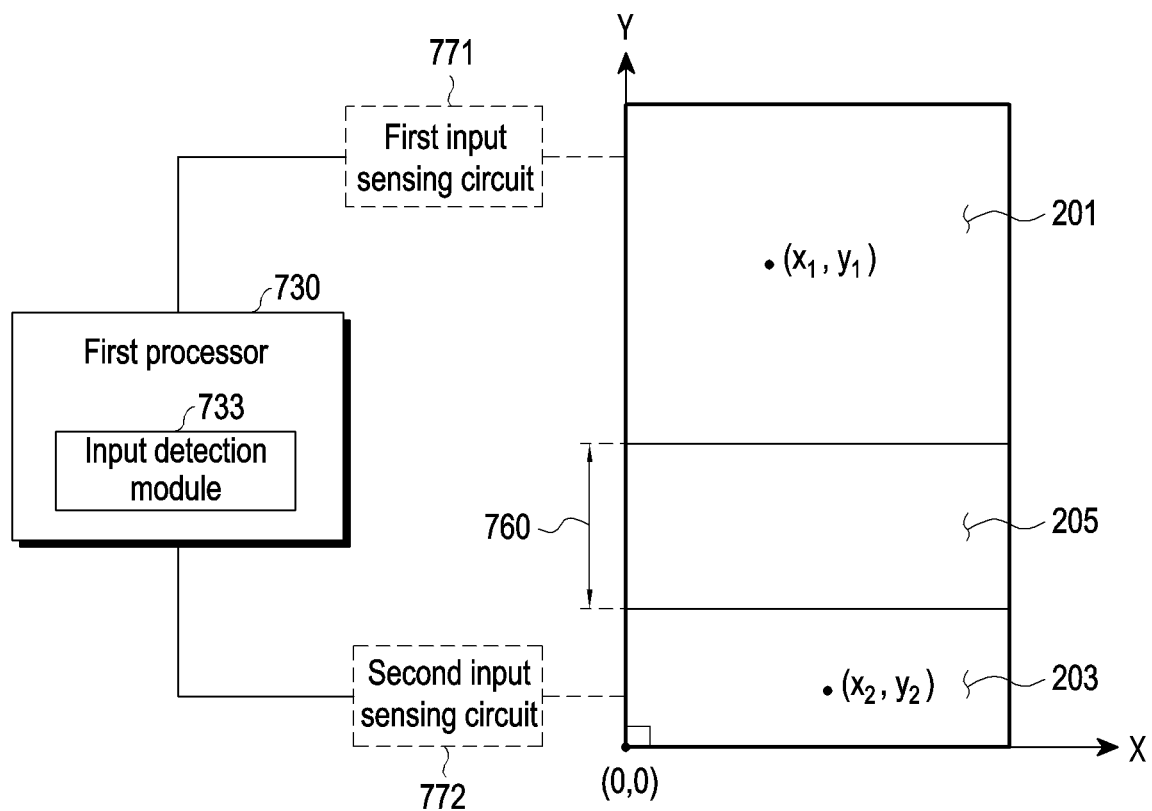
FIG. 7B is a view for describing an example in which an input detection module of an electronic device according to various embodiments detects touches on a plurality of displays (e.g., a first display and a second display)
Figure 7C:
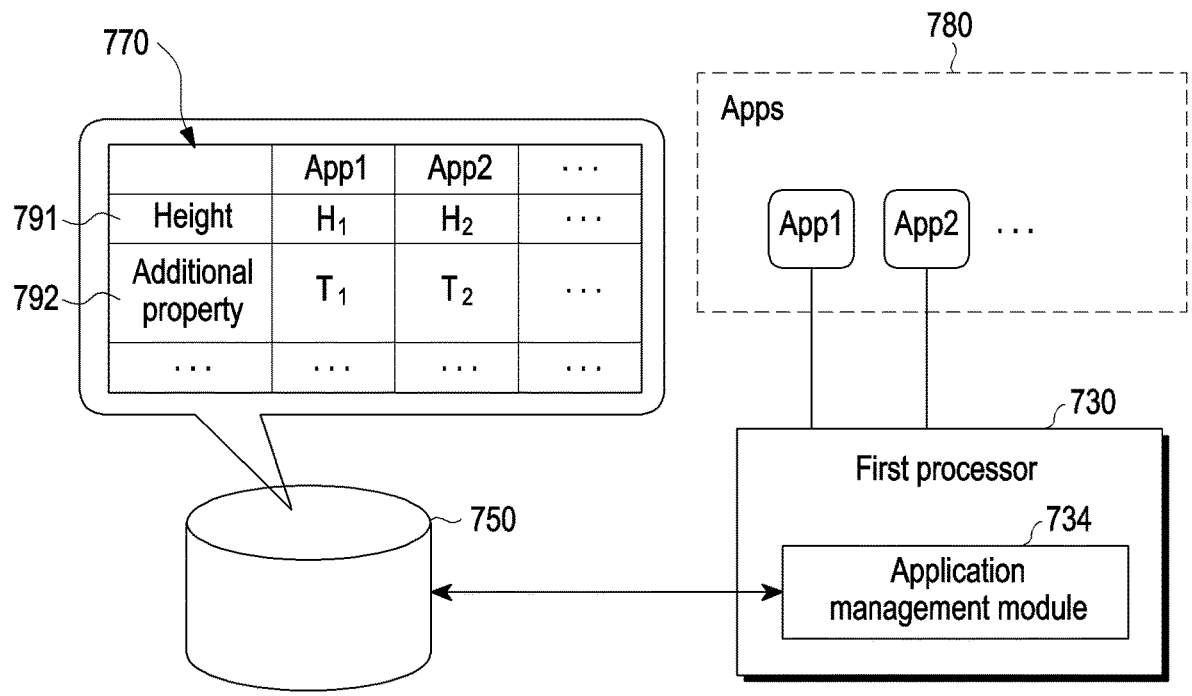
FIG. 7C is a view for describing an example of an operation of an application management module of an electronic device according to various embodiments.

FIG. 7A is a view for describing an example of a configuration of an electronic device according to various embodiments. FIG. 7B is a view for describing an example in which an input detection module of an electronic device according to various embodiments detects touches on a plurality of displays (e.g., a first display and a second display). FIG. 7C is a view for describing an example of an operation of an application management module of an electronic device according to various embodiments.

According to various embodiments, the electronic device 101 may include: a sensor module 710; a processor 720, which includes a first processor 730, including a movement control module 731, a movement information acquisition module 732, an input detection module 733, and an application management module 734, and a second processor 740 including a graphic processing module 741; a memory 750; the first display 201; and the second display 203. According to various embodiments, at least some of the modules (e.g., the movement control module 731, the movement information acquisition module 732, the input detection module 733, the application management module 734) included in the processor 720 (e.g., the first processor 730 and the second processor 740) of the electronic device 101 (e.g., the electronic device 101 illustrated in FIGS. 1 to 6B) may be implemented (e.g., executed) as software, firmware, hardware, or a combination of two or more thereof. For example, the modules may be stored in the electronic device 101 (e.g., the memory 750) in the forms of applications, programs, computer codes, or instructions, which can be executed by the processor 720 of the electronic device 101 (e.g., the electronic device 101 illustrated in each of FIGS. 1 to 4), routines, or processors. When the modules are executed by the processor 720, the modules may cause the processor 720 to perform operations related to the modules. Hereinafter, each element included in the electronic device 101 will be described.

First, the sensor module 710 will be described.

According to various embodiments, a sensor module 710 may include at least one sensor. The at least one sensor, when the first display 201 slides (e.g., slides in or slides out), may sense the sliding of the first display 201 and may return an electrical value (e.g., a current value and/or a voltage value) indicating the state of sliding. The processor 720 (e.g., the first processor 730), which will be described below, may obtain the electrical value to identify a sliding-related state. For example, the sliding-related state may include at least one among the start or end of sliding of the first display 201, the state of the electronic device 101 based on sliding (e.g., an open state, a closed state, or an intermediate state), or a sliding distance. In an example, the at least one sensor may be implemented as a sensor (e.g., an image sensor or an optical sensor) configured to detect a particular content (e.g., RGB colors) displayed a partial region of a received portion of the first display 201, and when the first display 201 moves, may identify that the state of detection of the particular content is changed (e.g., the content is moved or is not displayed) and may return an electrical value indicating the start of sliding. When sliding ends, the electronic device 101 may redisplay the particular content in the partial region of the received portion of the first display 201, and the at least one sensor may detect the redisplayed content and may return an electrical value indicating the end of sliding. In another example, the at least one sensor may include a sensor configured to detect an electromagnet attached when sliding of the first display 201 starts or ends, and when the sliding starts or ends, may return an electrical value that indicates the start or end of sliding. In another example, the at least one sensor may be implemented as a sensor (e.g., a pressure sensor, a resistance sensor, etc.) configured to sense a dielectric material moving at the time of sliding of the first display 201, and may return an electrical value indicating a sliding distance, based on the distance of movement of the dielectric material.

Without being limited to the description, instead of receiving a value from the at least one sensor, the electronic device 101 may identify the above-described state related to sliding of the first display 201, based on a signal for controlling a motor configured to rotate a roller (e.g., roller 320) of the movement control module 731 which will be described below.

Hereinafter, the processor 720 will be described. The processor 720 may overall control operations of the electronic device 101. For example, the processor 720 may be an application processor (AP). The processor 720 may include processors (e.g., the first processor 730 and the second processor 740) which are configured to perform different functions. For example, the first processor 730 included in the processor 720 may be a central processing unit (CPU), and the second processor 740 maybe a graphic processing unit (GPU). Without being limited to the description, the processor 720 may not include the plurality of processors (e.g., the first processor 730 and the second processor 740). For example, the processor 720 may not include separate processors and may be configured to include all of the modules (e.g., the movement control module 731, the movement information acquisition module 732, the input detection module 733, the application management module 734, and the graphic processing module 741) which are included in the first processor 730 and the second processor 740, and may be configured to perform overall operations based on the modules.

Hereinafter, the modules included in the first processor 730 will be described. The first processor 730 may identify/obtain/analyze, according to driving of the electronic device 101, a predetermined type of information (e.g., an electrical value indicating a state related to sliding and received from at least one sensor, or a content obtained through execution of an application or a program), and may overall control operations of the elements (e.g., a motor and displays) of the electronic device 101.

According to various embodiments, the movement control module 731 may control sliding (e.g., sliding-out and sliding-in) of the first display 201. For example, the movement control module 731 may identify the occurrence of an event causing sliding of the first display 201, and may cause the first display 201 to slide (e.g., may control the motor configured to rotate the roller 320), based on the identification of the occurred event. The event causing the sliding may include turning on/off of the electronic device 101, user input reception (e.g., a user input on a key which is physically or electronically implemented and causes a sliding operation), or other predetermined events (e.g., the execution of an application, which will be described below, etc.). The movement control module 731 may identify, based on an event causing sliding, at least one of information about the type of sliding corresponding to the event (e.g., a slide-out or slide-in operation) or information about a length (or distance) to slide, and may control, based on the identified information, the motor to rotate the roller 320. For example, the movement control module 731 may transfer, to the motor, a signal for driving the motor by the number of rotations that corresponds to a length to slide in a direction corresponding to the identified type of sliding. Therefore, the motor may rotate by the number of rotations, and thus the first display 201 may slide by the length to slide. In another example, the movement control module 731 may rotate the motor in a direction corresponding to the identified type of sliding, may detect, in real time, the distance that the flexible display is moved by the rotation of the motor (e.g., may calculate the distance based on a value identified by the at least one sensor), and when the distance detected in real time reaches the distance to move, may stop the driving of the motor.

According to various embodiments, when the first display 201 slides, the movement information acquisition module 732 may identify information about the sliding of the first display 201. The information related to the sliding may include information about a time related to sliding of the first display 201 (e.g., a sliding start time point, or a sliding time), information about a distance (or length) related to sliding of the first display 201, and the type of sliding of the first display 201 (e.g., sliding-out (drawing-out), or sliding-in (drawing-in)). The movement information acquisition module 732 may obtain a state related of the sliding on the basis of an electrical value received from the at least one sensor, and may identify the information about the sliding. Without being limited to the description, as described above, the processor (e.g., the first processor 730) may identify the information of sliding of the first display 201 from the signal through which the movement control module 731 controls the motor.

According to various embodiments, the input detection module 733 may detect inputs (e.g., a user input) received on the plurality of displays (e.g., the first display 201 and the second display 203) of the electronic device 101. The input detection module 733 may identify one piece of information (e.g., the type of a user input, or an operation to be performed in the electronic device 101) by collecting information about each of inputs received on the displays (e.g., attribute information which will be described below). Hereinafter, an example of an operation of the input detection module 733 will be described.

For example, the input detection module 733 may obtain information about attributes of inputs received on the plurality of displays, and may identify the type of received user input on the basis of the obtained information about attributes. The attribute of an input may include an input position, an input reception time, and input sensitivity (e.g., pressure sensitivity). The type of the user input may include a user input which is at least one among a touch input, a tap input, a double-tap input, a long-tap input, a panning input, a scroll input, a rotate input, a drag input, a touch-up input, a pinch input, a swipe input, or a hovering input. For example, as illustrated FIG. 7B, an input detection module 733 may receive values (or information) indicating an attribute of a user's touch inputs which a first display 201 and a second display 203 receive from a first input sensing circuit 771 implemented in a first display 201 and a second input sensing circuit 772 implemented in the second display 203, respectively. Each of the input sensing circuits (e.g., the first input sensing circuit 771 and the second input sensing circuit 772) may include a capacitive-type or resistive-type touch sensor circuit on the front surface of each display (e.g., each of the first display 201 and the second display 203) and configured to sense a touch, or pressure sensor circuit configured to sense the pressure of a touch, and may return electrical values indicating attributes of a user input received on each display. Only a portion of the input sensing circuit of the first display 201, which corresponds to a region of the first display 201 exposed to the outside, may be turned on (or activated), and may return a value based on a user input received on the exposed region of the first display 201. The input detection module 733 may identify a single event on the basis of attributes related to inputs detected from the first display 201 and the second display 203. For example, the input detection module 733 may integrate attributes related to inputs detected from the displays, and may identify the integrated attributes. In an example, the input detection module 733 may integrate pieces of information related to positions of inputs detected from the displays, and may identify integrated information about the inputs. For example, the input detection module 733 may identify coordinate values of inputs received on the displays (e.g., the first display 201 and the second display 203) as values of coordinate systems related to each other. For example, as illustrated in FIG. 7B, the input detection module 733 may integrate a coordinate system indicating a position on the first display 201 and a coordinate system indicating a position on the second display 203 into a coordinate system indicating a position on a single display, and may identify the integrated coordinate system. For example, the integrated coordinate system may be a coordinate system which includes coordinates in the x-axis direction (e.g., the width direction or transverse direction) and coordinates in the y-axis direction (e.g., the lengthwise direction or longitudinal direction). The electronic device 101 may configure coordinates of the rightmost lower end of the second display 203 as reference coordinates (e.g., the origin (0,0)). Therefore, the electronic device 101 may identify, based on information about a position identified in the integrated coordinate system, the type of a user input currently received through the first display 201 and the second display 203. When comparing the position of an input received on the first display 201 with the position of an input received on the second display 203, the electronic device 101 may refer to and further reflect (e.g., subtract) coordinates 706 of the drawn-in (i.e., unexposed) region 205 of the first display 201. A description thereof will be made later with reference to FIGS. 27 and 28.

According to various embodiments, the application management module 734 may manage and control a plurality of applications. For example, the application management module 734 may manage and/or store information related to the plurality of applications 780 (e.g., information about the lengths of applications), and may perform control such that the plurality of applications 780 are executed based on the information related to the plurality of applications. The plurality of applications 780 managed and/or controlled by the application management module 734 may include various applications such as an application installed in the electronic device 101, an application which is not installed in the electronic device 101, an application executed in a particular mode (e.g., a foreground mode or a background mode), and an application which is not executed in the particular mode. As illustrated in FIG. 7C, an application management module 734 may manage information 770 related to a plurality of applications 780. The information 770 related to the plurality of applications 780 may include information 791 (e.g., H1 and H2) about the length of a particular application, application attribution information 792 (e.g., information about the type of application (e.g., T1 and T2)), and information about the length of an application execution screen corresponding thereto, and may be pre-stored in the memory 750. When an execution screen (or view) of the application is displayed, the information 791 about the length of the application may indicate the length of the execution screen in the longitudinal direction in which the execution screen is displayed. The application attribute information 792, which are various types of information related to an application, may include, for example, information indicating the type of application. The electronic device may set and pre-store a length for each piece of the application attribute information 792, and may identify the application attribute information 792 rather than the information 791 about the length of the application to identify a pre-stored length corresponding thereto. The application management module 734 may provide an interface for executing the plurality of applications. For example, the application management module 734 may display a screen which includes the plurality of icons for executing the plurality of applications 780. When a particular application is executed using the application management module 734, the application management module 734 may identify information about the length of the executed application, and may control the first display 201 to slide by a length (or a distance) corresponding to the information about the length.

According to various embodiments, information managed by the application management module 734 may be adjusted by a user. For example, applications, which can be executed by the application management module 734, may be selected by the user. In another example, information about the length of an application, managed by the application management module 734, may be adjusted.

The application management module 734 may be implemented in the form of an application or a program, and may provide the above-described functions when the application management module 734 is executed. Alternatively, the application management module 734 may be implemented as a function (e.g., a particular menu item) provided by a particular application (e.g., a setting application).

Hereinafter, the modules included in the second processor 740 will be described.

According to various embodiments, the graphic processing module 741 may cause each of the first display 201 and the second display 203 to display a content. The content may include various types of information which can be displayed on the display through execution and/or driving of an application or a program. For example, the content may include a variety of visual contents such as an image and video. In another example, the content may include an execution screen (e.g., view) of various applications (e.g., a camera application, a screen recording application, a word processing application (e.g., note and/or memo application), a screen capturing application, a gallery application, a file management application, and a web application). The execution screen and/or screen may include at least one graphic element (e.g., a graphic user element (GUI)), and may include a region for providing information (e.g., a video, an image, text, note, webpage, etc.) obtained based on driving of an application and/or a program. The graphic processing module 741 may obtain the above-described content to be displayed by execution of an application or a program (e.g., media or a screen), and may identify, based on the obtained content, a first content to be displayed on the first display 201 and a second content to be displayed on the second display 203. The graphic processing module 741 may transfer information about the respective contents (e.g., the first content and the second content) (e.g., coordinate information and a color value of a content for each pixel) to the respective displays (e.g., the first display 201 and the second display 203). A display driver IC (DDI) (not shown) included in each of the displays (e.g., the first display 201 and the second display 203) may display the content on each of the displays (e.g., may display a color value at a position (pixel) corresponding to coordinate information) on the basis of the information about the content (e.g., coordinate information and a color value of a content for each pixel). The DDI may operate in the same manner as a widely known technology, and a detailed description thereof will be omitted. Without being limited to the description, a single DDI configured to control both the first display 201 and the second display 203 may be provided. An operation in which the electronic device 101 (e.g., the graphic processing module 741) identifies a content to be displayed on each of the displays and displays the identified content on the display will be described later with reference to FIGS. 13 to 16.

Without being limited to FIG. 7A, the first processor 730 and the second processor 740 may not be implemented as separate elements but may be implemented as a single element. For example, the graphic processing module 741 of the second processor 740 may be implemented inside the first processor 730.

Hereinafter, examples of operations of the electronic device 101 according to various embodiments will be described. Hereinafter, for ease of description, it may be illustrated or described that the space 202 is formed between the first display 201 and the second display 203, but, as illustrated in FIG. 6A, the member 207 (e.g., metal, plastic, or an optical member) may be disposed between the first display 201 and the second display 203. In contrast, hereinafter, it may be illustrated or described that the member 207 is disposed between the first display 201 and the second display 203, but the space 202 may be formed between the first display 201 and the second display 203.

Hereinafter, a description will be made of an example of an operation of the electronic device 101 according to various embodiments.

According to various embodiments, the electronic device 101 may move the position of the fourth structure 330 on the basis of the occurrence of an event for ensuring a space between the first display 201 and the fourth structure 330 included in the third structure 230.

Figure 8:
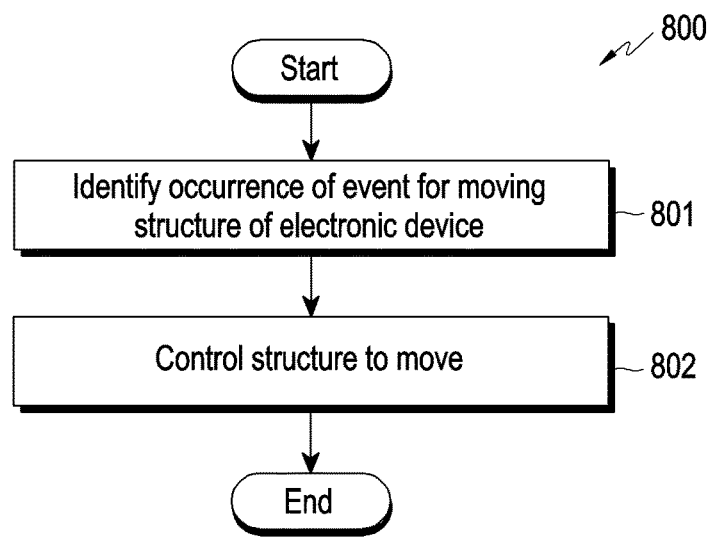
FIG. 8 is a flowchart for describing an example of an operation of an electronic device according to various embodiments.

FIG. 8 is a flowchart for describing an example of an operation of an electronic device according to various embodiments. Referring to FIG. 8 depicting flowchart 800, according to various embodiments, operations illustrated in FIG. 8 may be performed in various orders without being limited to the illustrated order. Further, according to various embodiments, operations, which is more numerous than the operations illustrated in FIG. 8, may be performed or at least one operation, which is fewer than the operations illustrated in FIG. 8, may be performed. Hereinafter, FIG. 8 will be described with reference to FIGS. 9A and 9B.

Figure 9A:
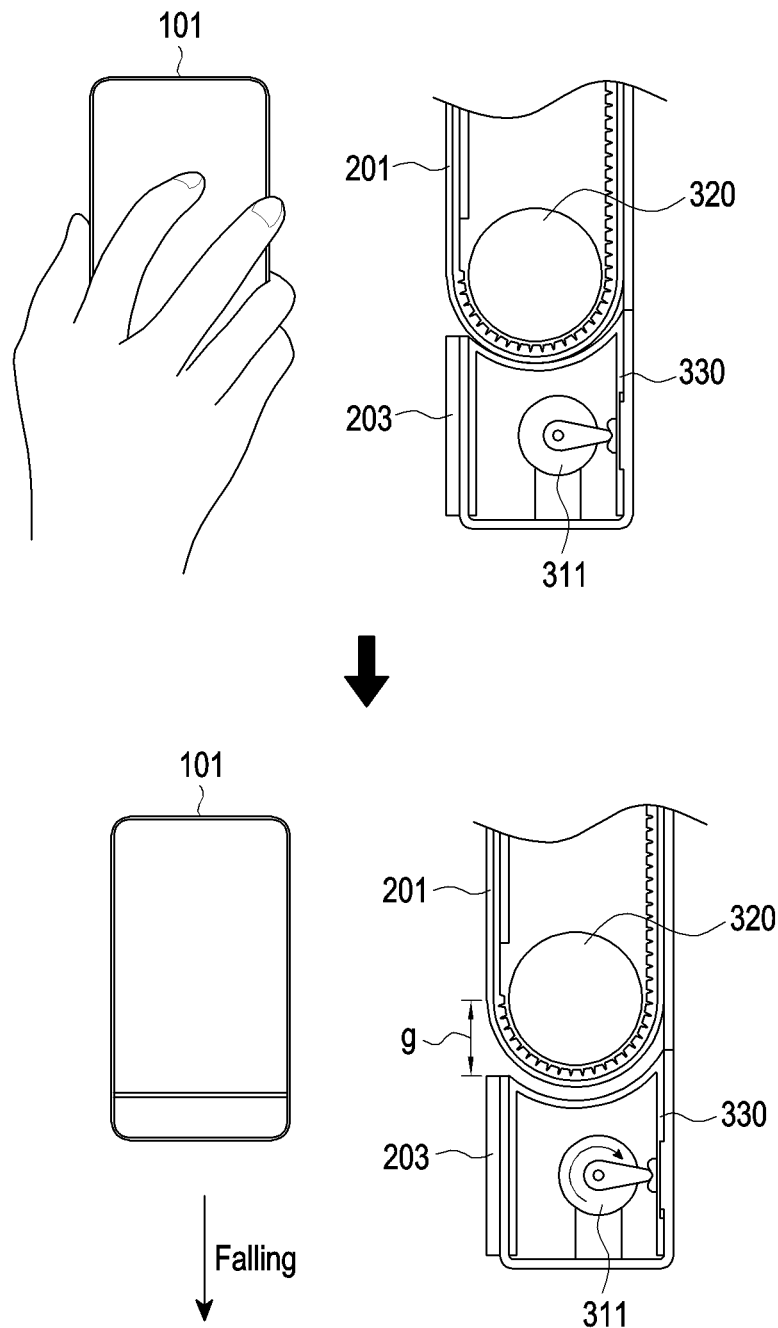
FIG. 9A is a view for describing an example in which an electronic device according to various embodiments moves a position of a fourth structure when the electronic device falls.
Figure 9B:
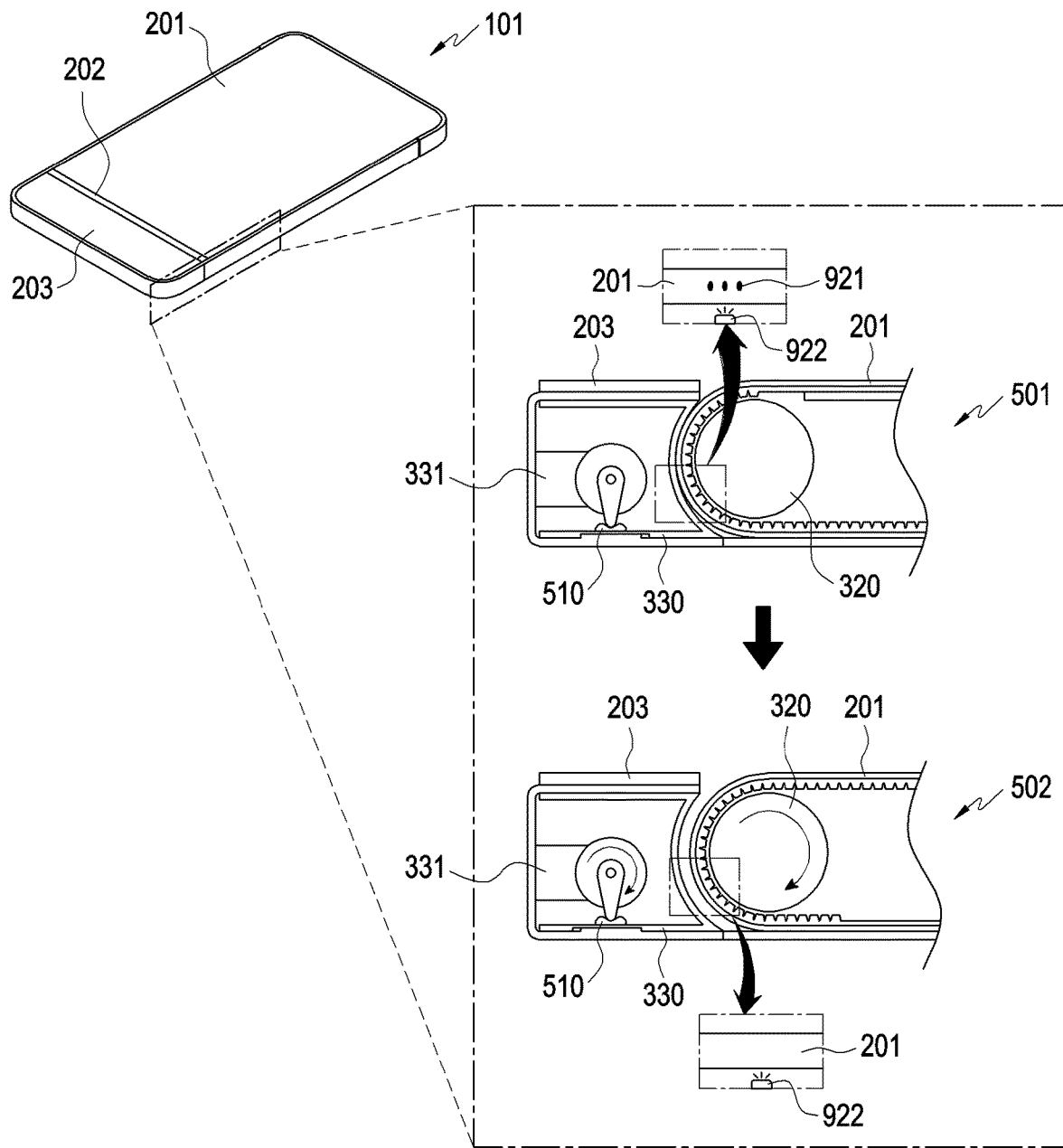
FIG. 9B is a view for describing an example in which an electronic device according to various embodiments moves a position of a fourth structure when a first display slides.

FIG. 9A is a view for describing an example in which an electronic device according to various embodiments moves a position of a fourth structure when an electronic device falls. FIG. 9B is a view for describing an example in which an electronic device according to various embodiments moves a position of a fourth structure when a first display slides. Referring to FIG. 9B, it is illustrated that a space is formed between a first display 201 and a second display 203, but without being limited to FIG. 9B, as illustrated in 6A, a member 207 (e.g., metal, plastic, an optical member) may be disposed therebetween.

According to various embodiments, in operation 801, the electronic device 101 may identify the occurrence of an event for moving a structure (e.g., the fourth structure 330) of the electronic device. For example, the event may include an event requiring to ensure a space between the first display 201 and the fourth structure 330 disposed adjacent to a received region (e.g., a region corresponding to the roller 320) of the first display 201, such as falling of the electronic device 101 or a start of movement of the first display 201. The fourth structure 330 has been described with reference to FIGS. 3A to 6B, and thus a redundant description thereof will be omitted. In an example, as illustrated in FIG. 9A, when falling of an electronic device 101 is detected, the electronic device may start movement of a fourth structure 330. The electronic device 101 may detect the falling thereof by using a gyro sensor or a motion sensor. In another example, as illustrated in FIG. 9B, the electronic device may detect sliding of the first display 201 by using at least one sensor (e.g., a photosensor 922). The electronic device 101 may use the at least one sensor (e.g., a photosensor 922) illustrated in FIG. 7A to identify (e.g., numeral numbers 901 and 902) whether a particular content 921 is displayed in a received region of the first display 201, thereby detecting sliding.

According to various embodiments, in operation 802, the electronic device 101 may perform control such that the structure (e.g., the fourth structure) is moved. For example, as illustrated in FIGS. 9A and 9B, in the electronic device, when a handle included in the servo motor 331 is rotated in one direction (e.g., a clockwise direction) by driving of the servo motor 331, external force may be applied to a groove 510 of the fourth structure 330 in a direction (e.g., a leftward direction) corresponding to the one direction, and thus the fourth structure 330 may be moved downward. Therefore, the fourth structure 330 is spaced apart from the first display 201, and thus a space (g) may be formed between the fourth structure 330 and the first display 201. Thanks to the formed space (g), impact on the first display 201 at the time of falling may be reduced, and sliding of the first display 201 may be smoothly performed.

Hereinafter, a description will be made of another example of an operation of the electronic device 101 according to various embodiments.

According to various embodiments, the electronic device 101 may perform at least one operation on the basis of inputs (e.g., touch inputs by a user) received through the plurality of displays (e.g., the first display 201 and the second display 203).

Figure 10:
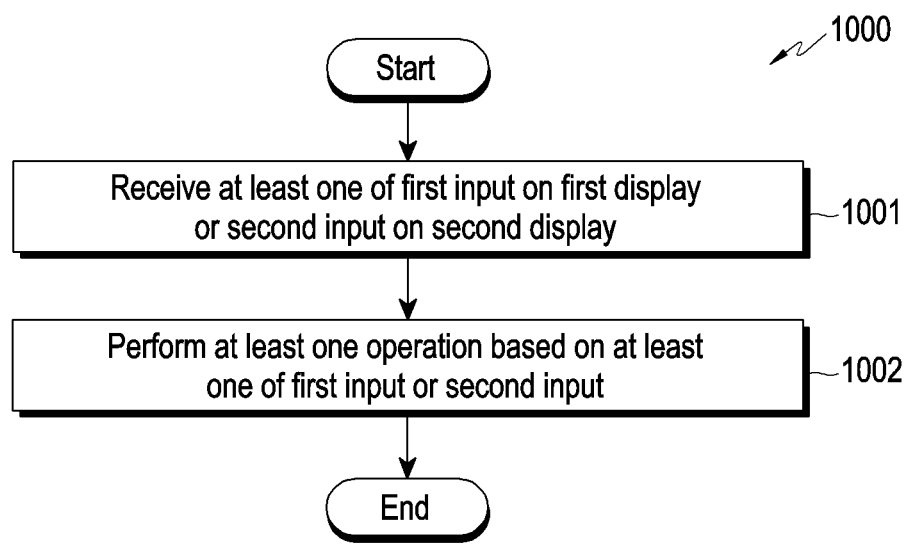
FIG. 10 is a flowchart for describing an example of an operation of an electronic device according to various embodiments.

FIG. 10 is a flowchart for describing an example of an operation of an electronic device according to a various embodiments. Referring to FIG. 10, depicting flowchart 1000, according to various embodiments, operations illustrated in FIG. 10 may be performed in various orders without being limited to the illustrated order. Further, according to various embodiments, operations, which are more numerous than the operations illustrated in FIG. 10, may be performed or at least one operation, which is fewer than the operations illustrated in FIG. 10, may be performed. Hereinafter, the operations in FIG. 10 will be described with reference to FIGS. 11 and 12.

Figure 11:
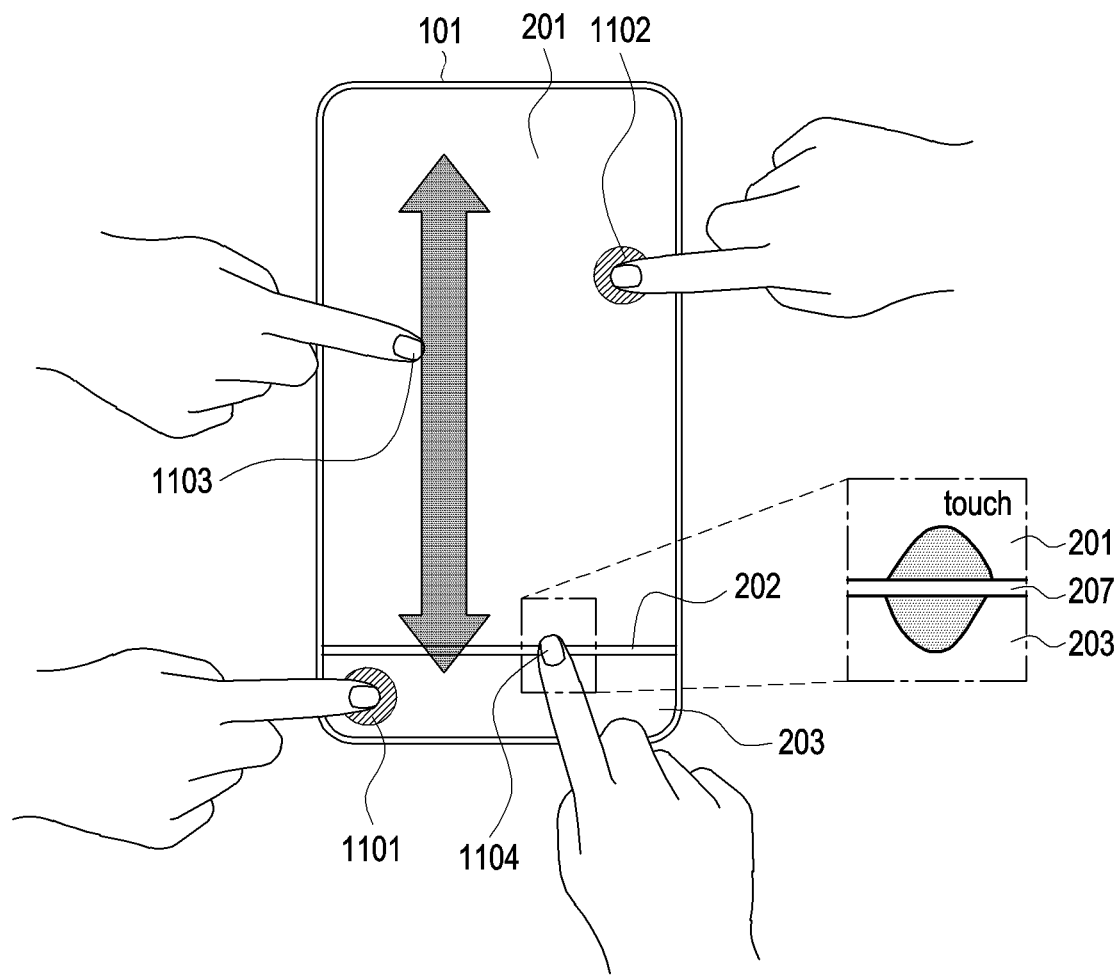
FIG. 11 is a view for describing examples of touch inputs received by an electronic device according to various embodiments.
Figure 12:
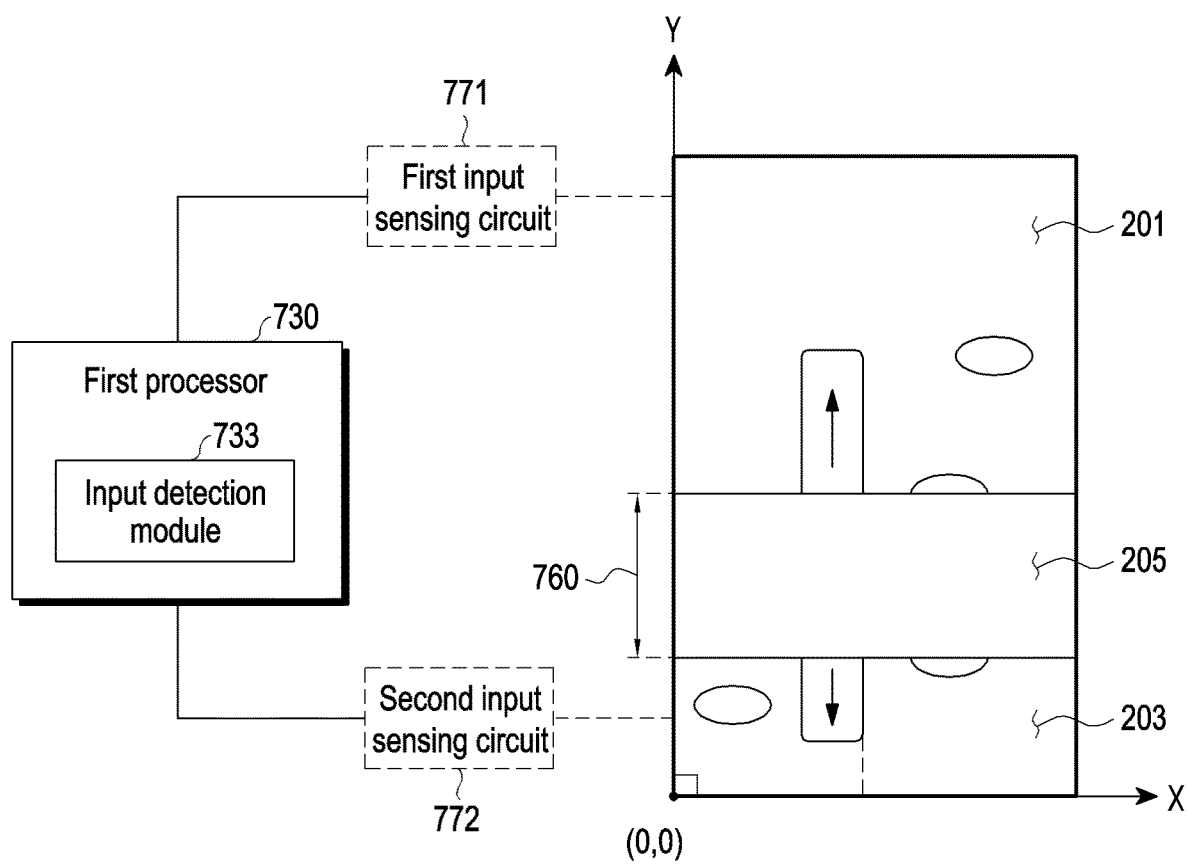
FIG. 12 is a view for describing an example in which an electronic device according to various embodiments detects a received touch input.

FIG. 11 is a view for describing examples of touch inputs received by an electronic device according to various embodiments. FIG. 12 is a view for describing an example in which an electronic device according to various embodiments detects a received touch input. Referring to FIG. 11, it is illustrated that a member 207 is disposed between a first display 201 and a second display 203, but a space 202 may be formed therebetween without being limited to FIG. 11.

According to various embodiments, in operation 1001, the electronic device 101 may receive at least one of a first input on the first display 201 or a second input on the second display 203. For example, as illustrated in FIG. 11, the electronic device 101 may receive (1103) an input (a user's touch) on the first display 201, may receive (1101) an input (a user's touch) on the second display 203, or may receive (1102 and 1104) inputs on the first display 201 and the second display 203. A single input received through each of the first display 201 or the second display 203 may be defined as a single input (e.g., a single touch input), and inputs received through the first display 201 and the second display 203 may be defined as multi-input (e.g., multi-touch input). In an example, when the user touches the member 207 by using a part of the user's body, at least a portion of the part of the user's body may simultaneously touch the first display 201 and the second display 203 together, in addition to touching the region of the member 207. Inputs received on the first display 201 and the second display 203 may be received onto the first display 201 and the second display 203 with various attributes (e.g., a time point and a position). For example, inputs received on the first display 201 and the second display 203 may be received at reception time points (or times) that are different from or correspond to each other, or may be received at positions that are related or unrelated to each other. The electronic device 101 may perform different operations based on different attributes of inputs received on the first display 201 and the second display 203, and a description thereof will be made later with reference to FIGS. 27 to 28. In addition to the described example, the electronic device 101 may receive inputs on keys (e.g., pressing of keys) which are physically implemented in the electronic device 101.

According to various embodiments, in operation 1002, the electronic device 101 may perform at least one operation based on at least one of the first input or the second input. For example, as illustrated in FIG. 12, an electronic device 101 (e.g., an input detection module 733 of a first processor 730) may identify, based on values received from sensing circuits (e.g., a first input sensing circuit 771 and a second input sensing circuit 772) implemented in the respective displays, information about attributes (e.g., an input reception position (or coordinates), an input reception time point, and input sensitivity), and may perform at least one operation on the basis of the identified information about attributes. The electronic device 101 may collect pieces of information about attributes (e.g., reception positions, reception time points, and sensitivity) of the received inputs (e.g., the first input and the second input), and may identify at least one operation that is to be performed in response to the inputs. For example, as illustrated in FIG. 12, the electronic device 101 may identify positions (e.g. coordinates) of inputs received on the first display 201 and the second display 203 in a single integrated coordinate system. The electronic device 101 may identify coordinates of each of the inputs (e.g., the first input and the second input) in consideration of coordinates 760 of a received region of the first display 201. The operation in which the electronic device 101 identifies the position of each of the inputs by using the integrated coordinate system may be performed like the operation of the input detection module 733 described in FIG. 7A, and thus a redundant description thereof will be omitted. In an example, the electronic device 101 may display a particular screen for providing at least one service (e.g., a home screen, an application execution screen, an unlocking screen). The particular screen may include objects (e.g., a graphic user interface (GUI) element) configured to provide at least one service. The electronic device 101 may identify, based on attributes of the inputs, a control event (e.g., selection or drag movement) for the objects included in the particular screen, and may perform at least one corresponding to the object control. In an example, when a user's touch is received on the first display 201, the electronic device 101 may identify, based on a value received from the first input sensing circuit 771, one attribute (e.g., reception of a single touch at a first coordinate of the first display 201), may select an object related to the identified one attribute (e.g., the first coordinate) (e.g., a first object for executing a first application located at a first position), and may provide at least one service related to the selected objected (e.g., may execute the first application). Likewise, when a user's touch is received on the second display 203, the electronic device 101 may provide a service corresponding to an attribute of the touch received on the second display 203. In another example, when the user's touch is received on the first display 201 and the second display 203, the electronic device 101 may perform at least one operation based on attributes (e.g., position) of multi-touch. An operation of the electronic device 101 based on various types of multi-touch will be described.

The above-described examples in which the electronic device 101 provides various services based on user inputs received on the first display 201 or the second display 203 will be further described below.

Hereinafter, a description will be made of an example of an operation of the electronic device 101 according to various embodiments.

According to various embodiments, the electronic device 101 may obtain, based on inputs received through a plurality of displays (e.g., the first display 201 and the second display 203), contents to be displayed, and may display the content on each of the plurality of displays.

Figure 13:
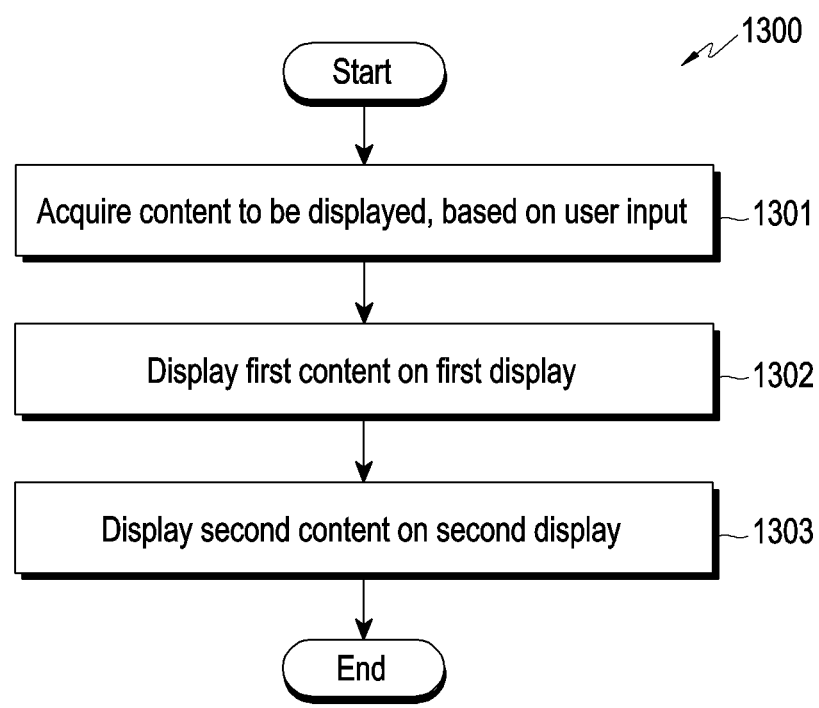
FIG. 13 is a flowchart for describing an example of an operation of an electronic device according to various embodiments.

FIG. 13 is a flowchart for describing an example of an operation of an electronic device according to various embodiments. Referring to FIG. 13, depicting flowchart 1300, according to various embodiments, operations illustrated in FIG. 13 may be performed in various orders without being limited to the illustrated order. Further, according to various embodiments, operations, which are more numerous than the operations illustrated in FIG. 13, may be performed or at least one operation, which is fewer than the operations illustrated in FIG. 13, may be performed. Hereinafter, the operations in FIG. 13 will be described with reference to FIGS. 14 to 16.

Figure 14:
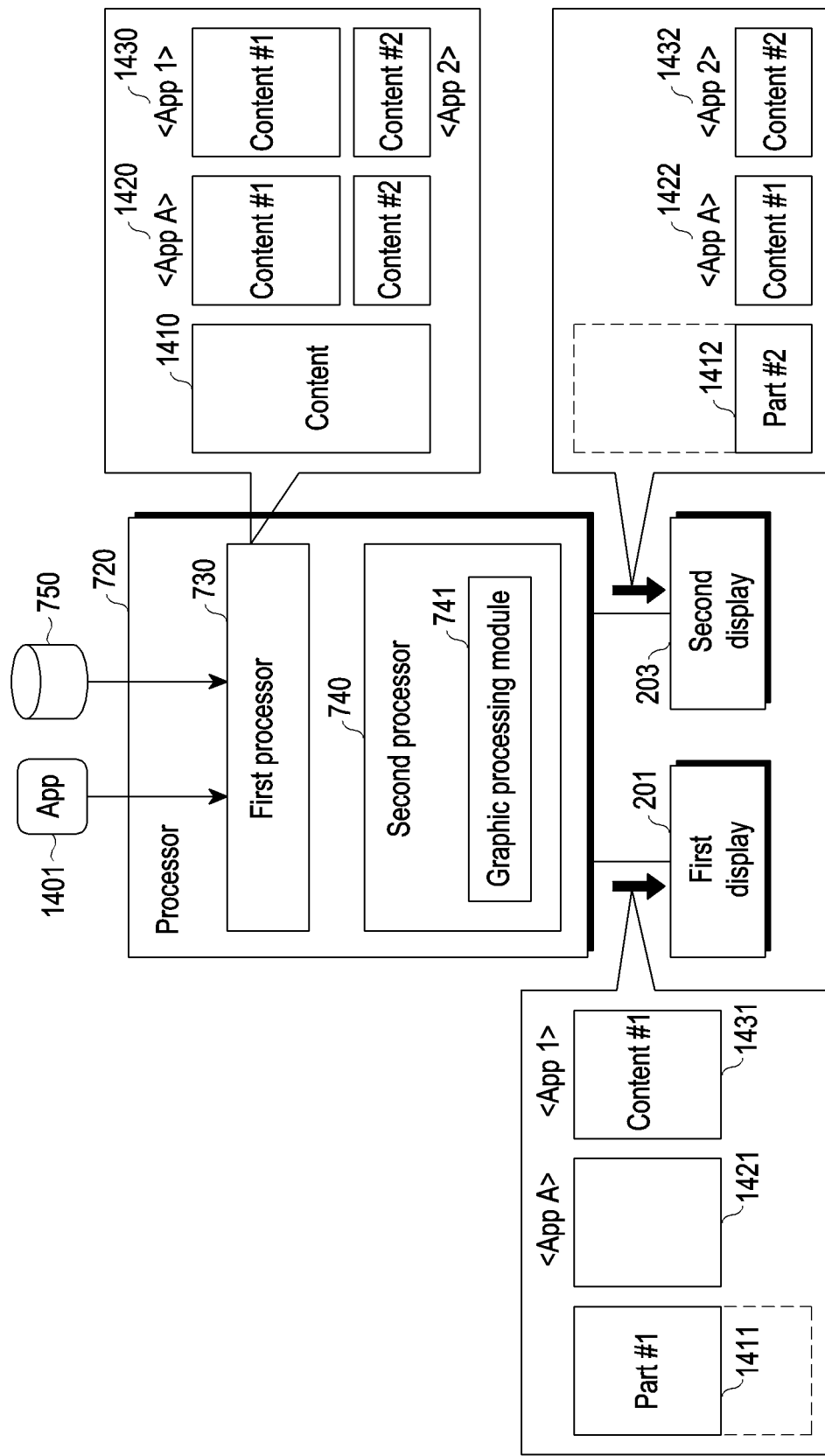
FIG. 14 is a view for describing various examples in which an electronic device according to various embodiments obtains a content and displays, based on the obtained content, a content on each of a plurality of displays (e.g., a first display and a second display)
Figure 15:
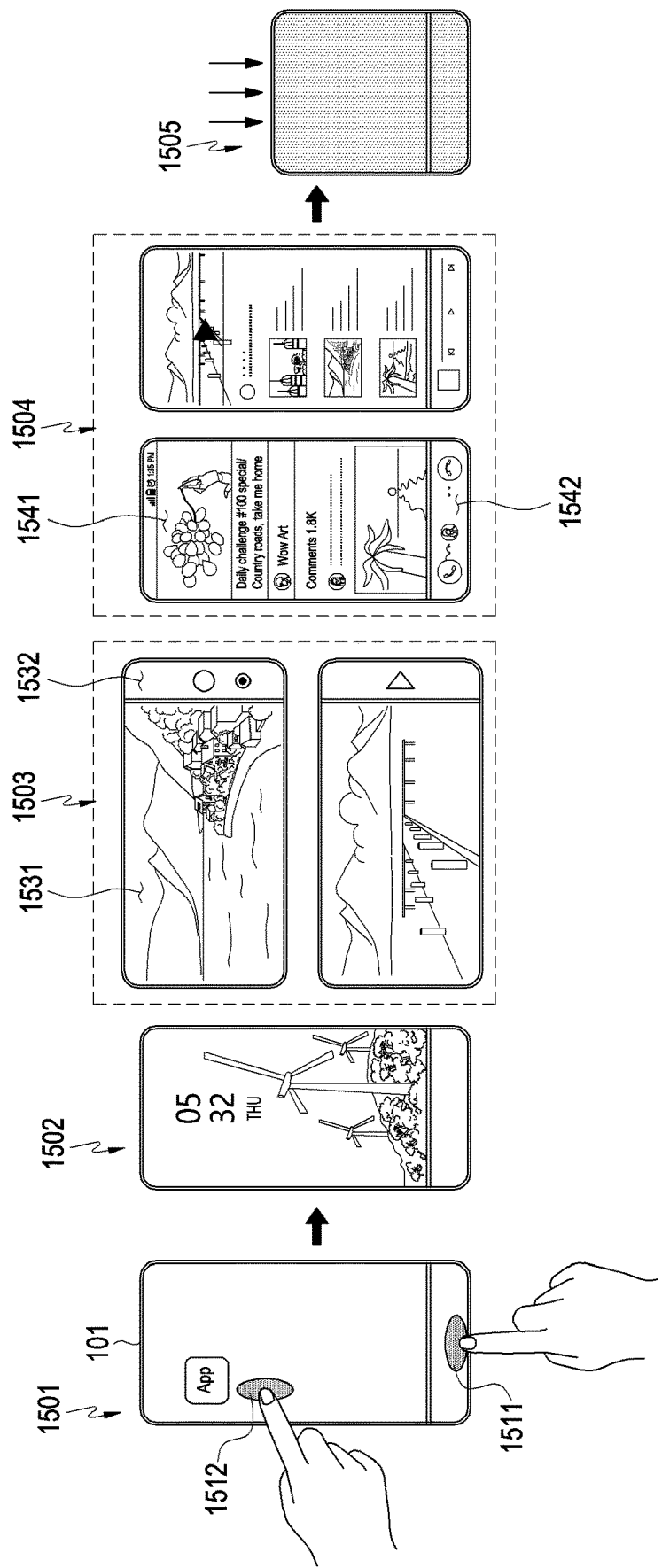
FIG. 15 is a view for describing various examples in which an electronic device according to various embodiments obtains and displays a content on a basis of a user input.
Figure 16:
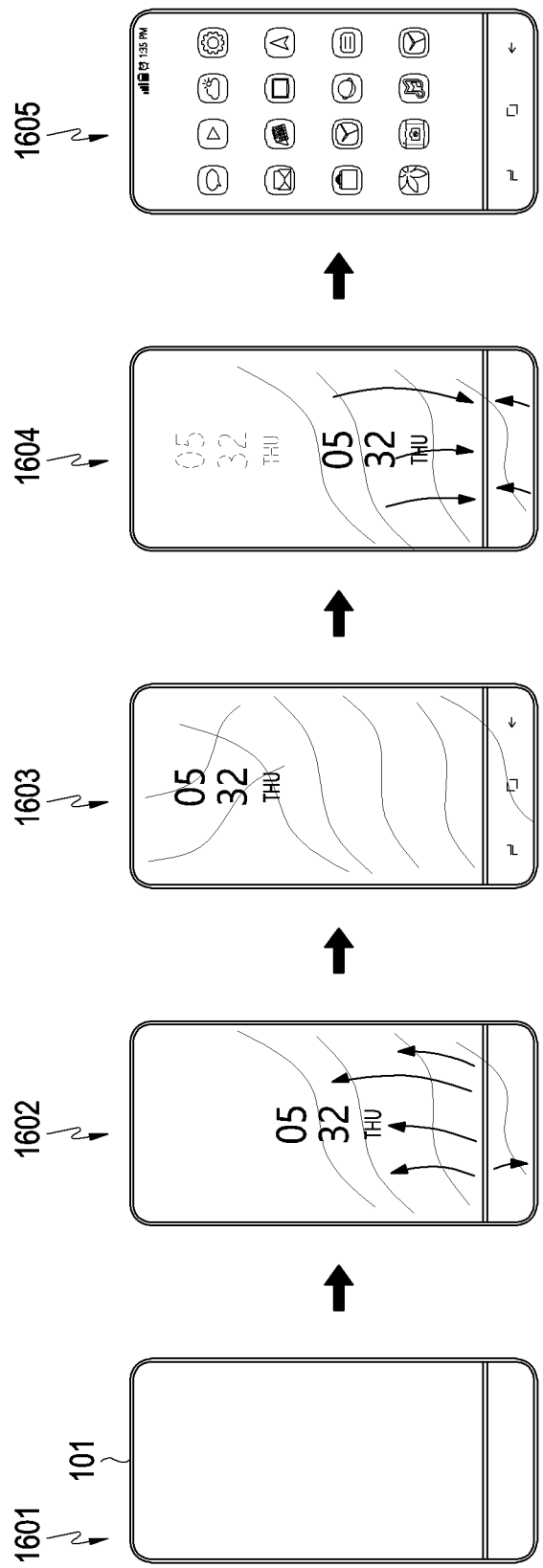
FIG. 16 is a view for describing an example in which an electronic device according to various embodiments dynamically displays a content when displaying the content.

FIG. 14 is a view for describing various examples in which an electronic device according to various embodiments obtains a content and displays, based on the obtained content, a content on each of a plurality of displays (e.g., a first display and a second display). FIG. 15 is a view for describing various examples in which an electronic device according to various embodiments obtains and displays a content on a basis of a user input. FIG. 16 is a view for describing an example in which an electronic device according to various embodiments dynamically displays a content when displaying the content.

Referring to FIG. 13, according to various embodiments, in operation 1301, an electronic device 101 may obtain a content to be displayed, based on at least one of a first input (e.g., an input received on a first display 201) or a second input (e.g., an input received on a second display 203). For example, as shown in reference numeral 1501 in FIG. 15, an electronic device 101 may receive at least one of a first input 1511 on a first display 201 or a second input 1512 on a second display 203. Without being limited to the description, the electronic device 101 may also receive a user input on a key which is physically implemented in the electronic device 101. The operation in which the electronic device 101 receive the user input may be performed like operations 1001 and 1002 of the electronic device 101 described above, and thus a redundant description thereof will be omitted. Hereinafter, a description will be made of an operation in which the electronic device 101 obtains a content to be displayed, based on the user input.

According to various embodiments, the electronic device 101 (e.g., the first processor 730) may execute and/or drive an application or a program on the basis of a user input (e.g., at least one of the first input 1511 or the second input 1512) received on at least one of the displays (e.g., the first display 201 and the second display 203), and may obtain information about at least one content that is to be displayed by the execution and/or driving of the application or the program. For example, the first processor 730 may obtain a content to be displayed (e.g., an execution screen) based on the execution of the application or the program from an application 1401 or the memory 750. The content, as illustrated in FIG. 14, may include a single content 1410, or at least two contents (e.g., contents 1420 related one application (e.g., App A), or contents 1430 related to different applications (e.g., App 1 and App 2)). Hereinafter, a description will be made of examples of an operation in which the electronic device 101 obtains a content.

For example, the electronic device 101 may obtain, based on a user input, the single content 1410 to be displayed. In an example, as shown in reference numeral 1502 in FIG. 15, when the display is turned on by a user input (e.g., when a user input having pressure sensitivity equal to or greater predetermined pressure sensitivity is received through the second display 203), the electronic device 101 may obtain information about a protective screen to be displayed.

In another example, the electronic device 101 may obtain, based on a user input, the at least two contents 1420 to be displayed. In an example, as shown in reference numeral 1503 in FIG. 15, when an application is executed based on the user input (e.g., when the user input is received at the position of an icon for execution of an application to be displayed on the first display 201 or the second display 203), the electronic device 101 may obtain at least one content for displaying an application execution screen (e.g., an execution screen 1531 including a content region, or an execution screen 1532 including a control region).

In another example, the electronic device 101 may obtain, based on a user input, the content 1430 related to different applications. In an example, as shown in reference numeral 1504 in FIG. 15, the electronic device 101 may obtain an execution screen 1541 of one application and an execution screen 1542 of different applications. For example, when executing a plurality of applications, the electronic device 101 may obtain information for displaying an execution screen of each of the applications. When one application is executed during execution of another application, the electronic device 101 may obtain information for displaying execution screens of two applications. In an example, when an application is executed while another application is executed in a foreground mode, the electronic device 101 may obtain information about an execution screen of the application being executed in the foreground mode and display the information on the first display 201, and may obtain information about an execution screen of the newly executed application and display the information on the second display 203.

In addition to the described example, the operation in which the electronic device 101 obtains and displays at least one content on the basis of execution and/or driving of an application may be performed like the well-known operation of displaying a content on the basis of execution and/or driving of various applications, and thus a description thereof will be omitted.

According to various embodiments, the electronic device 101 may display a first content on the first display 201 in operation 1302, and may display a second content on the second display 203 in operation 1303. For example, the electronic device 101 (e.g., the graphic processing module 741 of the second processor 740) may divide the obtained single content, and may display the divided content on each of a plurality of displays (e.g., may transfer information about the divided content to a DDI implemented in each of an exposed region of the first display 201 and the second display 203 and may display the information on the displays). Alternatively, the electronic device 101 may display the obtained a plurality of contents on the plurality of displays, respectively (e.g., may transfer information about each of the contents to a DDI implemented in each of an exposed region of the first display 201 and the second display 203 and may display the information on the displays). The operation of the graphic processing module 741 may be as illustrated in FIG. 7A, and thus a redundant description thereof will be omitted. When the state of the electronic device 101 changes to a locked state as shown in reference numeral 1505 in FIG. 15 or when there is no application executed in a foreground mode, the electronic device 101 may cause a flexible display (e.g., second display 203) to slide in. The electronic device 101 may adjust the size of an exposed region of the first display 201 and may then display an obtained content, and a description thereof will be made later with reference to FIGS. 17 to 20B. Hereinafter, examples in which the electronic device 101 displays a content (the examples of reference numerals 1502 to 1504 in FIG. 15) will be further described.

According to various embodiments, the electronic device 101 may divide one content into a plurality of parts (e.g., two parts 1411 and 1412), and may display each of the plurality of parts on a corresponding display among a plurality of displays (e.g., the first display 201 and the second display 203). For example, the electronic device 101 may divide an obtained content into the part 1411 to be displayed on the first display 201 and the part 1412 to be displayed on the second display 203. The electronic device 101 may calculate a ratio of the size of an exposed region of the first display 201 to the size of the second display 203. The electronic device 101 may identify, based on a value (e.g., an electrical value) received from a sensor according to sliding of the first display 201, the distance (or length) that the first display 201 is to slide, and may identify an exposed area of the first display 201 on the basis of the identified distance (by adding a size corresponding to the sliding distance to a size of an originally exposed region). The electronic device 101 may calculate a ratio of a size of the identified exposed region of the first display 201 to the size of the second display 203, and may divide, based on the calculated ratio (e.g., a first value (e.g., 3) indicating the size of the first display 201 and a second value (e.g., 1) indicating the size of the second display 203), a content into two parts 1411 and 1412 and may display the two parts on the displays. In an example, as shown in reference numeral 1502 in FIG. 15, the electronic device 101 may divide an obtained content for screen protection into an upper part to be displayed on the first display 201 and a lower part to be displayed on the second display 203, and may display each of the divided parts on a corresponding display among the displays.

According to various embodiments, the electronic device 101 may obtain different contents 1421, 1422, 1431, and 1432, and may display each of the different contents on a corresponding display among the displays (e.g., the first display 201 and the second display 203). For example, each of the different contents 1421 and 1422 may include: a screen including a region (or a content region) for displaying a content related to an application; and a screen including a region for application control. In an example, as shown in reference numeral 1503 in FIG. 15, the electronic device 101 may obtain a screen for displaying a content reproduced in an application (e.g., a camera application or a media reproduction application) and a screen including objects for application manipulation. The electronic device 101 may display the screen for displaying the content in an exposed region of the first display 201, and may display the screen including the objects for application manipulation on the second display 203. In another example, as described above, different contents 1431 and 1432 may be execution screens of different applications.

According to various embodiments, when a content is displayed on each of the first display 201 and the second display 203, the electronic device 101 may visually and kinetically (or dynamically) display the content. In an example, when displaying a first part of one content (e.g., a content for screen protection) on the first display 201 and a second part of the content on the second display 203, the electronic device 101 may visually and dynamically display each of the first part and the second part. The electronic device 101 may use a visual effect (e.g., an animation effect) to display each content on a corresponding display. Referring to FIG. 16, when no content is displayed as shown in reference numeral 1601 in FIG. 16 (e.g., an off-state) and/or when another content is displayed while one content is being displayed, the electronic device 101 may display, as shown in reference numerals 1602 and 1603 in FIG. 16, a content such that, with reference to a member (e.g., an optical member) between the first display 201 and the second display 203, a first part of the content gradually slides out to the upper end of the first display 201 and a second part of the content gradually slides out to the lower end of the second display 203. When the one content is changed to another content (e.g., a home screen illustrated in reference numeral 1605 in FIG. 16), the electronic device 101 may cause the displayed parts of the content to dynamically disappear and may display the other content. For example, as shown in reference numeral 1604 in FIG. 16, the electronic device 101 may display a content such that the first part of the content displayed on the first display 201 gradually slides in between (e.g., the optical member) the first display 201 and the second display 203. The electronic device 101 may display another content in a region in which the first and second parts of the content slide in and disappear from the displays. When the first and second parts of the content all disappear from the displays, the other content may be displayed on the first display 201 and the second display 203. The dynamic content display operation of the electronic device 101 has been described with reference to an example of an operation of displaying parts, into which one content is divided, on the respective displays, but the above-described operation may also be applied to an operation of displaying different contents on the respective displays.

Hereinafter, a description will be made of another example of an operation of the electronic device 101 according to various embodiments.

According to various embodiments, the electronic device 101 may adjust a size of an exposed region of the first display 201, and may display a content on the first display 201 of which the size of the exposed region has been adjusted.

Figure 17:
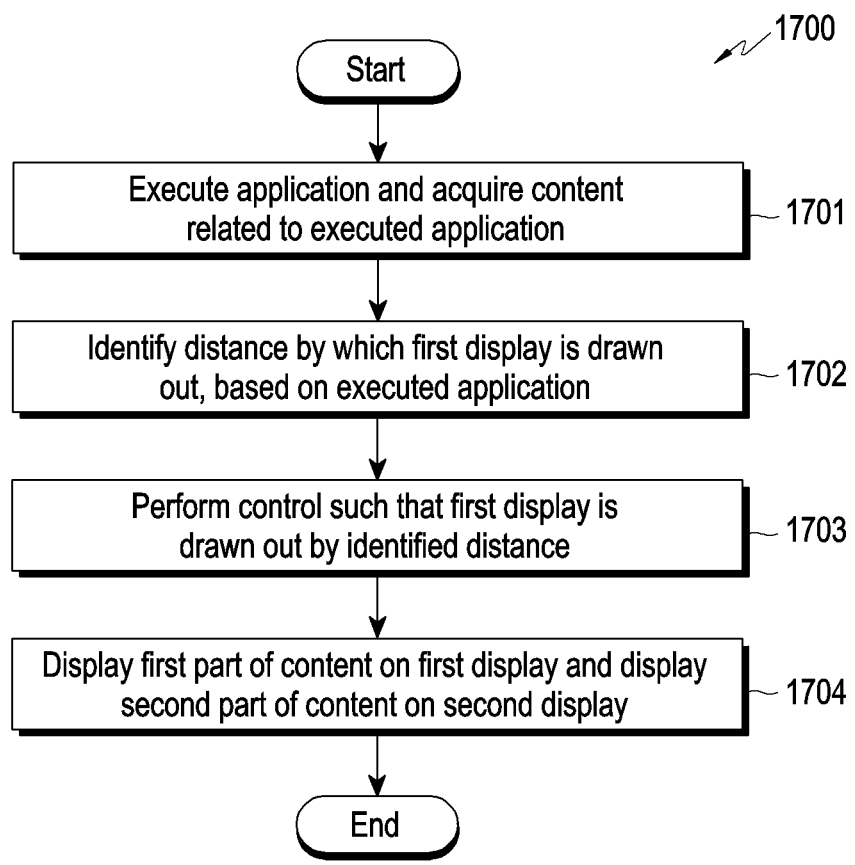
FIG. 17 is a flowchart for describing another example of an operation of an electronic device according to various embodiments.

FIG. 17 is a flowchart for describing another example of an operation of an electronic device according to various embodiments. According to various embodiments, the operations illustrated in FIG. 17 may be performed in various orders without being limited to the illustrated order. Further, according to various embodiments, operations, which are more numerous than the operations illustrated in FIG. 17, may be performed or at least one operation, which is fewer than the operations illustrated in FIG. 17, may be performed. Hereinafter, the operations in FIG. 17 will be described with reference to FIGS. 18 to 20B.

Figure 18:
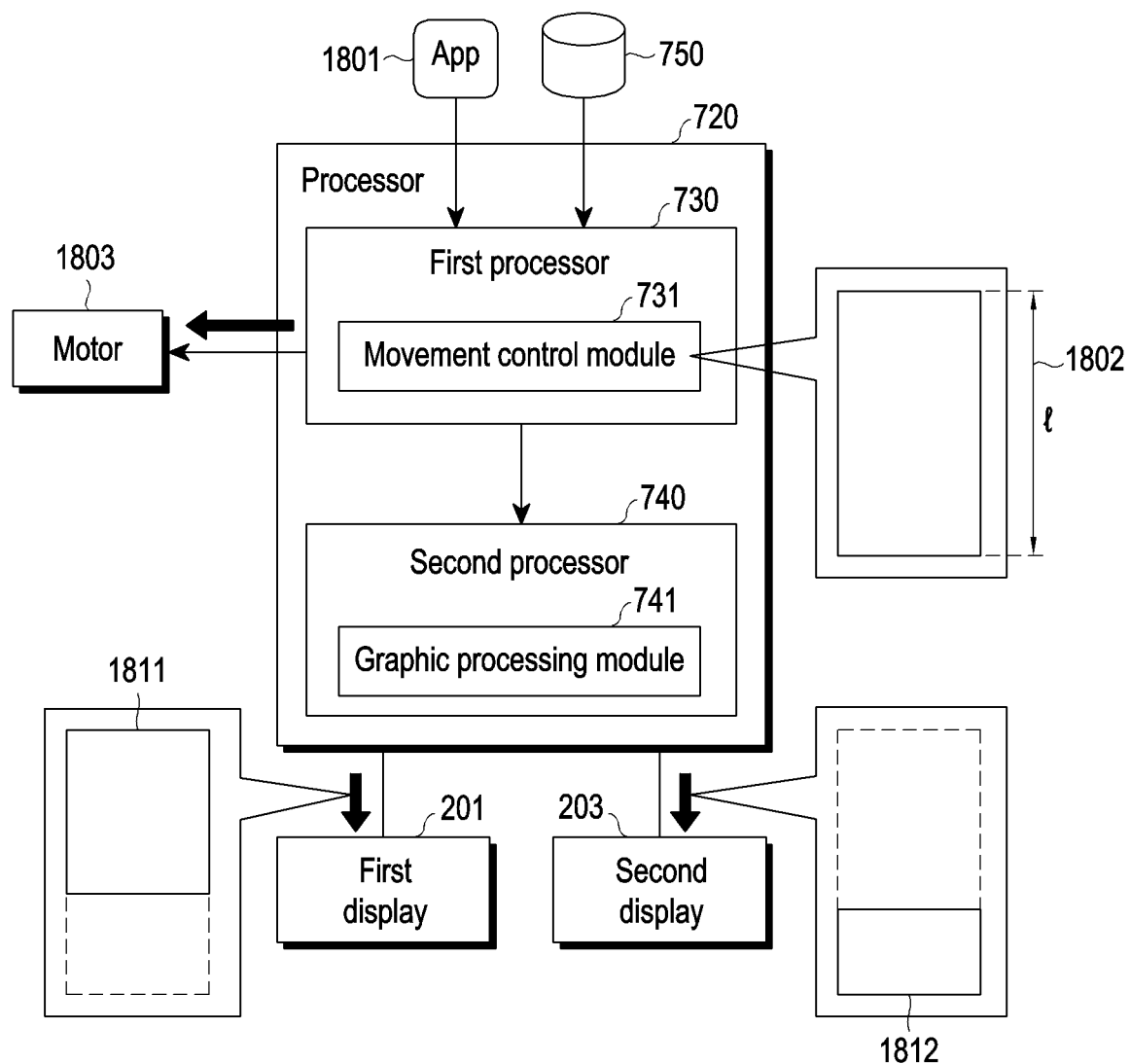
FIG. 18 is a view for describing an example in which an electronic device according to various embodiments displays an application execution screen on a basis of information about a length of an application executed therein.
Figure 19:
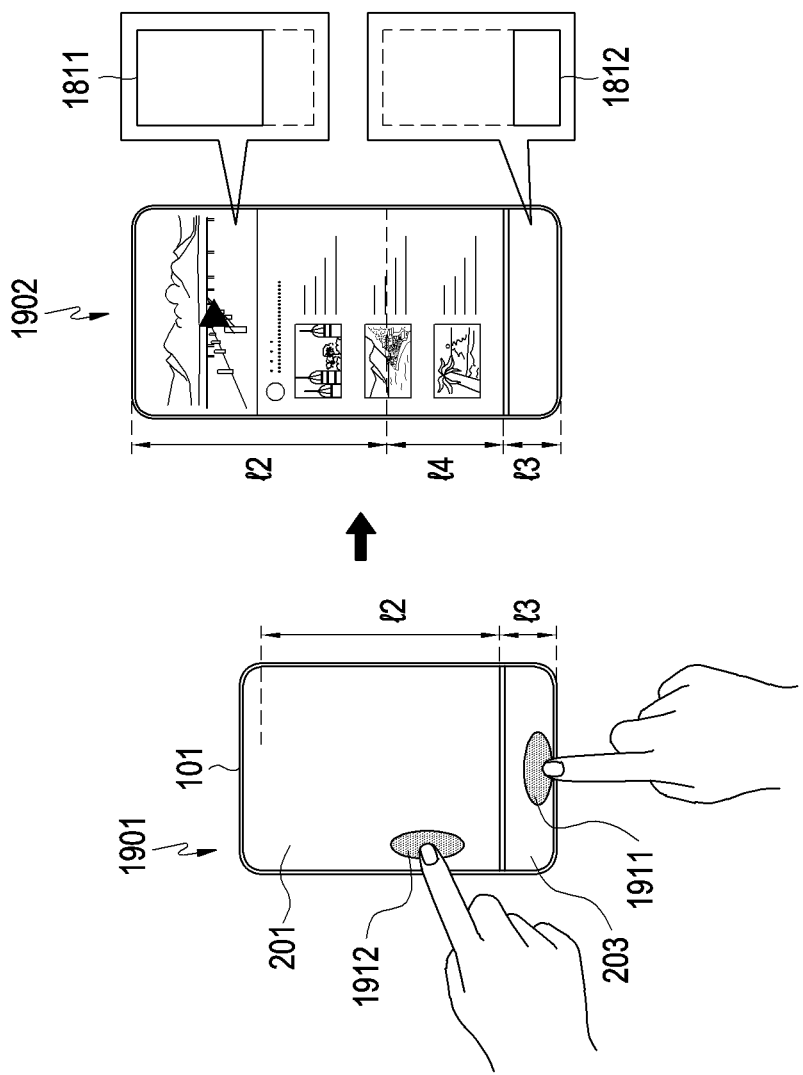
FIG. 19 is a view for describing an example in which an electronic device according to various embodiments causes a first display to slide, on a basis of information about a length of an executed application.
Figure 20A:
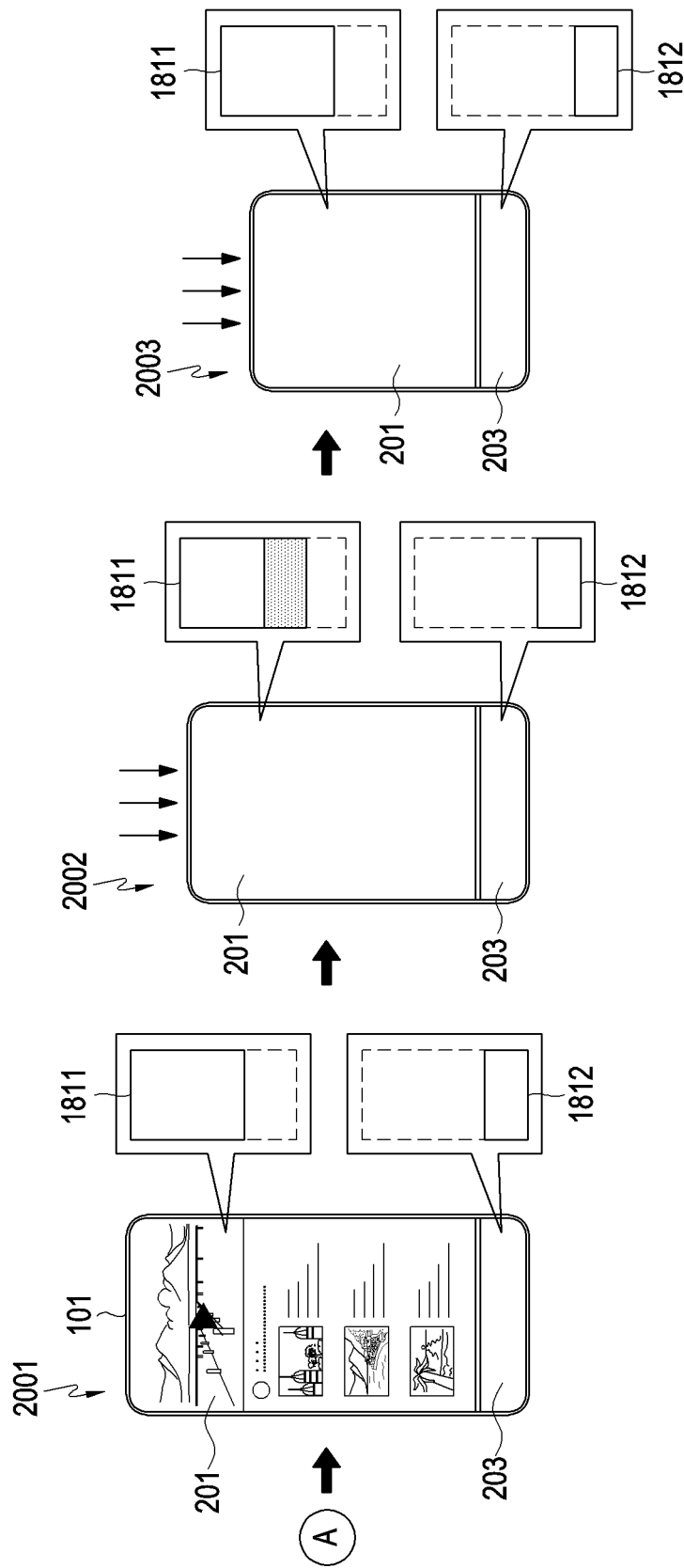
FIG. 20A is a view for describing an example in which an electronic device displays a content on the basis of the region of a first display.
Figure 20B:
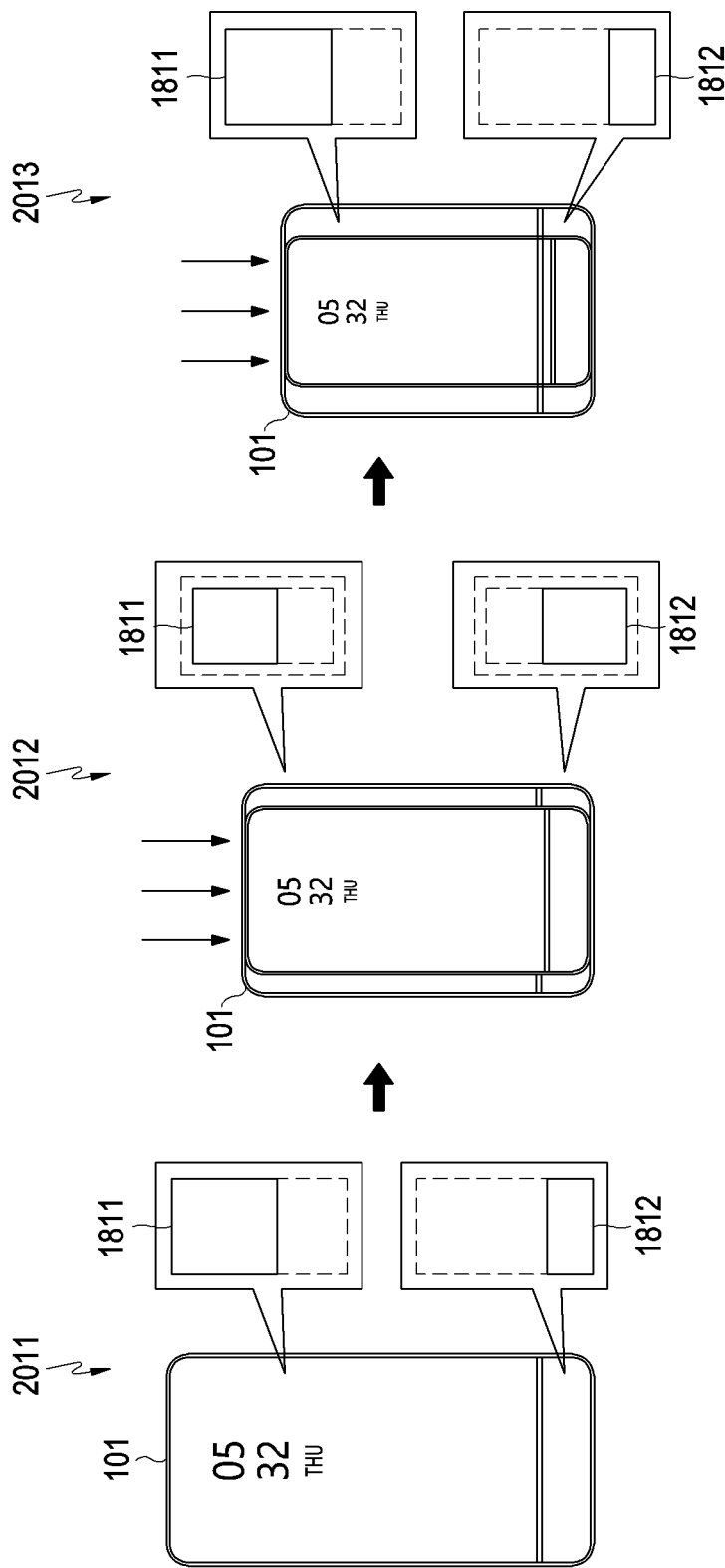
FIG. 20B is a view for describing an example in which an electronic device displays a content on the basis of the region of a first display.

FIG. 18 is a view for describing an example in which an electronic device according to various embodiments displays an application execution screen on the basis of information about the length of an application executed in an electronic device according to various embodiments. FIG. 19 is a view for describing an example in which an electronic device according to various embodiments causes the flexible display to slide, based on the information about a length of an executed application. FIG. 20A is a view for describing an example in which an electronic device displays a content on the basis of a size of a flexible display. FIG. 20B is a view for describing an example in which an electronic device displays a content on the basis of a size of the flexible display.

Referring to FIG. 17, according to various embodiments, in operation 1701, an electronic device 101 may execute an application, and may obtain a content related to the executed application. For example, as shown in reference numeral 1901 in FIG. 19, the electronic device 101 may execute and/or drive an application (or a program) on the basis of a user input (e.g., reference numeral 1911 or 1912) received on at least one of a plurality of displays (e.g., the first display 201 and the second display 203) (e.g., a user input selecting an icon for application execution), and may obtain a content (e.g., an application execution screen) related to the application. Operation 1701 of the electronic device 101 may be performed like operation 1301 of the electronic device 101, described above, and thus a redundant description thereof will be omitted. The electronic device 101 may display, on the second display 203, icons for executing applications provided by the application management module illustrated in FIG. 7A, and when one of the displayed icons is selected, may execute an application corresponding to the selected icon. A description thereof will be made later with reference to FIGS. 21 to 23.

According to various embodiments, in operation 1702, the electronic device 101 may identify, based on the executed application, a distance (or length) by which the first display 201 is drawn out. For example, as illustrated in FIG. 18, an electronic device 101 (e.g., a movement control module 731 of a first processor 730) may identify, from an executed application 1801 or a memory 750, information about a length (e.g., height, l1) related to the executed application, and may identify, based on the information about the identified length (l1), a distance (or length) that the first display 201 is to slide. Hereinafter, a description will be made of examples in which the electronic device 101 identifies information 1802 about the length of an application.

According to various embodiments, the electronic device 101 may identify, based on the information 1802 about a length pre-stored for each application stored in the memory 750, the information 1802 about a length corresponding to the executed application. For example, the information 1802 about a length may be predetermined for each of various applications, and may be stored in the memory. In an example, at the time of development of an application, the length and width of an execution screen of the application may be set in the application by an application developer. When downloading (or installing) the application, the electronic device 101 may obtain information about the set length and width of the execution screen of the application together with the application, may store the obtained information in the memory 750, and may store and/or manage the information 1802 about a length for each of various applications. Therefore, when an application is executed, the electronic device 101 may identify the information 1802 about a length, which corresponds to the executed application, from the memory 750. Alternatively, without being limited to the description, the electronic device 101 may also obtain, when an application is executed, the information 1802 about a length from the executed application.

According to various embodiments, the electronic device 101 may identify information related to an application, and may identify (or obtain) the information 1802 about a length, which corresponds to the identified information related to the application. For example, the information related to the application may include information indicating attributes such as the type of application. The electronic device 101 may pre-store a length for each piece of information about the attributes of an application, and may compare the stored information with attribute-related information obtained from an executed application to identify the length of the executed application.

According to various embodiments, the above-described information 1802 about the length of an application may be adjusted by a user. For example, the application management module illustrated FIG. 7A may manage the information 1802 about a length preset for each application, and the length may be adjusted under the user's control by using the application. A description thereof will be made later with reference to FIGS. 21 to 23.

According to various embodiments, in operation 1703, the electronic device 101 may perform control such that the first display 201 is drawn out by the identified distance. For example, as illustrated in FIG. 18, the electronic device 101 (e.g., the movement control module 731) may identify a distance which corresponds to the information 1802 about the length of an application and by which the flexible display is to be drawn out, and may control the motor 1803 such that the first display 201 slides the identified distance. The electronic device 101 may identify, based on the identified information 1802 about the length of an application, the length (l4) of the first display 201 that is necessary for displaying an application execution screen. Further, the electronic device 101 may use at least one sensor to identify the length (l1) of a currently exposed region of the first display 201. The electronic device 101 may calculate the length (l4) (or the distance) that the first display 201 is to move, by comparing the identified necessary length of the first display 201 (hereinafter, referred to as a "necessary length") with the length of the exposed region of the first display 201 (hereinafter, referred to as an "exposed length") (e.g., by subtracting a calculated length from the exposed length). In an example, when the exposed length is smaller than the necessary length, the electronic device 101 may draw out the first display 201 by the difference between the lengths (e.g., the exposed length and the necessary length). In another example, when the exposed length is larger than the necessary length, the electronic device 101 may draw in the first display 201 by the difference between the lengths. Further, when there is no difference between the lengths, the electronic device 101 may maintain the exposed region of the first display 201. Without being limited to the description, the electronic device 101 may resize, based on the size of a currently exposed region of the first display 201, an execution screen of the application, and a description thereof will be made later with reference to FIGS. 19, 20A, and 20B. The operation of moving the first display 201 by the movement control module 731 may be as described with reference with FIG. 7A, and thus a redundant description thereof will be omitted.

According to various embodiments, in operation 1704, the electronic device 101 may display a first part of the content on the first display 201, and may display a second part of the content on the second display 203. For example, as shown in reference numeral 1902 in FIG. 19, the electronic device 101 may display one content 1811 in an exposed region of the first display 201 drawn out by a predetermined distance and another content 1812 on the second display 203. The electronic device 101 (e.g., the graphic processing module 741) may divide, based on the length (l2+l4) of the exposed region of the first display 201 to the length (l3) of the second display 203, a content into two parts (e.g., content 1811 and 1812) (e.g., an upper part and a lower part), and may display the divided content parts on the first display 201 and the second display 203, respectively. Further, without being limited to the description, the above-described operation in which the electronic device 101 causes the first display 201 to slide and displays a content may be applied to the operation in which the electronic device 101 displays different contents on respective displays (e.g., the first display 201 and the second display 203). Operation 1704 of the electronic device 101 may be performed like operations 1301 to 1303 of the electronic device 101, described above, and thus a redundant description thereof will be omitted.

According to various embodiments, without being limited to the description, the electronic device 101 may change, based on the size of a current display, an application execution screen and may display the changed execution screen. For example, as illustrated in FIGS. 20A and 20B, an electronic device 101 may change, based on a size of the entire region of a current display that is determined depending on the drawing-out or drawing-in of the first display 201 (e.g., the sum of the size of an exposed region of the first display 201 and the size of the region of the second display 203), a displayed content (e.g., a protective screen) and may display the changed content. The entire size of the current display may refer to the size of a region of the first display 201, exposed to the outside (or visible by a user), and the size of the second display 203. For example, as shown in reference numerals 2001, 2002, and 2003 in FIG. 20A, when a size of the exposed region of the first display 201 is changed while a content is displayed on each of the displays (e.g., the first display 201 and the second display 203), the electronic device 101 may change and display the size of a part 1811 (e.g., the upper part) of a content displayed in the exposed region of the first display 201, the region of which has been changed, while maintaining display of another part 1812 (e.g., the lower part) of the content on the second display 203. The electronic device 101 may crop and display the upper part of the content, displayed on the first display 201, such that the upper part of the content corresponds to the size of the exposed region of the first display 201. In another example, as shown in reference numerals 2011, 2012, and 2013 in FIG. 20B, the electronic device 101 may resize all contents (e.g., content 1811 and 1812) such that the contents have sizes corresponding to the size of a region of a current display, and may display the resized contents.

Hereinafter, a description will be made of another example of an operation of the electronic device 101 according to various embodiments.

According to various embodiments, the electronic device 101 may execute an application by using the application management module 734 illustrated in FIG. 7A, and may cause the first display 201 to slide, based on information related to the executed application. As described above, the application management module 734 may be implemented as a type of application or program, or a function (e.g., a particular menu item) provided by a particular application (e.g., a setting application). Hereinafter, a description will be made of an example in which the application management module 734 is implemented as a type of application or program, but descriptions below may also be applied to other implementation examples (e.g., a particular menu item of a setting application).

Figure 21:
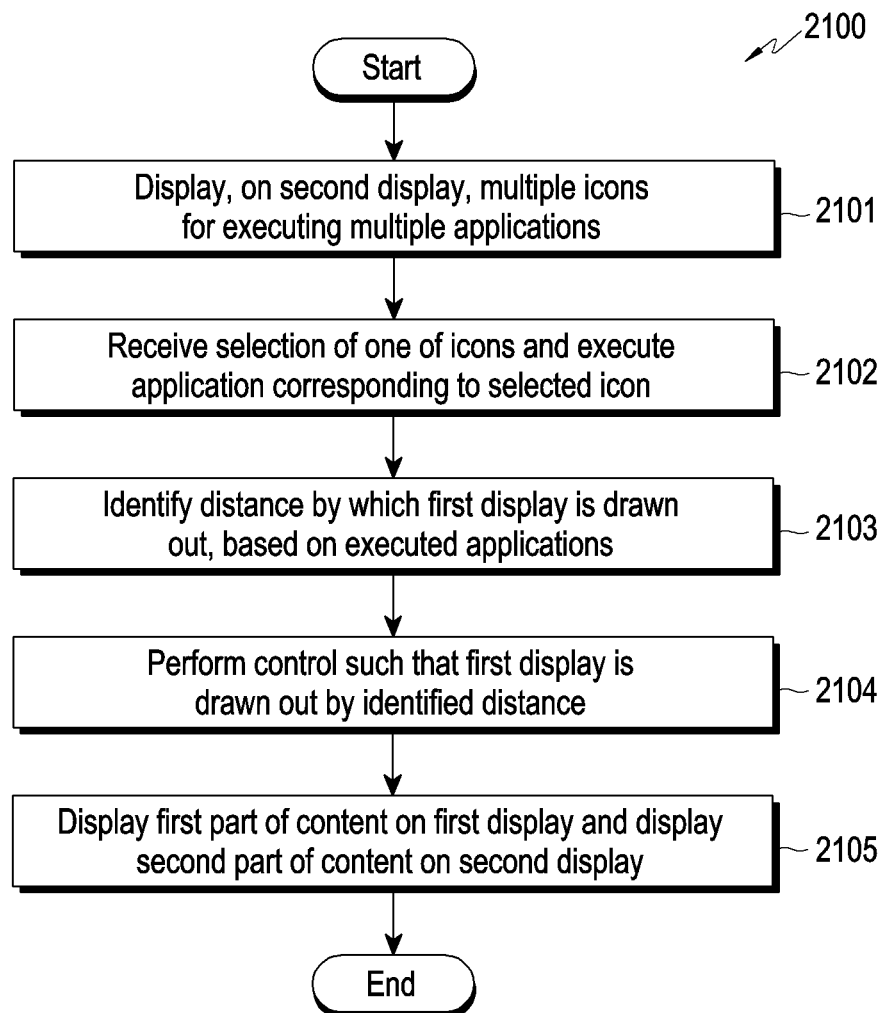
FIG. 21 is a flowchart for describing another example of an operation of an electronic device according to various embodiments.

FIG. 21 is a flowchart for describing another example of an operation of an electronic device according to various embodiments. Referring to FIG. 21, depicting flowchart 2100, according to various embodiments, operations illustrated in FIG. 21 may be performed in various orders without being limited to the illustrated order. Further, according to various embodiments, operations, which are more numerous than the operations illustrated in FIG. 21, may be performed or at least one operation, which is fewer than the operations illustrated in FIG. 21, may be performed. Hereinafter, the operations in FIG. 21 will be described with reference to FIGS. 22 and 23.

Figure 22:
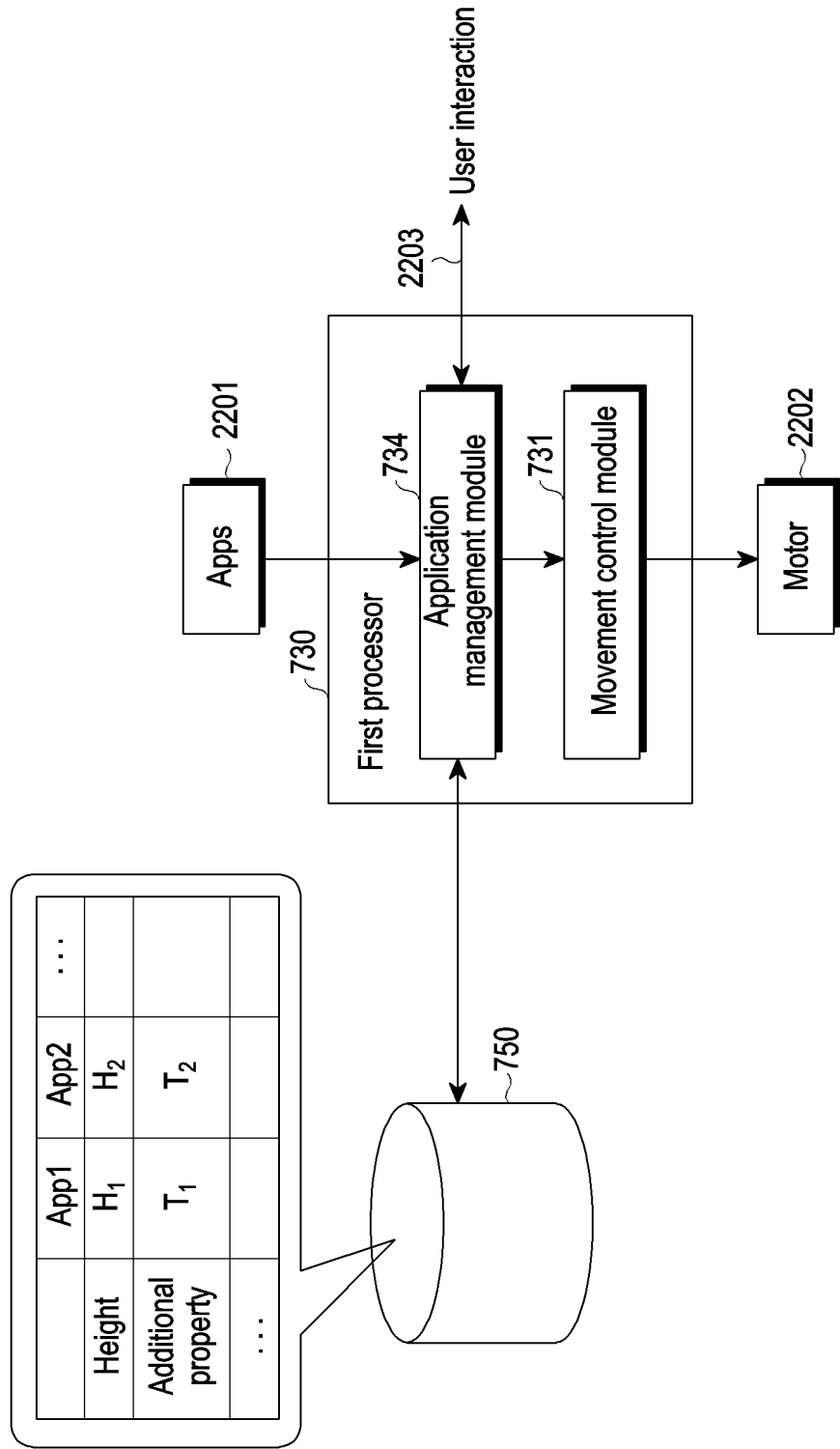
FIG. 22 is a view for describing an example of an operation which an electronic device according to various embodiments performs based on an application management module.
Figure 23:
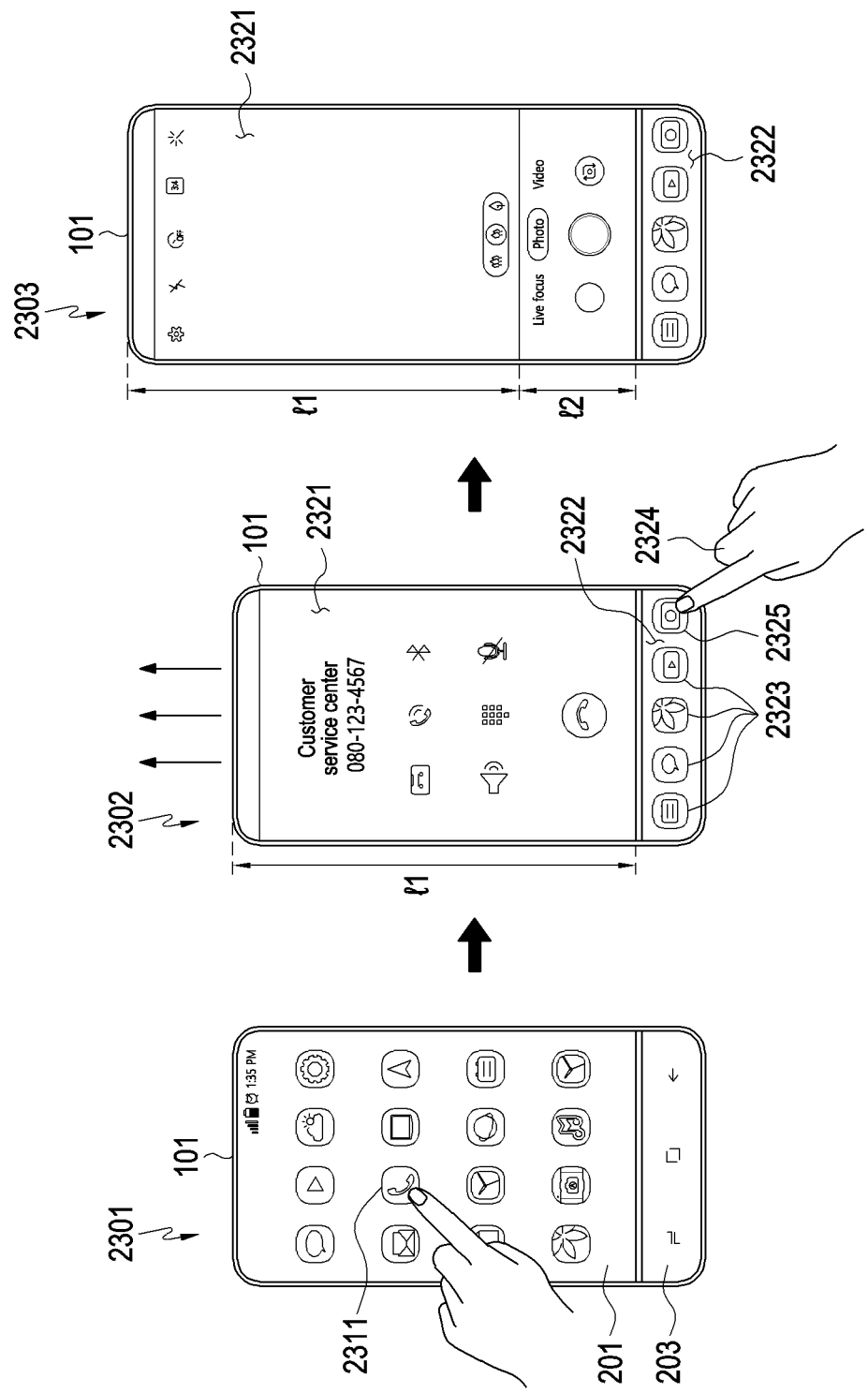
FIG. 23 is a view for describing an example in which an electronic device according to various embodiments performs an application execution based on an application management module and causes a first display to slide.

FIG. 22 is a view for describing an example of an operation which an electronic device according to various embodiments performs based on an application management module. FIG. 23 is a view for describing an example in which an electronic device according to various embodiments performs an application execution based on an application management module and causes a flexible display to slide.

Referring to FIG. 21, according to various embodiments, in operation 2101, an electronic device 101 may display, on a second display 203, a plurality of icons 2323 for executing a plurality of applications. For example, as shown in reference numeral 2301 in FIG. 23, an electronic device 101 may identify, while displaying one content (e.g., a home screen), the occurrence of an event for executing and/or calling an application management module 734. The electronic device 101 may execute the application management module 734 on the basis of the identified occurrence of the event, and may display, as an execution screen of the executed application management module 734, a screen 2322 including the plurality of icons 2323 for executing a plurality of applications in a rigid application as shown in reference numeral 2302 in FIG. 23. The electronic device 101 may change, when a drag input by a user is received on the screen, the screen, and may sequentially display icons for executing other applications, instead of the icons 2323, according to the drag input. Without being limited to the description, the screen including the icons 2323 may be displayed on the first display 201. Hereinafter, a description will be made of examples of an event of for executing the application management module 734.

For example, the event for executing the application management module 734 may include execution of one application. When one application is executed (e.g., is executed by selection of an icon 2311), the electronic device 101 may automatically execute the application management module 734 together with the application. As shown in reference numeral 2302 in FIG. 23, the electronic device 101 may display an execution screen 2321 of the executed application on the first display 201, and may display, based on the execution of the application management module 734, the screen 2322 including the plurality of icons 2323 on the second display 203. The electronic device 101 may execute the application management module 734 only when a designated application, among a plurality of applications installed in the electronic device 101, is executed. For example, if an application to interwork with the application management module 734, among the plurality of applications installed in the electronic device 101, is selected in a setting window of the application management module 734, the electronic device 101 may configure the application management module 734 to be executed when the selected application is executed.

In another example, the event may include detecting a predetermined user input on the second display 203. The electronic device 101 may display a portion of the screen 2322 including the plurality of icons 2323 on the edge portion of the display (e.g., the second display 203), and when the displayed portion is moved by a drag input by the user, may display the full screen 2322. For example, the screen 2322 including the plurality of icons 2323 may be implemented in the form of a movable drawer.

In another example, the event for executing the application management module 734 may include selecting an object (e.g., an icon) for executing and/or calling the application management module 734.

According to various embodiments, the electronic device 101 may edit, under user control 2203, information related to a plurality of applications which are managed (or executed) by the application management module 734. For example, the electronic device 101 may be configured such that only applications selected by the user from among the plurality of applications are managed by the application management module 734. The electronic device 101 may display, based on a user input (e.g., selection of an object for displaying an execution screen of the application management module 734), a screen for editing applications managed by the application management module 734, and may display, on the displayed screen, information about the plurality of applications installed in the electronic device 101. The electronic device 101 may receive a user input for selecting at least one application from among a plurality of applications, and may cause the at least one selected application to be managed by the application management module 734. Therefore, when the application management module 734 is executed, the electronic device 101 may display a screen including at least one icon for executing the at least one application managed by the application management module 734.

According to various embodiments, in operation 2102, the electronic device 101 may receive selection of one icon from among the icons 2323, and may execute an application corresponding to the selected icon. For example, as shown in reference numeral 2302 in FIG. 23, the electronic device 101 may receive a user input 2324 for selecting one icon 2325 from among the plurality of icons 2323 displayed on the second display 203, and may execute an application (e.g., a camera application) corresponding to the selected icon 2325.

According to various embodiments, in operation 2103, the electronic device 101 may identify, based on the executed applications, a distance by which the first display 201 is to be drawn out. For example, as illustrated in FIG. 22, an electronic device 101 may use an application management module 734 to identify information about a length of an application from an application 2201 or a memory 750. For example, the application management module 734 may identify information about an application length predetermined in an application, or may identify information about a length corresponding to application attribute information (e.g., the type of application). The identified information about the length may be adjusted based on a user input. The operation of identifying the information about the length of an application on the basis the application management module 734 is the same as the operation described with reference to FIG. 7B, and thus a redundant description thereof will be omitted. The electronic device 101 may identify (or calculate) a length (l3) (or a distance) by which the first display 201 is to be drawn out, based on the information about the length of an application and the currently exposed length (l1) of the first display 201. Operation 2103 in which the electronic device 101 identifies the distance by which the first display 201 is to be drawn out may be performed like operation 1703 of the electronic device 101 that has been described above. Therefore, a redundant description thereof will be omitted.

According to various embodiments, in operation 2104, the electronic device 101 may perform control such that the first display 201 is drawn out by the identified distance. For example, as illustrated in FIG. 22, the electronic device 101 (e.g., the movement control module 731) may drive a motor 2202 on the basis of information about a length (l2) to be drawn out, which is obtained using the application management module 734, and may perform control to slide the first display 201 by a predetermined length. Operation 2104 of the electronic device 101 may be performed like operation 1703 of the electronic device 101 that has been described above, and thus a redundant description thereof will be omitted.

According to various embodiments, in operation 2105, the electronic device 101 may display a first content on the first display 201, and may display a second content on the second display 203. For example, as shown in reference numeral 2303 in FIG. 23, the electronic device 101 may display an execution screen of an application (e.g., a camera application) executed on the first display 201, and may maintain display of the screen 2322 including the plurality of icons 2323 on the second display 203. At this time, the icon 2325 selected on the second display 203 may disappear from the second display 203. An icon 2325 corresponding to a new application may be displayed at a position from which the selected icon 2325 has disappeared. Further, without being limited to the description, display of the icon 2325 may be maintained, and when the icon 2325 is selected again, a corresponding application (e.g., the camera application) may be ended or may switch to a background mode.

Hereinafter, a description will be made of another example of an operation of the electronic device 101 according to various embodiments.

According to various embodiments, the electronic device 101 may display different contents (e.g., execution screens) related to one application, based on a size of the entire region of a current display (e.g., the sum of the size of an exposed region of the first display 201 and the size of the region of the second display 203).

Figure 24:
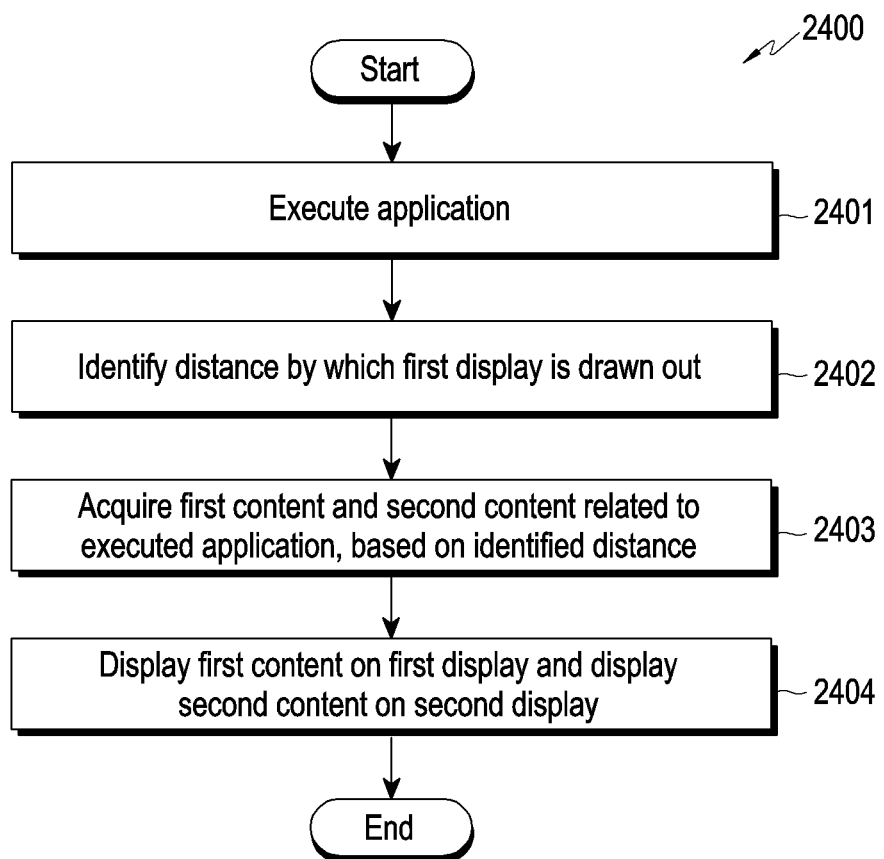
FIG. 24 is a flowchart for describing another example of an operation of an electronic device according to various embodiments.

FIG. 24 is a flowchart for describing another example of an operation of an electronic device according to various embodiments. Referring to FIG. 24, depicting flowchart 2400, according to various embodiments, operations illustrated in FIG. 24 may be performed in various orders without being limited to the illustrated order. Further, according to various embodiments, operations, which are more numerous than the operations illustrated in FIG. 24, may be performed or at least one operation, which is fewer than the operations illustrated in FIG. 24, may be performed. Hereinafter, the operations in FIG. 24 will be described with reference to FIGS. 25 and 26.

Figure 25:
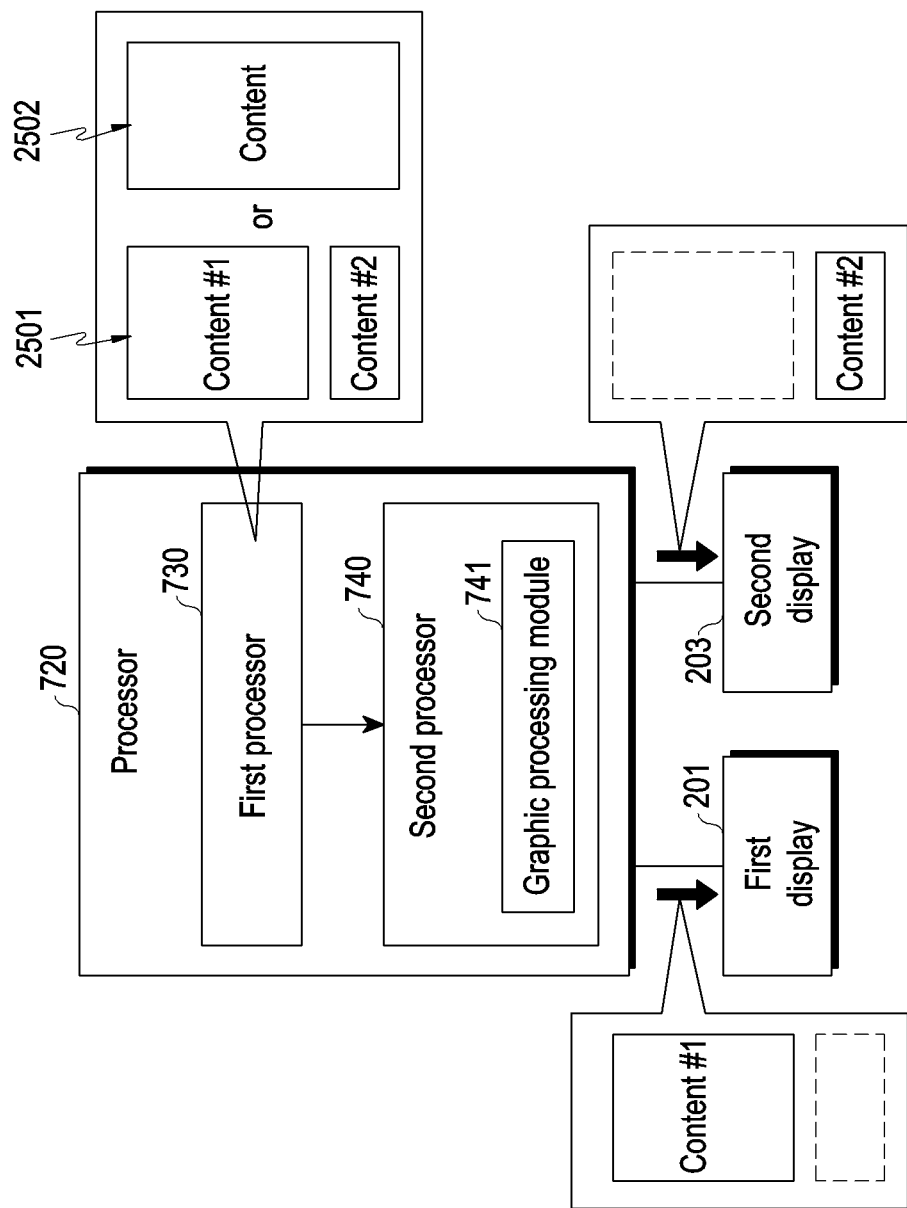
FIG. 25 is a view for describing an example in which an electronic device according to various embodiments displays a content.
Figure 26:
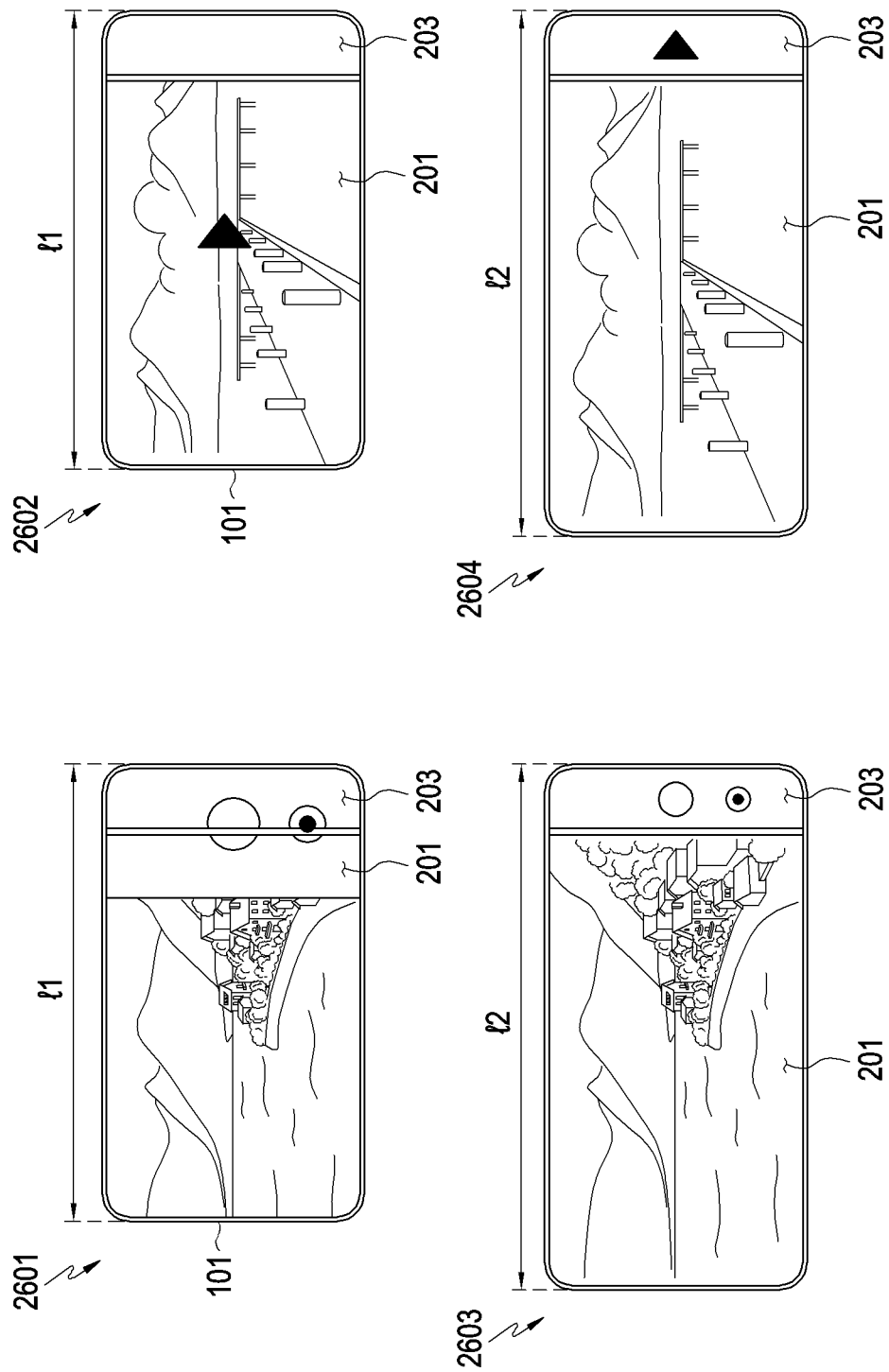
FIG. 26 is a view for describing an example in which an electronic device according to various embodiments displays a content on a basis of an entire region of a display.

FIG. 25 is a view for describing an example in which an electronic device according to various embodiments displays a content. FIG. 26 is a view for describing an example in which an electronic device according to various embodiments displays a content on the basis of a size of the entire region of a display.

According to various embodiments, in operation 2401, the electronic device 101 may execute an application. For example, the electronic device 101 may execute and/or drive an application (or a program) on the basis of a user input (e.g., a user input selecting an icon for application execution) received on at least one of a plurality of displays (e.g., the first display 201 and the second display 203), and may obtain a content (e.g., an application execution screen) related to the application. For example, as illustrated in FIG. 25, an electronic device 101 (e.g., a first processor 730) may obtain at least two contents 2501 (e.g., a screen including a divided content region and a screen including a control region) or one content 2502 (e.g., a single screen including a content region and a control region). Operation 2401 of the electronic device 101 may be performed like operation 1301 of the electronic device 101 that has been described above, and thus a redundant description thereof will be omitted.

According to various embodiments, in operation 2402, the electronic device 101 may identify a size of the entire region of a current display. Referring to FIG. 26, an electronic device 101 may identify the size of a currently exposed region of a first display 201, and may identify a size of the entire region (e.g., l1 or l2 illustrated in FIG. 26) of the current display by adding an identified size of the exposed region of a first display 201 to a size of a second display 203. The electronic device 101 may identify a movement distance of the first display 201 by using at least one sensor, and may identify the exposed region of the first display 201, based on the identified distance.

According to various embodiments, in operation 2403, the electronic device 101 may obtain, based on the identified entire size, a first content and a second content that relate to the executed application. The electronic device 101 may identify a content to be displayed among the two types of contents, based on the result of comparison between the identified entire size of the display and a threshold value. For example, when the entire size of the current display exceeds a predetermined value, the electronic device 101 may identify that the at least two contents are contents to be displayed (reference numerals 2603 and 2604 in FIG. 26). When the entire size of the current display is smaller than the predetermined value, the electronic device 101 may identify that the single content is a content to be displayed (reference numerals 2601 and 2602 in FIG. 26). In an example, the electronic device 101 may obtain at least two contents to be displayed from among contents related to an application in an open state (e.g., a state in which the first display 201 is maximally drawn out), and may obtain a single content to be displayed from among the contents related to the application in a closed state (e.g., a state in which the first display 201 is maximally drawn in).

According to various embodiments, each of various applications may include different execution screens depending on the size of the first display 201. For example, a particular application may include, in an application state for implementing a particular function, a first execution screen to be displayed on a large-size display (e.g., a size of the entire region of the display is equal to or larger than a predetermined value) and a second execution screen to be displayed on a small-size display. Therefore, as described above, the electronic device 101 may identify and display an execution screen of a type corresponding to a size of the entire region of a display. Further, without being limited to the description, separate execution screen corresponding to the each of displays may be not implemented, but one execution screen may be implemented and may be resized so as to correspond to the size of all of the displays.

According to various embodiments, in operation 2404, the electronic device 101 may display the first content on the first display 201, and may display the second content on the second display 203. For example, as shown in reference numerals 2601 and 2602 in FIG. 26, the electronic device 101 may display one part of one content on the first display 201, and may display the other part of the content on the second display 203. In another example, as shown in reference numerals 2603 and 2604 in FIG. 26, the electronic device 101 may display one content (a screen including a content region) related to one application on the first display 201, and may display another content (e.g., a screen including a control region) on the second display 203.

Hereinafter, a description will be made of another example of an operation of the electronic device 101 according to various embodiments.

According to various embodiments, the electronic device 101 may receive multi-input of a user on a plurality of displays (e.g., the first display 201 and the second display 203). The electronic device 101 may perform different operations based on attributes of the user's multi-input received on each of the displays (e.g., the first display 201 and the second display 203) (e.g., an input reception time and an input reception position).

Figure 27:
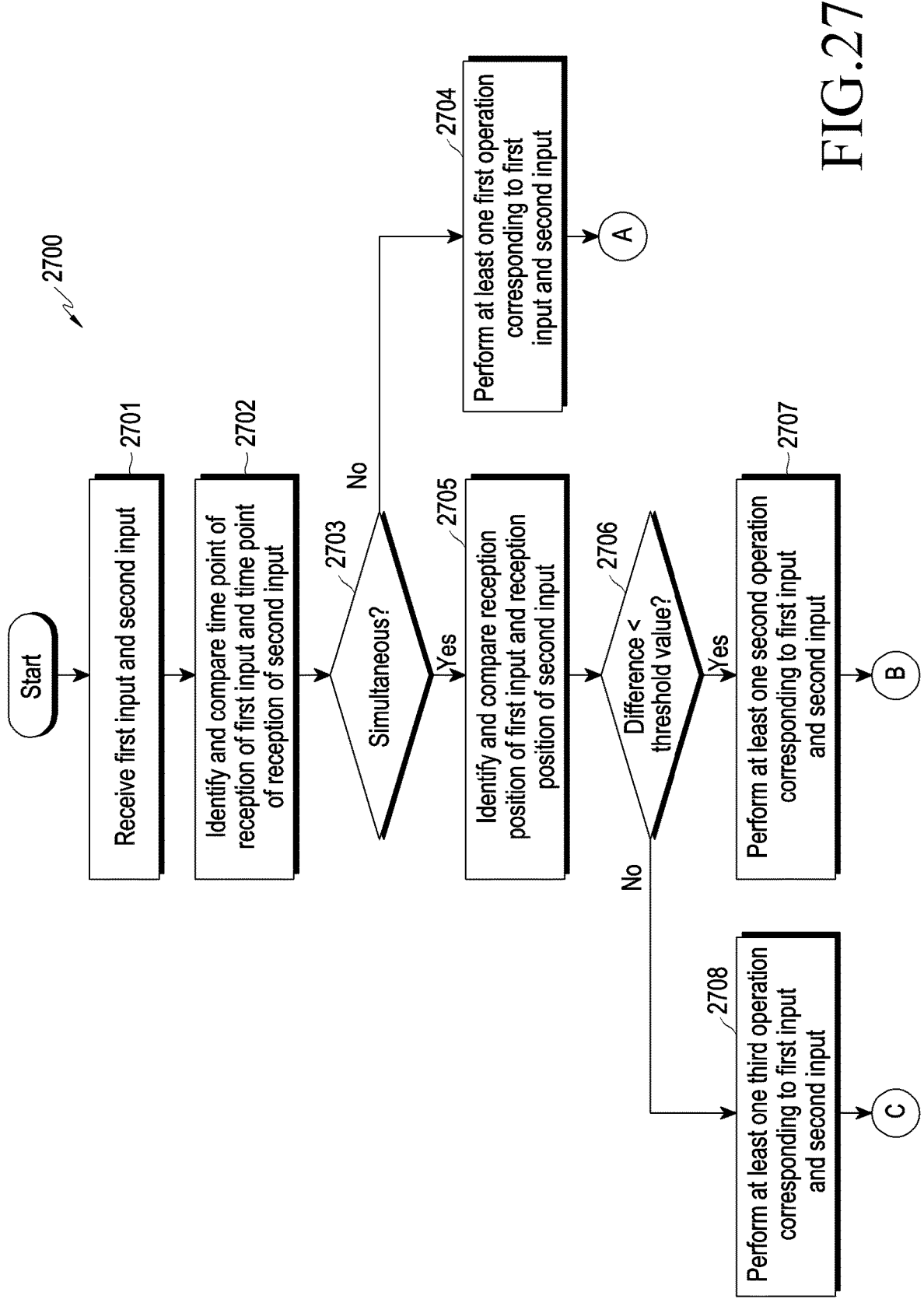
FIG. 27 is a flowchart for describing another example of an operation of an electronic device according to various embodiments.

FIG. 27 is a flowchart for describing another example of an operation of an electronic device according to various embodiments. Referring to FIG. 27, depicting flowchart 2700, according to various embodiments, the operations illustrated in FIG. 27 may be performed in various orders without being limited to the illustrated order. Further, according to various embodiments, operations, which are more numerous than the operations illustrated in FIG. 27, may be performed or at least one operation, which is fewer than the operations illustrated in FIG. 27, may be performed. Hereinafter, the operations in FIG. 27 will be described with reference to FIG. 28.

Figure 28:
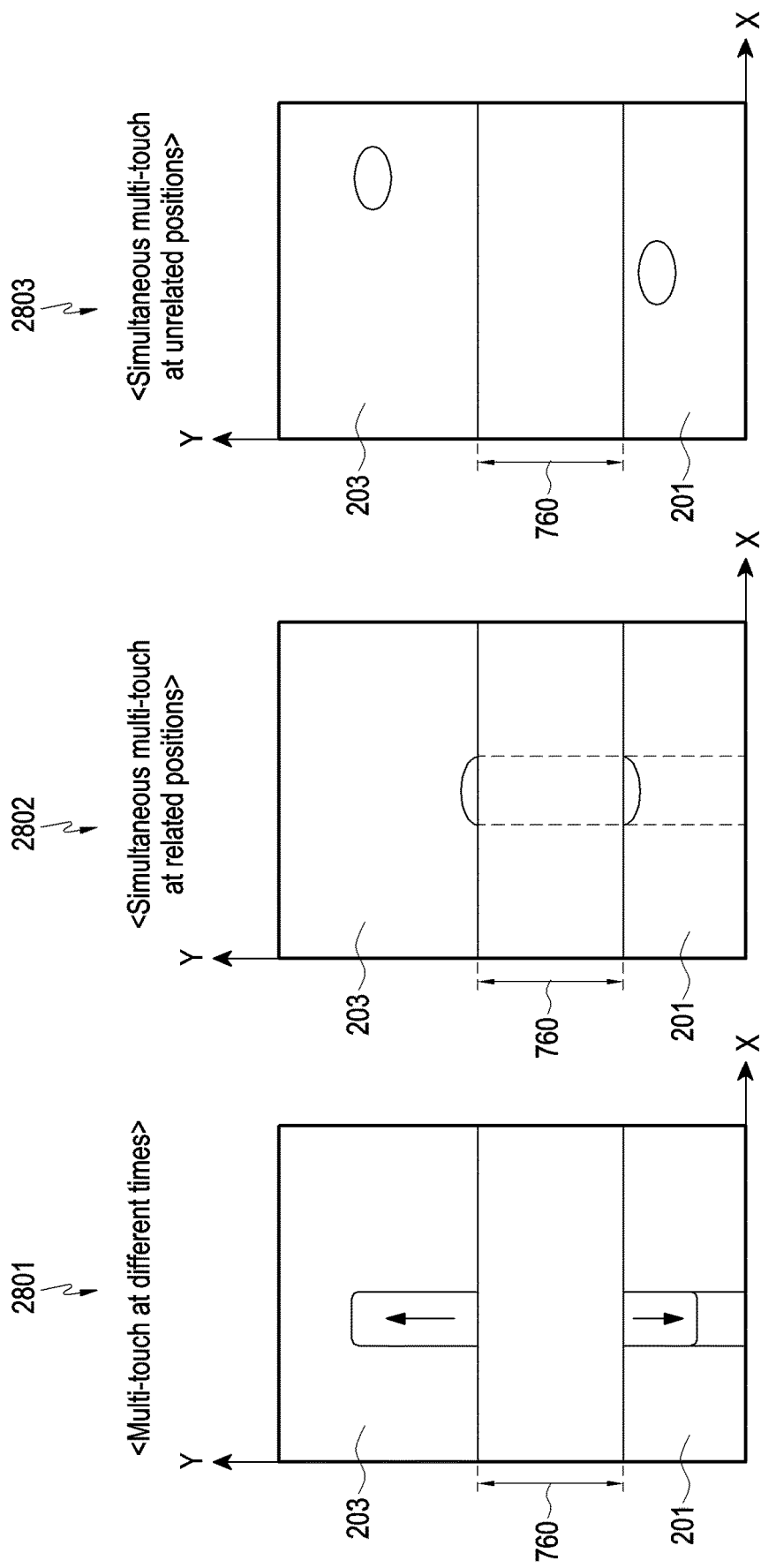
FIG. 28 is a view for describing examples of types of multi-input received in an electronic device according to various embodiments.

FIG. 28 is a view for describing examples of the type of a multi-input received in an electronic device according to various embodiments.

According to various embodiments, in operation 2701, an electronic device 101 may receive a first input on a first display 201, and may receive a second input on a second display 203. For example, the electronic device 101 may receive user inputs on the first display 201 and the second display 203 at different time points, respectively (e.g., reference numeral 2801 in FIG. 28). In another example, the electronic device 101 may receive user inputs on the first display 201 and the second display 203 at the same time point (that is, simultaneously). The user inputs received at the same time point may be received at respective related positions of displays (e.g., the first display 201 and the second display 203) (e.g., reference numeral 2802 in FIG. 28), or may be received at unrelated (different) positions (e.g., reference numeral 2803 in FIG. 28). The electronic device 101 may identify reception positions of the user inputs received at the same time point, and may perform different operations based on whether the identified positions are related to each other. A description thereof will be made when describing operations of the electronic device 101 in FIGS. 29 to 44.

According to various embodiments, in operation 2702, the electronic device 101 may identify and compare a reception time point of the first input and a reception time point of the second input. In operation 2703, as a result of the comparison, the electronic device 101 may determine whether the reception time points (e.g., the reception time point of the first input and the reception time point of the second input) are identical to each other. As a result of the determination, when the reception time points are different from each other, the electronic device 101 may perform at least one first operation in operation 2704. For example, as shown in reference numeral 2801 in FIG. 28, the electronic device 101 (e.g., a touch detection module) may sequentially receive inputs on the first display 201 and the second display 203. In an example, the electronic device 101 may receive a touch input on the first display 201, and when the received touch input continuously moves onto the second display 203, may receive a touch input (or a drag input) on the second display 203. In another example, the electronic device 101 may receive a touch input which continuously moves from a rigid display to the first display 201. The electronic device 101 may identify information about a user input reception time point, received from an input sensing circuit (e.g., the first input sensing circuit 771 and the second input sensing circuit 772) included in each display, and may determine, based on the identified time point information, that the inputs are received at different time points. The electronic device 101 may collect and identify pieces of information about positions of inputs. As described above, the electronic device 101 may identify the information about the positions of the inputs in additional consideration of the coordinates 760 of the received region of the first display 201. The electronic device 101 may perform at least one operation corresponding to the inputs received at different time points, and examples of the operation will be described when describing operations of the electronic device 101 in FIGS. 29 to 36.

According to various embodiments, in operation 2702, the electronic device 101 may identify and compare a reception time point of the first input and a reception time point of the second input. In operation 2703, as a result of the comparison, the electronic device 101 may determine whether the reception time points (e.g., the reception time point of the first input and the reception time point of the second input) are identical to (or correspond to) each other, and, as a result, may determine that the reception time points are identical to each other. For example, as shown in reference numeral 2802 in FIG. 28, the electronic device 101 may receive touch inputs by the user on a portion of the exposed region of the first display 201 and on a portion of the second display 203 that is adjacent to the portion of the exposed region. For example, when a part (e.g., a finger) of the user's body touches the first display 201 and the second display 203 at a portion therebetween, the electronic device 101 may determine that one portion of the part of the body touches the first display 201 and another portion of the part of the body touches the second display 203. In another example, as shown in reference numeral 2803 in FIG. 28, the electronic device 101 may receive a first touch input on a portion of the exposed region of the first display 201, and may receive a second touch input on a region of the second display 203 that is spaced apart by a predetermined distance. For example, the electronic device 101 may find that a part (e.g., the index finger of the left hand) of the user's body touches the first display 201 and another part (e.g., the index finger of the right hand) of the user's body touches the second display 203. When the above-described user inputs are received, the electronic device 101 may obtain information about reception time points of inputs received from the input sensing circuits of the displays, and may compare the reception time points to determine that the inputs are received at the same time.

According to various embodiments, in operation 2705, the electronic device 101 may identify and compare a reception position of the first input and a reception position of the second input, based on the fact that the reception time points of the inputs (e.g., the first input and the second input) are identical to each other. For example, the electronic device 101 may identify, based on information about inputs that are obtained from the input sensing circuits included in the displays, information about positions (e.g., coordinates) of received inputs in particular directions (e.g., a x-axis direction and a y-axis direction), and may compare the identified positions with each other. As described in relation to FIG. 7B, the electronic device 101 may integrate a coordinate system of the first display 201 and a coordinate system of the second display 203 into one coordinate system, and may compare positions (coordinates) of inputs received on different displays (e.g., the first display 201 and the second display 203) in the integrated coordinate system to identify the degree of correlation between the positions. For example, the electronic device 101 may identify (calculate) the difference between a first coordinate, in particular directions (e.g., a x-axis direction and a y-axis direction), of a first input received on the first display 201 and a second coordinate, in the particular directions (e.g., the x-axis direction and the y-axis direction), of a second input received on the second display 203. The electronic device 101 may determine that the smaller the difference between the coordinates becomes, the greater the degree of correlation between the positions at which the inputs are received becomes.

According to various embodiments, when comparing the positions, the electronic device 101 may further refer to (or reflect) information about the coordinates 760 (or information about the size) of the drawn-in region (i.e., the unexposed region) of the first display 201. For example, when comparing positions of two inputs (e.g., the first input and the second input) in the y-axis direction (or the lengthwise direction or the longitudinal direction), the electronic device 101 may further reflect the information about the coordinates 760 of the drawn-in region of the first display 201. In an example, when a coordinate of the first input in the y-axis direction is a first coordinate and a coordinate of the second input in the longitudinal direction is a second coordinate, the electronic device 101 may calculate the difference between the first coordinate and the second coordinate, and may subtract the length of the drawn-in region of the first display 201 in the y-axis direction from the calculated difference to identify a final difference value. The electronic device 101 may determine that the smaller the final difference value becomes, the greater the degree of correlation between the positions at which the inputs are received becomes.

According to various embodiments, when the difference identified based on the comparison result is determined to be smaller than a threshold value in operation 2706, the electronic device 101 may perform, in operation 2707, at least one second operation corresponding to the first input and the second input. For example, the electronic device 101 may perform at least one operation corresponding to inputs that have been received at positions related to each other at the same time point, and examples of the operation will be described when describing operations of the electronic device 101 in FIGS. 37 to 40.

According to various embodiments, when the difference identified based on the comparison result is determined to be equal to or larger than the threshold value in operation 2706, the electronic device 101 may perform, in operation 2708, at least one third operation corresponding to the first input and the second input. For example, the electronic device 101 may perform at least one operation corresponding to inputs that have been received at positions unrelated to (different from or spaced apart from) each other at the same time point, and examples of the operation will be described when describing operations of the electronic device 101 in FIGS. 41 to 44.

Hereinafter, a description will be made of various examples of an operation which the electronic device 101 performs based on the above-described types of multi-input received in the electronic device 101 (e.g., multi-input received at different times, multi-input simultaneously received at positions related to each other, or multi-input received at positions unrelated to each other at different times).

Hereinafter, a description will be made of another example of an operation which the electronic device 101 according to various embodiments performs based on multi-input received at different times.

According to various embodiments, the electronic device 101 may receive multi-input at different time points while displaying one content (e.g., a locking screen), may identify information (e.g., patterns) corresponding to the received multi-input, and may perform at least one operation (e.g., may release the locking screen).

Figure 29:
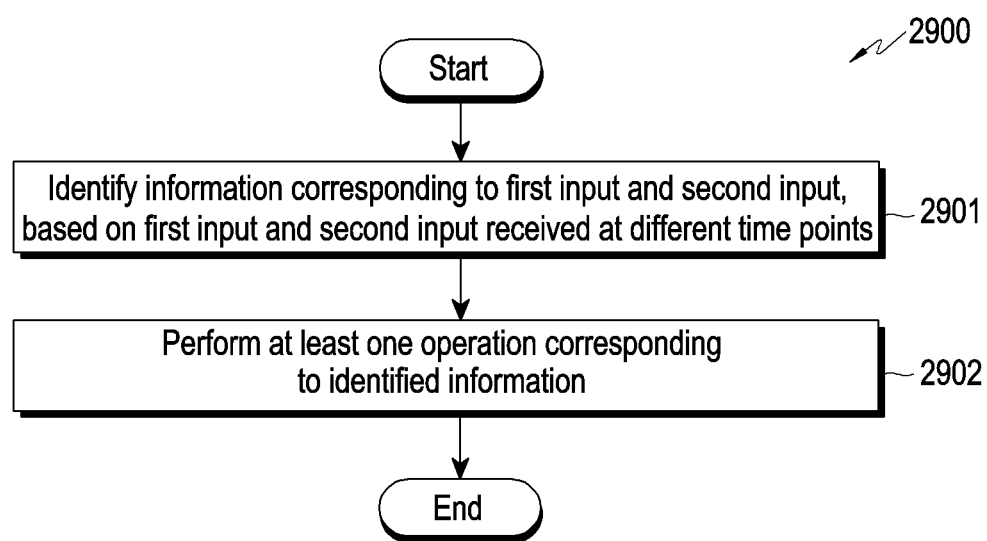
FIG. 29 is a flowchart for describing another example of an operation of an electronic device according to various embodiments.

FIG. 29 is a flowchart for describing another example of an operation of an electronic device according to various embodiments. Referring to FIG. 29, depicting flowchart 2900, according to various embodiments, operations illustrated in FIG. 29 may be performed in various orders without being limited to the illustrated order. Further, according to various embodiments, operations, which are more numerous than the operations illustrated in FIG. 29, may be performed or at least one operation, which is fewer than the operations illustrated in FIG. 29, may be performed. Hereinafter, the operations in FIG. 29 will be described with reference to FIG. 30.

Figure 30:
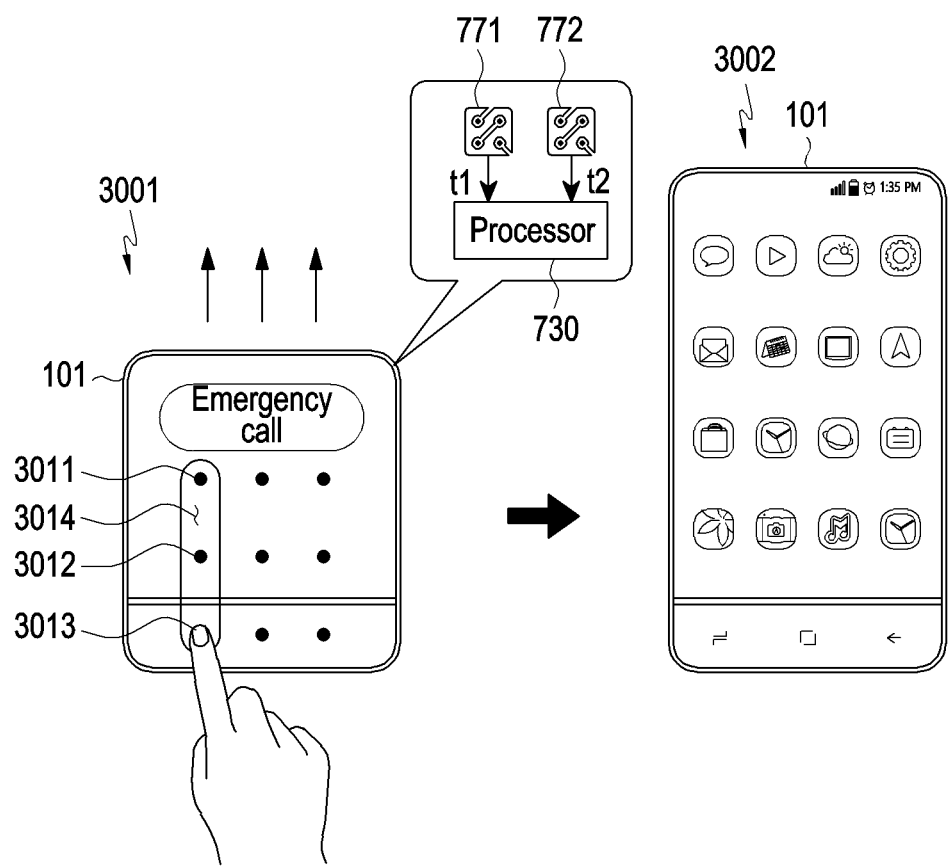
FIG. 30 is a view for describing an example in which an electronic device according to various embodiments performs at least one operation based on multi-input received at different times.

FIG. 30 is a view for describing an example in which an electronic device according to various embodiments performs at least one operation based on multi-input received at different times.

According to various embodiments, in operation 2901, an electronic device 101 may identify information corresponding to a first input and a second input, which are received at different time points, on the basis of the first input and the second input. For example, while displaying a screen (e.g., an unlocking screen) for acquiring a user input, the electronic device 101 may receive, based on user inputs received on two displays (e.g., the first display 201 and the second display 203) at different time points, attribute information about inputs (e.g., information about the positions of the inputs and information about time points at which the inputs are received) from input sensing circuits of the displays. In an example, when the electronic device 101 switches from a locked state to a wake-up state, the electronic device 101 may display one portion of a locking screen on the first display 201 and another portion of the locking screen on the second display 203. As shown in reference numeral 3001 in FIG. 30, the portions of the locking screen, displayed on the two displays (e.g., the first display 201 and the second display 203), may include objects 3011, 3012, and 3013 that can be selected by a user input. The electronic device 101 may receive a moving user input (e.g., a drag input) 3014 on the locking screen displayed on the two displays (e.g., the first display 201 and the second display 203). The electronic device 101 (e.g., the first processor 730) may obtain, based on the moving user input, position (e.g., coordinates) information that is received from input sensing circuits (e.g., the first input sensing circuit 771 and the second input sensing circuit 772) implemented in the two displays at different times t1 and t2, and may compare the obtained position information with the objects 3011, 3012, and 3013 to identify selected objects. A screen displayed in the electronic device 101 is not limited to the above-described example, and may include execution screens of various applications (e.g., a drawing application) for acquiring a user input and identifying and/or providing information (e.g., hand writing) corresponding to the user input (e.g., an execution screen implemented so as to provide a function of displaying objects according to a user input).

According to various embodiments, in operation 2902, the electronic device 101 may perform at least one operation corresponding to the identified information. For example, the electronic device 101 may identify a pattern on the basis of the objects 3011, 3012, and 3013 selected by a drag input received on the first display 201 and the second display 203, and may determine whether the identified pattern is a pattern for unlocking. The electronic device 101 may display, on the two displays, an object (e.g., a line) connecting the objects selected on the two displays (e.g., the first display 201 and the second display 203) according to the user input. When the pattern is a pattern for unlocking, the electronic device 101 may release the locked state of the electronic device 101 and display a home screen, as shown in reference numeral 3002 in FIG. 30. Without being limited to the above-described example, the electronic device 101 may also perform an operation of displaying an object (e.g., hand writing, a line, a figure, etc.) according to a drag input received on the execution screen of each of various applications (e.g., a drawing application).

According to various embodiments, when the locked state is released, the electronic device 101 may cause the first display 201 to slide a predetermined distance. For example, a distance that the first display 201 is to slide may be identified based on information about the length of an application execution screen displayed when the locked state of the electronic device 101 is released, or information about a distance predetermined by a user. In an example, the electronic device 101 may cause the first display 201 to slide (be drawn out or drawn in) by a distance corresponding to information about the length of an execution screen of an application displayed when the locked state is released. The operation in which the electronic device 101 causes the first display 201 to slide based on the information about the length of an application execution screen may be performed like the above-described operations of the electronic device 101 in FIGS. 17 to 23, and thus a redundant description thereof will be omitted.

Hereinafter, a description will be made of another example of an operation of the electronic device 101 according to various embodiments.

According to various embodiments, the electronic device 101 may display, based on an application management module, a plurality of icons for executing a plurality of applications on a rigid application.

Figure 31:
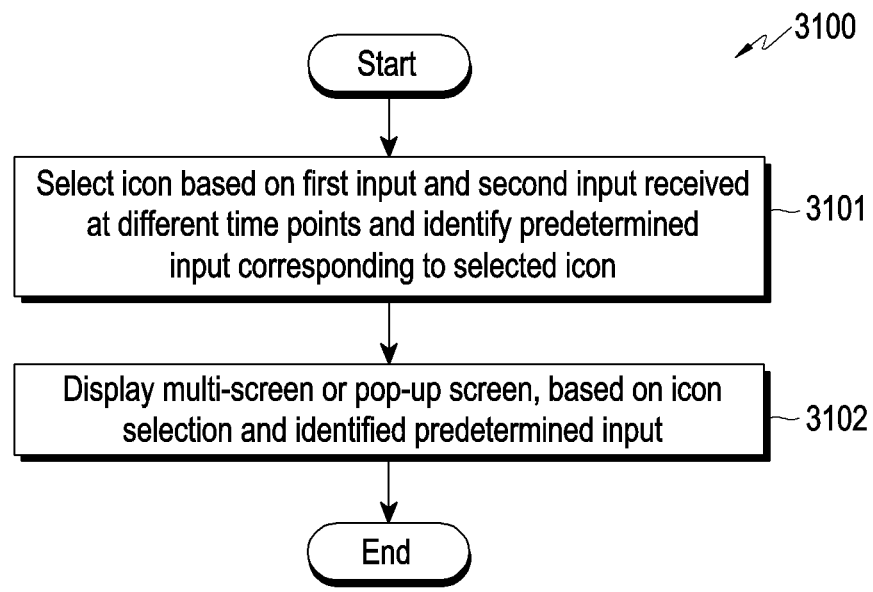
FIG. 31 is a flowchart for describing another example of an operation of an electronic device according to various embodiments.

FIG. 31 is a flowchart for describing another example of an operation of an electronic device according to various embodiments. Referring to FIG. 31, depicting flowchart 3100, according to various embodiments, the operations illustrated in FIG. 31 may be performed in various orders without being limited to the illustrated order. Further, according to various embodiments, operations, which are more numerous than the operations illustrated in FIG. 31, may be performed or at least one operation, which is fewer than the operations illustrated in FIG. 31, may be performed. Hereinafter, the operations in FIG. 31 will be described with reference to FIGS. 32 to 34.

Figure 32:
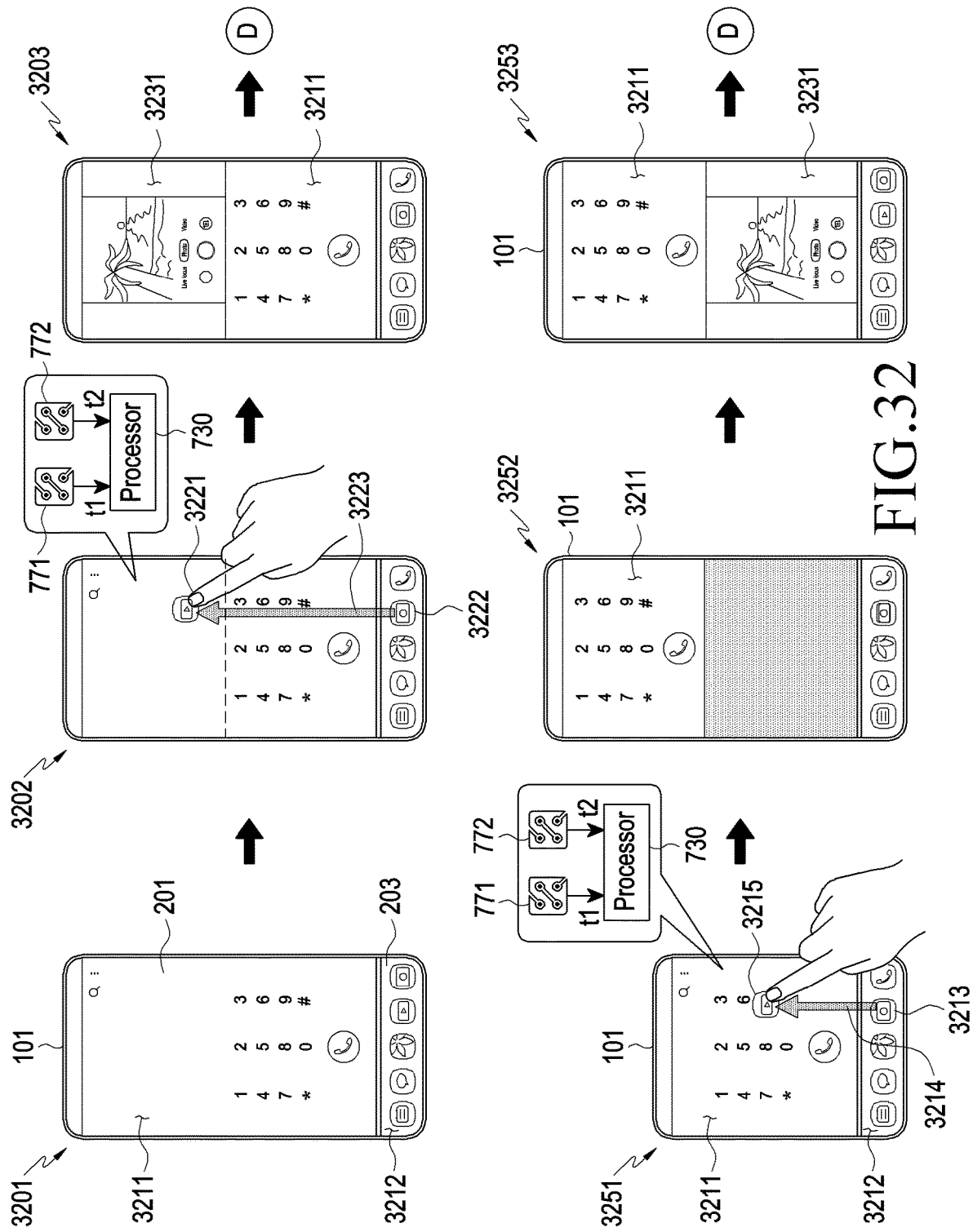
FIG. 32 is a view for describing an example in which an electronic device according to various embodiments displays a plurality of screens on a basis of multi-touch received at different times.
Figure 33:
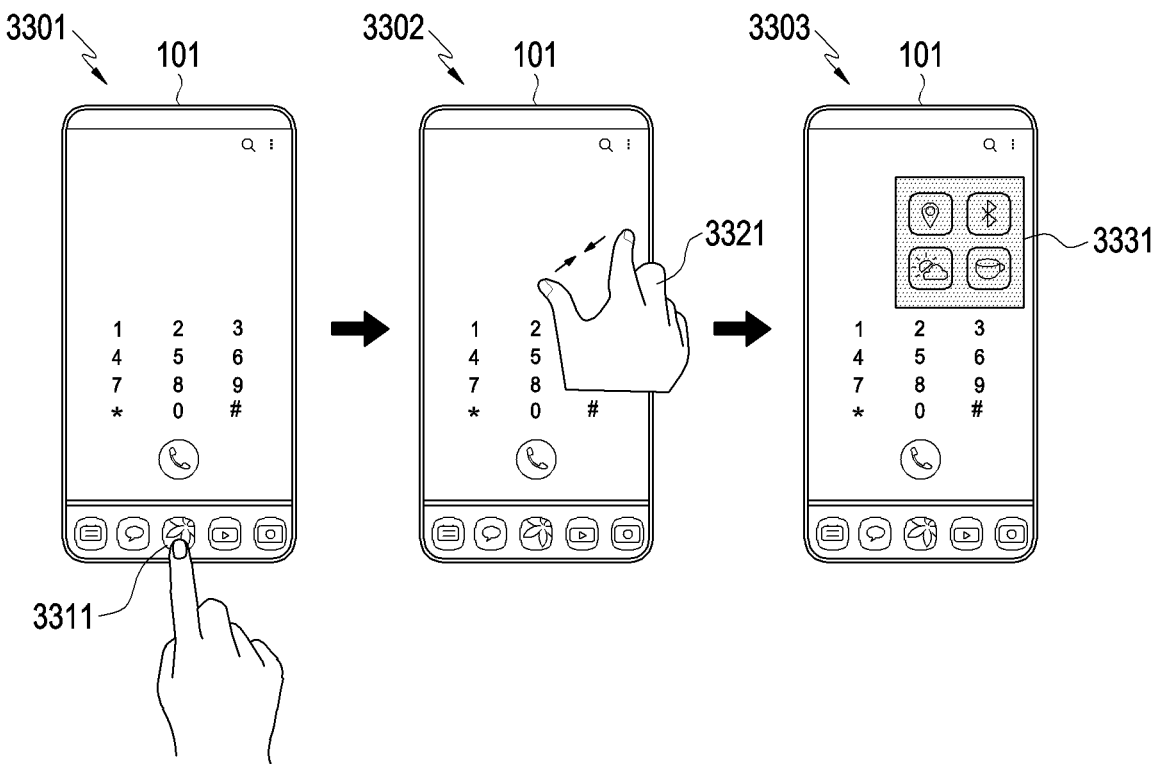
FIG. 33 is a view for describing an example in which an electronic device according to various embodiments displays a pop-up screen on a basis of multi-touch received at different times.
Figure 34:
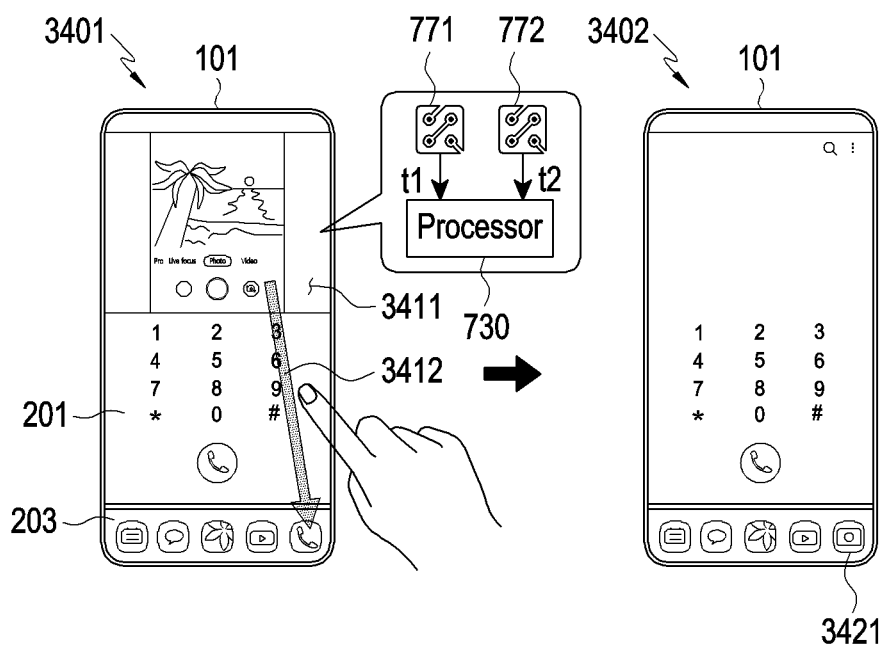
FIG. 34 is a view for describing an example in which an electronic device according to various embodiments controls (e.g. removes) an application execution screen on a basis of multi-touch received at different times.

FIG. 32 is a view for describing an example in which an electronic device according to various embodiments displays a plurality of screens on the basis of multi-touch received at different times. FIG. 33 is a view for describing an example in which an electronic device according to various embodiments displays a pop-up screen on the basis of multi-touch received at different times. FIG. 34 is a view for describing an example in which an electronic device according to various embodiments controls (e.g., removes) an application execution screen on the basis of multi-touch received at different times.

According to various embodiments, in operation 3101, an electronic device 101 may select, based on a first input and a second input received at different time points, an icon and may identify a predetermined input corresponding to the selected icon. For example, as shown in reference numerals 3201 and 3251 in FIG. 32 and reference numeral 3301 in FIG. 33, the electronic device 101 may display, based on an application management module, a screen 3212, which includes a plurality of icons for executing a plurality of applications, on the second display 203 while displaying an execution screen 3211 of one application on the first display 201. The operation in which the electronic device 101 displays, based on the application module, the screen 3212 including a plurality of icons for executing a plurality of applications may be performed as illustrated in FIGS. 21 to 23, and thus a redundant description thereof will be omitted. As shown in reference numerals 3202 and 3251 in FIG. 32 and reference numeral 3301 in FIG. 33, the electronic device 101 may receive a user's touch input 3222 or 3213 for selecting one icon 3221 or 3215 from among the plurality of icons on the second display 203 on which the plurality of icons are displayed, and may receive various user inputs (e.g., a drag input 3223 or 3214), a touch input, a pinch input 3321) on the first display 201. The electronic device 101 (e.g., the first processor 730) may obtain, based on a moving user input, position (e.g., coordinates) information received at different times t1 and t2 from input sensing circuits (e.g., the first input sensing circuit 771 and the second input sensing circuit 772) implemented in the two displays, may identify a touch input on the second display 203 on the basis of the obtained position information, and may identify the type of user input on the first display 201.

According to various embodiments, in operation 3202, the electronic device 101 may display a plurality of screens or a pop-up screen, based on the icon selection and the identified predetermined input. For example, after selection of the icon, the electronic device 101 may perform different operations (e.g., a multi-screen display operation (e.g., FIG. 32) or a pop-up screen display operation (e.g., FIG. 33)) depending on the type of user input received on the first display 201 (e.g., the drag input 3223 or 3214, the touch input, and the pinch input 3321). For example, after selecting the icon, the electronic device 101 may pre-store information about an operation (e.g., the multi-screen display operation or the pop-up screen display operation) to be performed for each type of user input received on the first display 201. Hereinafter, a description will be made of an example of the multi-screen display operation of the electronic device 101 and an example of the pop-up screen display operation of the electronic device 101.

Hereinafter, first, a description will be made of examples of the multi-screen display operation of the electronic device 101.

According to various embodiments, as shown in reference numerals 3202 and 3251 in FIG. 32, when the touch input 3213 or 3222 for selecting one icon 3221 or 3215 is received on the second display 203 and then the drag input 3223 or 3214 moving the icon to the first display 201 is received, the electronic device 101 may perform a multi-screen display operation. Hereinafter, different examples of the multi-screen display operation will be described.

For example, as shown in reference numerals 3201 and 3202 in FIG. 32, the electronic device 101 may receive the drag input 3223 for moving the selected icon 3221 to at least a portion of the region of the first display 201. When the received drag input 3223 is released on the first display 201, the electronic device 101 may display, as shown in reference numeral 3203 in FIG. 32, an execution screen 3231 of an application (e.g., a camera application) corresponding to the selected icon together with the previously displayed execution screen 3211 of an application (e.g., a phone application). The icon 3221 selected on the second display 203 may disappear from the second display 203. An icon corresponding to a new application may be displayed at the position from which the icon 3221 has disappeared. Further, without being limited to the description, display of the icon 3221 may be maintained, and when the icon 3221 is selected again, a corresponding application (e.g., the camera application) may be ended or may switch to a background mode. The application execution screens displayed together on the first display 201 may not overlap each other. The electronic device 101 may identify, based on the position of the drag input 3223 on the first display 201, a region in which the execution screen of the application corresponding to the one icon is displayed, and may highlight the identified region. For example, as shown in reference numeral 3202 in FIG. 32, the electronic device 101 may divide the currently exposed region of the first display 201 into two segments (e.g., an upper segment and a lower segment), and may display the execution screen 3231 of the application (e.g., the camera application) corresponding to the one icon on a segment in which the drag input is positioned and released (e.g., the upper segment in reference numeral 3202 in FIG. 32) among the segments. The electronic device 101 may highlight the segment in which the drag input is positioned (e.g., the upper segment), or may display a ghost view corresponding to an application execution screen (e.g., execution screen 3231) in the region (e.g., the upper segment) to provide pre-notification of a region, in which the application execution screen (e.g., execution screen 3231) is to be displayed, before the application execution screen (e.g., execution screen 3231) is displayed. The ghost view may be a screen having at least one visual attribute (e.g., at least one of brightness, color, or size) related to the application execution screen (e.g., execution screen 3231), and may not be identical to the application execution screen (e.g., execution screen 3231) but may be visually similar to the application execution screen.

In another example, when the drag input 3214 for moving one selected icon 3215 to at least a portion of the region of the first display 201 is received as shown in reference numeral 3251 in FIG. 32, the electronic device 101 may cause, based on information about the length of an application corresponding to the one icon, the first display 201 to slide, as shown in reference numeral 3252 in as illustrated in FIG. 32. The operation in which the electronic device 101 causes the first display 201 to slide, based on the information about the length of the application, may be performed like operations of the electronic device 101 illustrated in FIGS. 18 to 23, and thus a redundant description thereof will be omitted. The electronic device 101 may cause the first display 201 to slide while maintaining the execution screen 3211 of the application (e.g., the phone application) that is being displayed in the originally exposed region of the first display 201. As shown in reference numeral 3253 in FIG. 32, after the first display 201 slides, the electronic device 101 may display the execution screen 3231 of the application corresponding to one icon 3215 in a newly exposed region of the first display 201. Further, without being limited to the description, the electronic device 101 may resize, while the first display 201 slides, the size of the application execution screen 3211 so as to correspond to the size of the exposed region of the first display 201, and may then display the resized execution screen 3211. Subsequently, after sliding of the first display 201 is completed, the electronic device 101 may divide the exposed region of the first display 201 into two segments (e.g., an upper segment and a lower segment), and may display the application execution screens 3211 and 3254 in the segments, respectively. The icon 3215 selected on the second display 203 may disappear from the second display 203. An icon corresponding to a new application may be displayed at the position from which the icon 3215 has disappeared. Further, without being limited to the description, display of the icon 3215 may be maintained, and when the icon 3215 is selected again, a corresponding application (e.g., the camera application) may be ended or may switch to a background mode.

In another example, although not illustrated, when at least two icons are selected on the second display 203, the electronic device 101 may display execution screens corresponding to the selected icons as a plurality of screens on the first display 201. In an example, when the electronic device 101 receives a drag input (e.g., drag input on icons to be selected) and/or touch input (e.g., touch input on icons by using fingers) for selecting at least two icons on the second display 203 and then receives a drag input to the first display 201, the electronic device 101 may further display execution screens of at least two applications on the first display 201.

Hereinafter, a description will be made of examples of the pop-up screen display operation of the electronic device 101.

According to various embodiments, as shown in reference numerals 3301 and 3302 in FIG. 33, when one icon is selected (3311) on the second display 203 and then the pinch input 3321 is received on the first display 201, the electronic device 101 may display an execution screen of an application (e.g., a gallery application) corresponding to the one icon in the form of a pop-up screen 3331. For example, as shown in reference numeral 3303 in FIG. 33, the electronic device 101 may display the pop-up screen 3331 at a position at which the pinch input 3321 is received. When the pinch input 3321 is received within a predetermined time after a touch input for selecting one icon, the electronic device 101 may display the pop-up screen 3331. The icon selected on the second display 203 may disappear from the second display 203. An icon corresponding to a new application may be displayed at the position from which the icon has disappeared. Further, without being limited to the description, display of the icon may be maintained, and when the icon is selected again, a corresponding application (e.g., a gallery application) may be ended or may switch to a background mode.

The types of user inputs (e.g., the drag input and the pinch input) for displaying the plurality of screens or the pop-up screen are provided only for illustrative purposes, and thus the operation of displaying the plurality of screens or the pop-up screen may be performed based on various types of user inputs. In an example, when a rotation input, instead of the pinch input, is received on the first display 201, a pop-up screen display operation may be performed. For example, the application management module may manage and/or configure the type of user input causing the multi-screen display operation or the pop-up screen display operation, and may reconfigure the configured type of user input on the basis of user control.

According to various embodiments, the electronic device 101 may perform an operation corresponding to a drag input moving from the first display 201 to the second display 203. Referring to FIG. 34, as shown in reference numeral 3401 in FIG. 34, an electronic device 101 may receive a touch input selecting an execution screen 3411 displayed on the first display 201 and may then receive a drag input 3412 moving to the second display 203. The electronic device 101 may switch a mode of an application corresponding to the selected execution screen from a foreground mode to a background mode, and, as shown in reference numeral 3402 in FIG. 34, may display, on the second display 203, an icon 3421 of the application, the mode of which has been switched to the background mode. When the displayed icon 3421 is selected, the electronic device 101 may switch the mode of the application to the foreground mode and execute the application.

Hereinafter, a description will be made of another example of an operation of the electronic device 101 according to various embodiments.

According to various embodiments, the electronic device 101 may authenticate a user on the basis of a user input received on the second display 203, and when the authentication is completed, may cause the first display 201 to slide.

Figure 35:
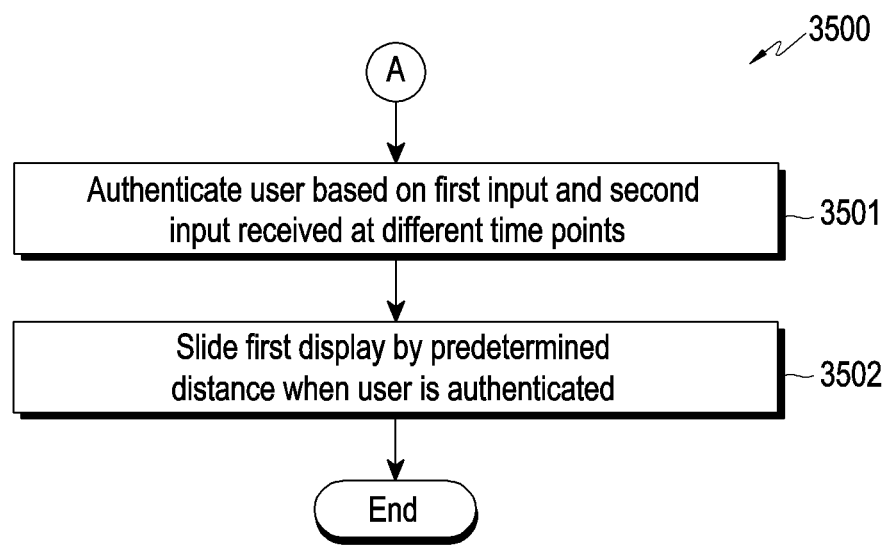
FIG. 35 is a flowchart for describing another example of an operation of an electronic device according to various embodiments.

FIG. 35 is a flowchart for describing another example of an operation of an electronic device according to various embodiments. Referring to FIG. 35, depicting flowchart 3500, according to various embodiments, the operations illustrated in FIG. 35 may be performed in various orders without being limited to the illustrated order. Further, according to various embodiments, operations, which are more numerous than the operations illustrated in FIG. 35, may be performed or at least one operation, which is fewer than the operations illustrated in FIG. 35, may be performed. Hereinafter, the operations in FIG. 35 will be described with reference to FIG. 36.

Figure 36:
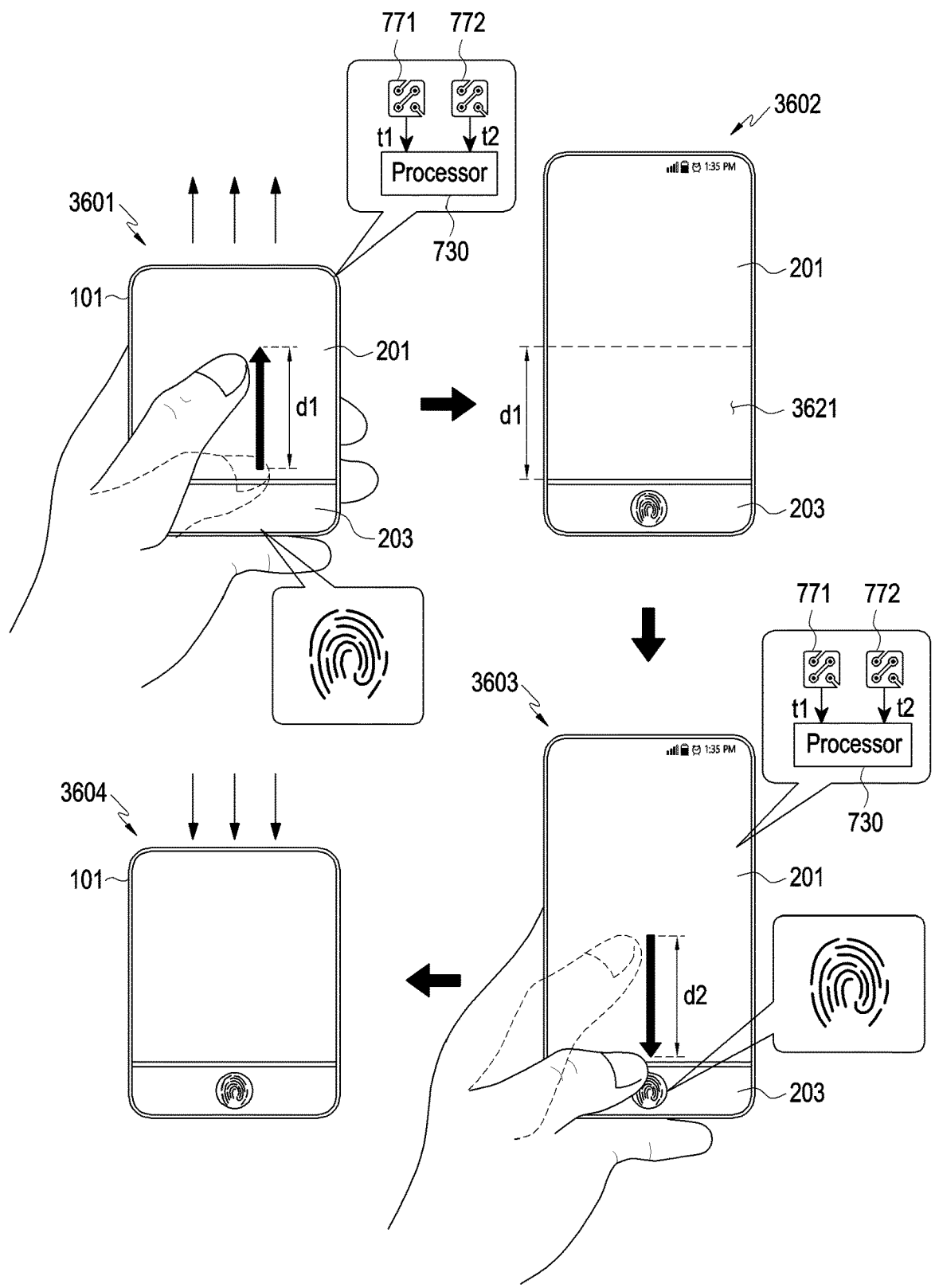
FIG. 36 is a view for describing an example in which an electronic device according to various embodiments authenticates a user, based on inputs received at different times, and causes a first display to slide.

FIG. 36 is a view for describing an example in which an electronic device according to various embodiments authenticates a user, based on inputs received at different times, and causes a first display to slide.

According to various embodiments, in operation 3501, an electronic device 101 may authenticate a user on the basis of a first input and a second input that are received at different time points. For example, as shown in reference numeral 3601 in FIG. 36, in a locked state, the electronic device 101 may detect a touch of the user's finger on a fingerprint sensor which is formed in at least a portion of the region of the second display 203. The fingerprint sensor may be implemented in the second display 203 together with the second input sensing circuit 772. The electronic device 101 may compare an identified fingerprint of the user with the user's fingerprint preregistered in electronic device 101 by using the fingerprint sensor, and may authenticate the user on the basis of the comparison result. The electronic device 101 may receive a drag input moving to the first display 201 after a user input is detected on the second display 203. When the fingerprint sensor is touched by the user while an input sensing circuit (e.g., the first input sensing circuit 771) implemented in the first display 201 in the locked state is turned off, the electronic device 101 may turn on the input sensing circuit (e.g., the first input sensing circuit 771) of the first display 201 to detect the drag input received on the first display 201.

According to various embodiments, in operation 3502, when the user is authenticated, the electronic device 101 may cause the first display 201 to slide a predetermined distance. For example, as shown in reference numeral 3602 in FIG. 36, when it is determined that the user's fingerprint is the user's fingerprint registered in the electronic device 101, the electronic device 101 may complete the user authentication and may cause the first display 201 to slide (e.g., slide out) by a predesignated distance. The predesignated distance may correspond to a movement distance (d1) of the drag input received on the first display 201. For example, the electronic device 101 may identify information about the position of the drag input from the second input sensing circuit 772 implemented in the first display 201, and may identify the movement distance of the drag input on the identified information of the position. The electronic device 101 (e.g., the movement control module 731) may control a motor such that the first display 201 slides (e.g., slide out) by the identified movement distance (d1). Therefore, a region 3621 of the first display 201, corresponding to the identified movement distance may be drawn out. Without being limited to the description, the predesignated distance may be a distance preset in the electronic device 101.

According to various embodiments, the electronic device 101 may cause the first display 201 to slide on the basis of a drag input moving from the first display 201 to the second display 203. For example, as shown in 3603 in FIG. 36, the electronic device 101 (e.g., the first processor 730) may use the input sensing circuits (e.g., the first input sensing circuit 771 and the second input sensing circuit 772) to receive a touch input on the first display 201 and to receive a drag input moving to the fingerprint sensor of the second display 203. The electronic device 101 may authenticate the user on the fingerprint sensor, and when the authentication is completed, as shown in 3604 in FIG. 36, may cause the first display 201 to slide (e.g., slide in) by a predesignated distance. The predesignated distance may correspond to a movement distance (d2) of the drag input identified on the first display 201.

Hereinafter, a description will be made of another example of an operation of the electronic device 101 according to various embodiments.

According to various embodiments, the electronic device 101 may identify, based on movement distances of multi-touch received at positions related to each other at the same time point, a distance that the first display 201 is to slide, and may display information about the identified distance.

Figure 37:
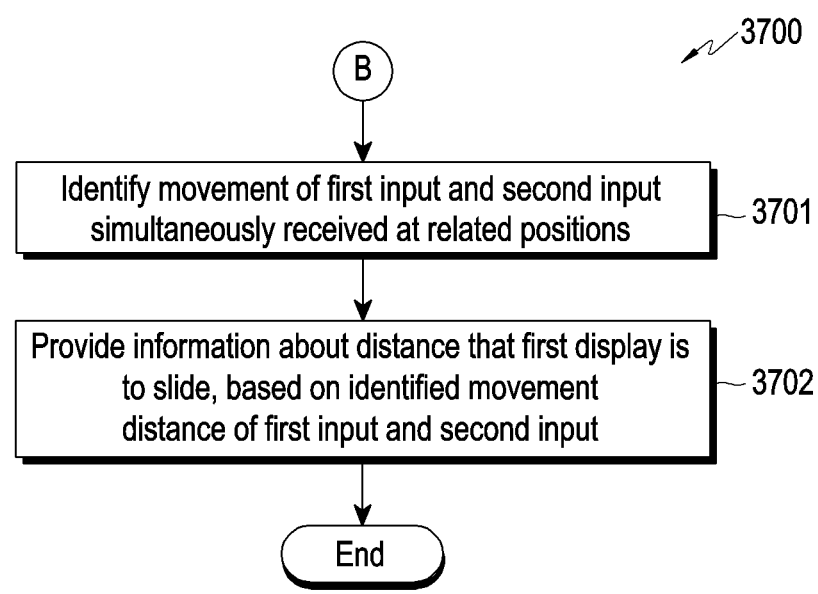
FIG. 37 is a flowchart for describing another example of an operation of an electronic device according to various embodiments.

FIG. 37 is a flowchart for describing another example of an operation of an electronic device according to various embodiments. Referring to FIG. 37, depicting flowchart 3700, according to various embodiments, operations illustrated in FIG. 37 may be performed in various orders without being limited to the illustrated order. Further, according to various embodiments, operations, which are more numerous than the operations illustrated in FIG. 37, may be performed or at least one operation, which is fewer than the operations illustrated in FIG. 37, may be performed. Hereinafter, the operations in FIG. 37 will be described with reference to FIG. 38.

Figure 38:
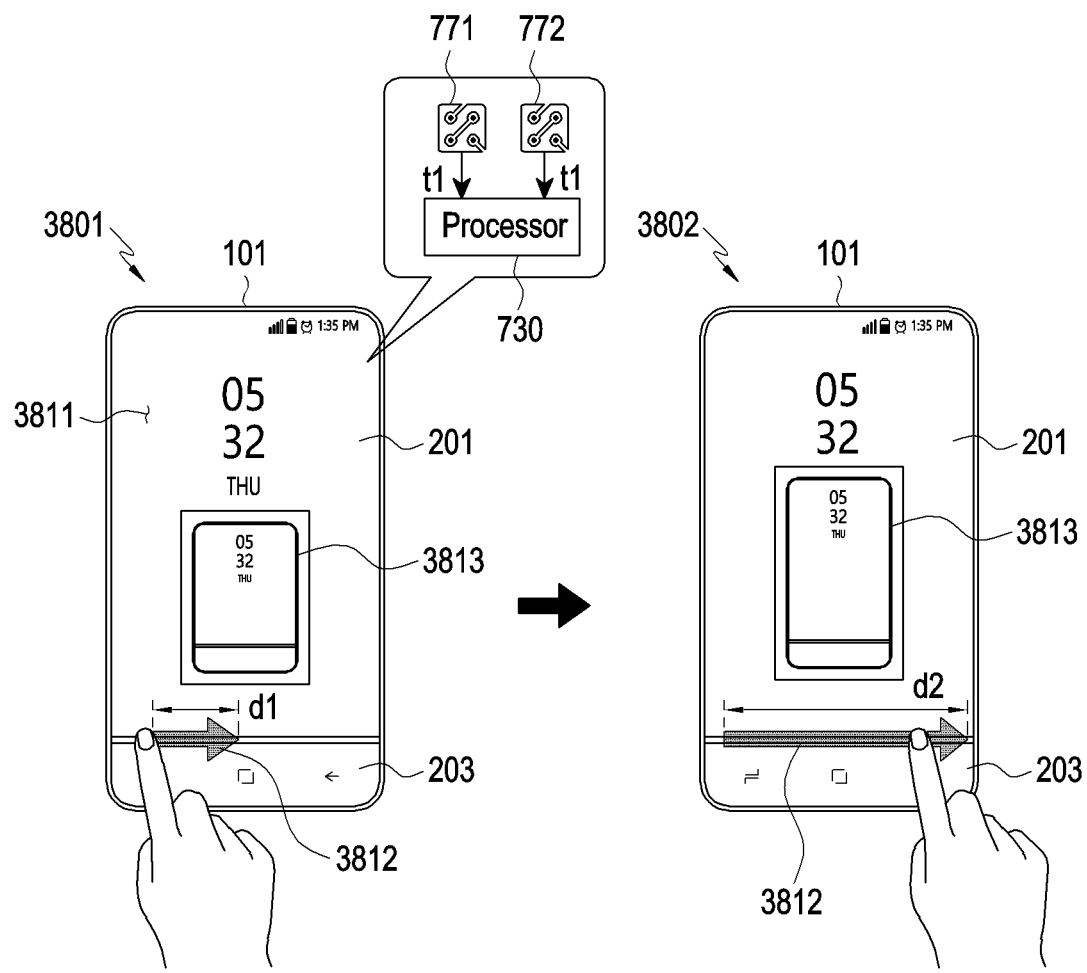
FIG. 38 is a view for describing an example in which an electronic device according to various embodiments displays information about a distance that a first display is to slide, on the basis of inputs simultaneously received at positions related to each other.

FIG. 38 is a view for describing an example in which an electronic device according to various embodiments displays information about a distance that a first display is to slide, on the basis of inputs simultaneously received at positions related to each other.

According to various embodiments, in operation 3701, an electronic device 101 may identify a movement distance of each of a first input and a second input that are simultaneously received at positions related to each other. For example, as shown in reference numeral 3801 in FIG. 38, the electronic device 101 may simultaneously receive, while displaying one content (e.g., a protective screen) 3811, user inputs (e.g., a user's touch) in an exposed region of the first display 201 and a region of the second display 203, which are adjacent to a member (e.g., an optical member) formed between the first display 201 and the second display 203. On the basis of information about reception time points of inputs, which is obtained from input sensing circuits (e.g., the first input sensing circuit 771 and the second input sensing circuit 772) of displays (e.g., the first display 201 and the second display 203), the electronic device 101 (e.g., the first processor 730) may determine that the inputs are received at the same time (e.g., a first time point t1). Further, the electronic device 101 (e.g., the first processor 730) may calculate the degree of correlation between positions of the inputs on the basis of information about reception positions of the inputs. When the calculated degree of correlation has a value equal to or greater than a predetermined value, the electronic device 101 may determine that the inputs have been received at positions related to each other.

According to various embodiments, in operation 3702, the electronic device 101 may provide information about a distance that the first display 201 is to slide. For example, as shown in reference numerals 3801 and 3802 in FIG. 38, the electronic device 101 may determine that, in a state in which user inputs simultaneously received at positions related to each other are maintained, the user inputs move (3812) in one direction (e.g., a transverse direction). The electronic device 101 may identify the occurrence of an event causing sliding of the first display 201, based on the determination of the movement 3812 of the user inputs while displaying one content. The electronic device 101 may identify a distance that the user inputs move from the positions related to each other, and may determine that a distance corresponding to the identified movement distance is a distance that the first display 201 is to slide. When the user inputs are released or moved away from the positions related to each other (e.g., when the user's touch moves to the first display 201 or the second display 203 as the user's touch moves), the electronic device 101 may cause the first display 201 to slide the identified distance.

According to various embodiments, before sliding of the first display 201, the electronic device 101 may display information about the distance that the first display 201 is to slide. For example, as shown in 3801 and 3802 in FIG. 38, the electronic device 101 may, on the basis of the distance (e.g., d1 or d2) that the first display 201 is to slide, change the currently displayed content, and may display the changed content in the form of a preview 3813 (e.g., may display the changed content on the first display 201 or the second display 203). The changed content may be a content resized in order to be displayed in changed regions of displays (e.g., an exposed region of the first display 201 and a region of the second display 203) after the first display 201 is moved. Therefore, the size (or width and length) of the changed content may be proportional to a movement distance of the first display 201. The user may determine, based on the size of the displayed content, the distance that the first display 201 is to move.

Hereinafter, a description will be made of another example of an operation of the electronic device 101 according to various embodiments.

According to various embodiments, the electronic device 101 may change and display the screen of a display (e.g., the first display 201 or the second display 203) on the basis of movement of multi-touch simultaneously received at positions related to each other.

Figure 39:
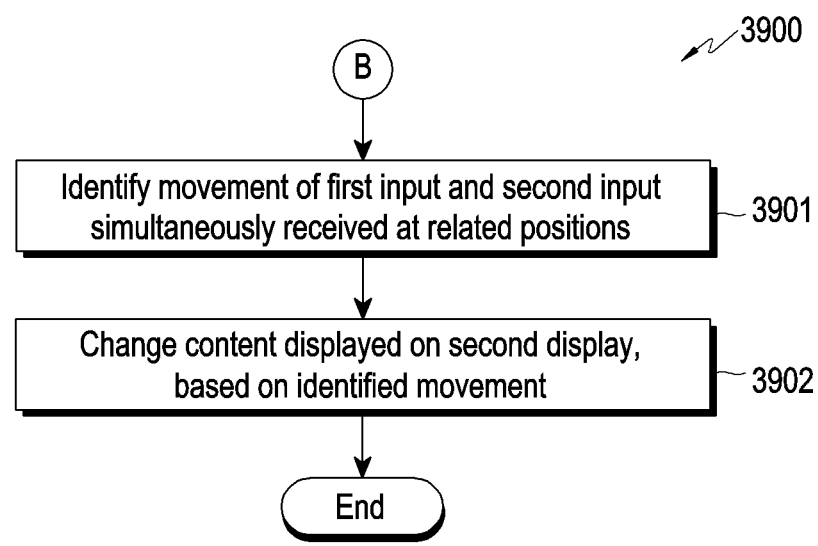
FIG. 39 is a flowchart for describing another example of an operation of an electronic device according to various embodiments.

FIG. 39 is a flowchart for describing another example of an operation of the electronic device 101 according to various embodiments. Referring to FIG. 39, depicting flowchart 3900, according to various embodiments, operations illustrated in FIG. 39 may be performed in various orders without being limited to the illustrated order. Further, according to various embodiments, operations, which are more numerous than the operations illustrated in FIG. 39, may be performed or at least one operation, which is fewer than the operations illustrated in FIG. 39, may be performed. Hereinafter, the operations in FIG. 39 will be described with reference to FIG. 40.

Figure 40:
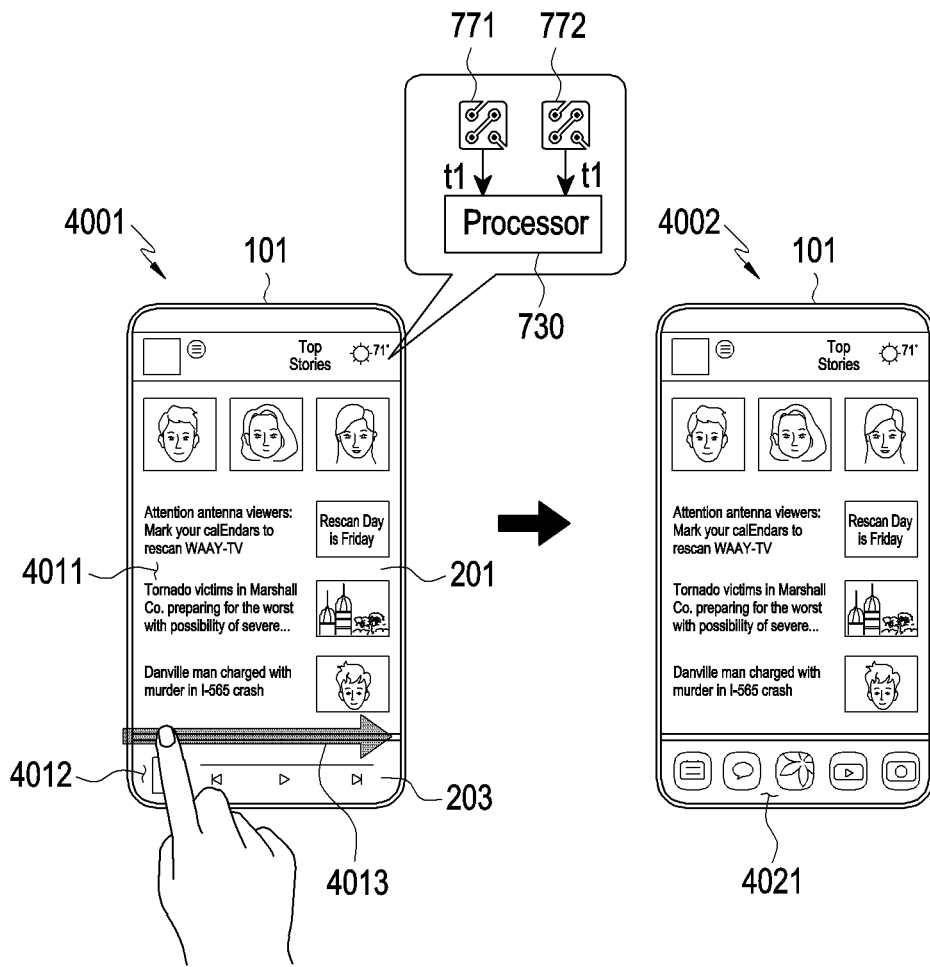
FIG. 40 is a view for describing an example in which an electronic device according to various embodiments changes a display screen on the basis of inputs simultaneously received at positions related to each other.

FIG. 40 is a view for describing an example in which an electronic device according to various embodiments changes a display screen on the basis of inputs simultaneously received at positions related to each other.

According to various embodiments, in operation 3901, an electronic device 101 may identify movement of a first input and a second input that are simultaneously received at positions related to each other. For example, as shown in reference numeral 4001 in FIG. 40, the electronic device 101 may display a content 4011 (e.g., an execution screen) related to a first application on the first display 201, and may display a content 4012 (e.g., an execution screen) related to a second application on the second display 203. The electronic device 101 may simultaneously receive, while displaying the contents, a user input (e.g., a user's touch) in an exposed region of the first display 201 and a region of the second display 203, which are adjacent to a member (e.g., an optical member) formed between the first display 201 and the second display 203. On the basis of information about reception time points of inputs, which is obtained from input sensing circuits (e.g., the first input sensing circuit 771 and the second input sensing circuit 772) of displays (e.g., the first display 201 and the second display 203), the electronic device 101 (e.g., the first processor 730) may determine that the inputs are received at the same time (e.g., a first time point t1). Further, the electronic device 101 (e.g., the first processor 730) may calculate the degree of correlation between positions of the inputs on the basis of information about reception positions of the inputs. When the calculated degree of correlation has a value equal to or greater than a predetermined value, the electronic device 101 may determine that the inputs have been received at positions related to each other.

According to various embodiments, in operation 3902, the electronic device 101 may change, based on the identified movement, the content displayed on the second display 203. For example, the electronic device 101 may determine that in a state in which user inputs simultaneously received at positions related to each other are maintained, the user inputs move (4013) in one direction (e.g., a transverse direction). As shown in reference numeral 4001 in FIG. 40, when the user input movement 4013 is identified while displaying, on the second display 203, a content (e.g., which is not a portion of a single content, but is different screens related one application or is an execution screen of different applications) unrelated to a content displayed on the first display 201, the electronic device 101 may determine that an event for changing a screen of a display (e.g., the second display 203) has occurred. As shown in reference numeral 4002 in FIG. 40, the electronic device 101 may display, based on the user input movement 4013, another content (e.g., a screen including a plurality of icons provided by the application management module) 4021 instead of the content (e.g., the execution screen) displayed on the second display 203.

According to various embodiments, without being limited to the description, the changed content displayed on the second display 203 may include a message (e.g., a text message or a message provided by an SNS application) currently received in the electronic device 101 or an execution screen designated to be displayed at the time of changing (e.g., an execution screen for controlling a music reproduction application).

Hereinafter, a description will be made of another example of an operation of the electronic device 101 according to various embodiments.

According to various embodiments, the electronic device 101 may display information about a content (e.g., an application execution screen) to be displayed in a state in which multi-touch simultaneously received at positions unrelated to each other are maintained.

Figure 41:
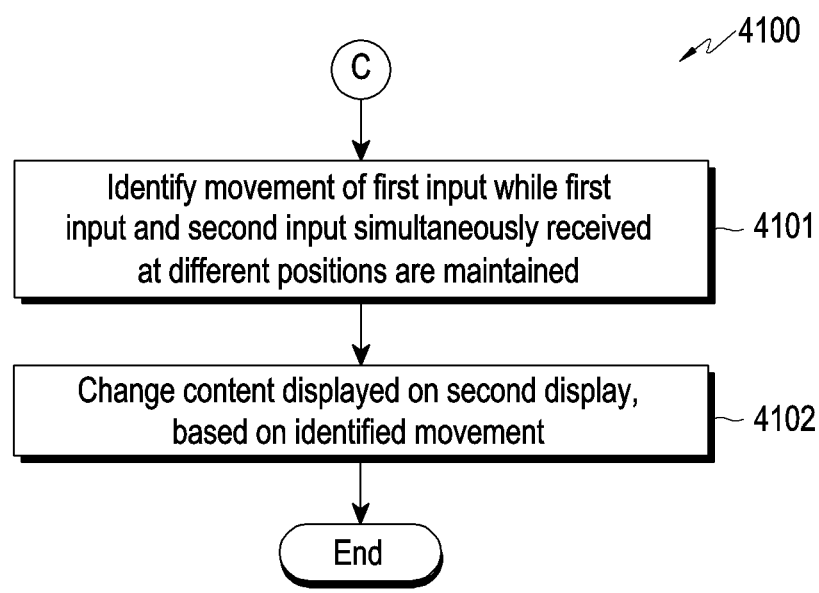
FIG. 41 is a flowchart for describing another example of an operation of an electronic device according to various embodiments.

FIG. 41 is a flowchart for describing another example of an operation of an electronic device according to various embodiments. Referring to FIG. 41, depicting flowchart 4100, according to various embodiments, operations illustrated in FIG. 41 may be performed in various orders without being limited to the illustrated order. Further, according to various embodiments, operations, which are more numerous than the operations illustrated in FIG. 41, may be performed or at least one operation, which is fewer than the operations illustrated in FIG. 41, may be performed. Hereinafter, the operations in FIG. 41 will be described with reference to FIG. 42.

Figure 42:
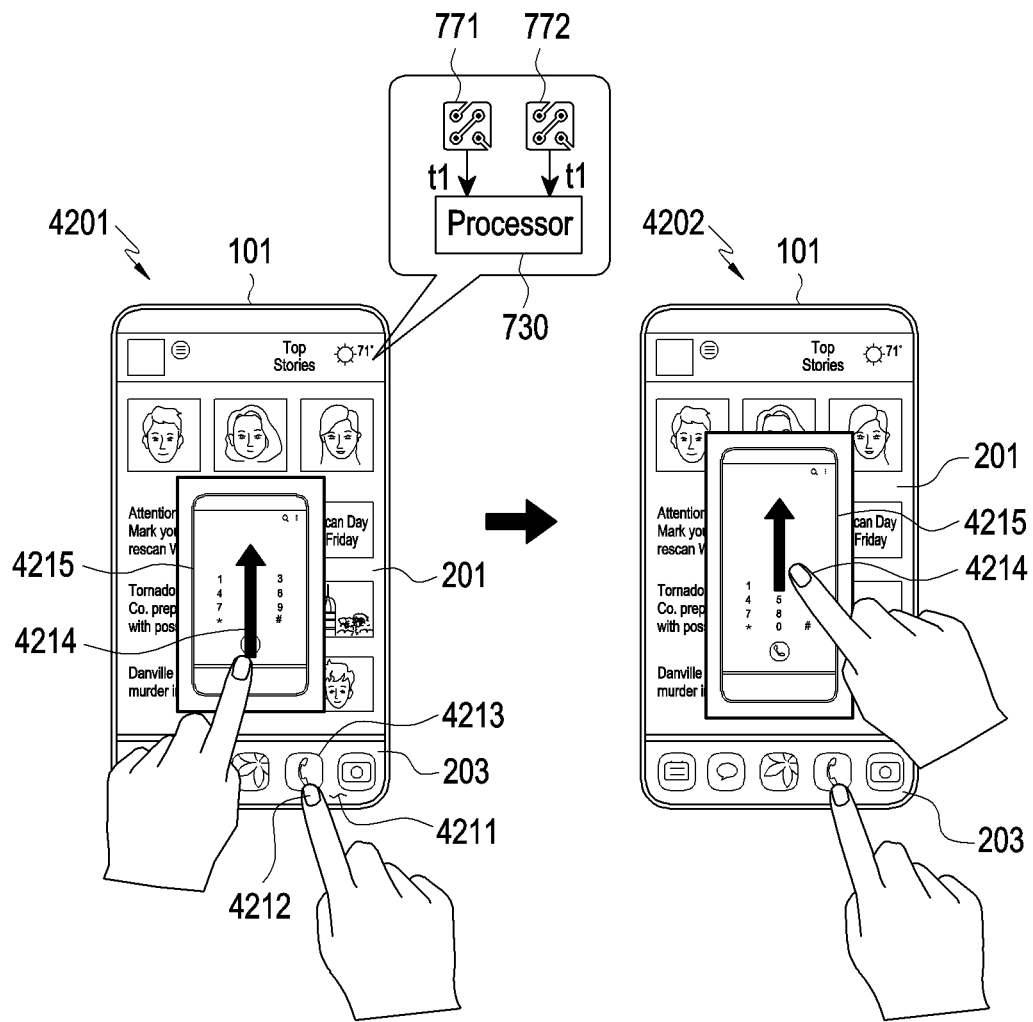
FIG. 42 is a view for describing an example in which an electronic device according to various embodiments displays information about a content to be displayed while multi-touch simultaneously received at positions unrelated to each other are maintained.

FIG. 42 is a view for describing an example in which an electronic device according to various embodiments displays information about a content to be displayed while multi-touch simultaneously received at positions unrelated to each other is maintained.

According to various embodiments, in operation 4101, an electronic device 101 may identify movement of a first input while the first input and a second input simultaneously received at different positions are maintained. For example, as shown in reference numeral 4201 in FIG. 42, the electronic device 101 may display one content (e.g., an execution screen of one application) on the first display 201, and may display, on the second display 203, a screen 4211 including a plurality of icons for executing a plurality of applications. The electronic device 101 may simultaneously receive user inputs (e.g., a first user input 4214 and a second user input 4212) on the first display 201 and the second display 203 while displaying the content on each of the two displays (e.g., the first display 201 and the second display 203). The electronic device 101 (e.g., the first processor 730) may obtain information about the reception time point and reception position of the user inputs from the input sensing circuits (e.g., the first input sensing circuit 771 and the second input sensing circuit 772) included in the displays, and may determine, based on the obtained information, that the user inputs are received at the same time (e.g., a first time point t1) at positions which are unrelated to each other (e.g., the degree of correlation therebetween has a value smaller than a threshold value). The second user input 4212 received on the second display 203 may be an input for selecting one icon from among the plurality of icons. As shown in reference numeral 4202 in FIG. 42, the electronic device 101 may display an execution screen of an application, which corresponds to an icon 4213 selected by the second user input received on the second display 203, in the form of a preview 4215 at a position on the first display 201 at which the user input is received.

According to various embodiments, in operation 4102, the electronic device 101 may display, based on the identified movement of the first input, a preview of a content to be displayed. As shown in reference numeral 4202 in FIG. 42, the electronic device 101 may identify, while the second user input 4212 for selecting the icon 4213 on the second display 203 is maintained, movement of the first user input 4214 on the first display 201. The electronic device 101 may adjust the size of an execution screen (e.g. preview 4215) of the application on the basis of a movement distance of the first user input (e.g., may adjust the size of the execution screen in proportion to a movement distance), and may identify a distance corresponding to the adjusted size as a distance that the first display 201 is to slide. When the two user inputs (e.g., the first user input and the second user input) are released, the electronic device 101 may move the first display 201 by the identified distance, and may display the execution screen of the application corresponding to the selected icon on the display.

Hereinafter, a description will be made of another example of an operation of the electronic device 101 according to various embodiments.

According to various embodiments, the electronic device 101 may perform, based on movement of a user input, a control operation related to a content displayed on the second display 203 while multi-touch simultaneously received at positions unrelated to each other is maintained.

Figure 43:
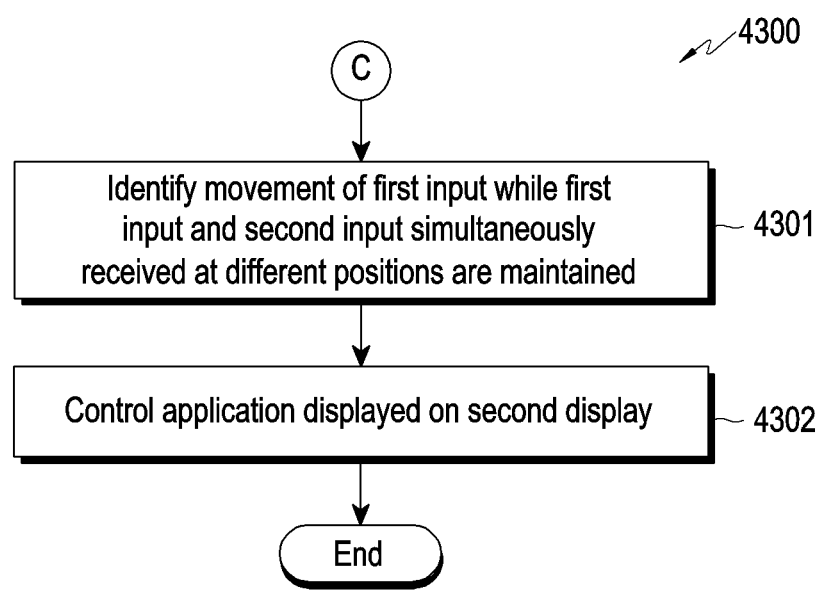
FIG. 43 is a flowchart for describing another example of an operation of an electronic device according to various embodiments.

FIG. 43 is a flowchart for describing another example of an operation of an electronic device according to various embodiments. Referring to FIG. 43, depicting flowchart 4300, according to various embodiments, operations illustrated in FIG. 43 may be performed in various orders without being limited to the illustrated order. Further, according to various embodiments, operations, which are more numerous than the operations illustrated in FIG. 43, may be performed or at least one operation, which is fewer than the operations illustrated in FIG. 43, may be performed. Hereinafter, the operations in FIG. 43 will be described with reference to FIG. 44.

Figure 44:
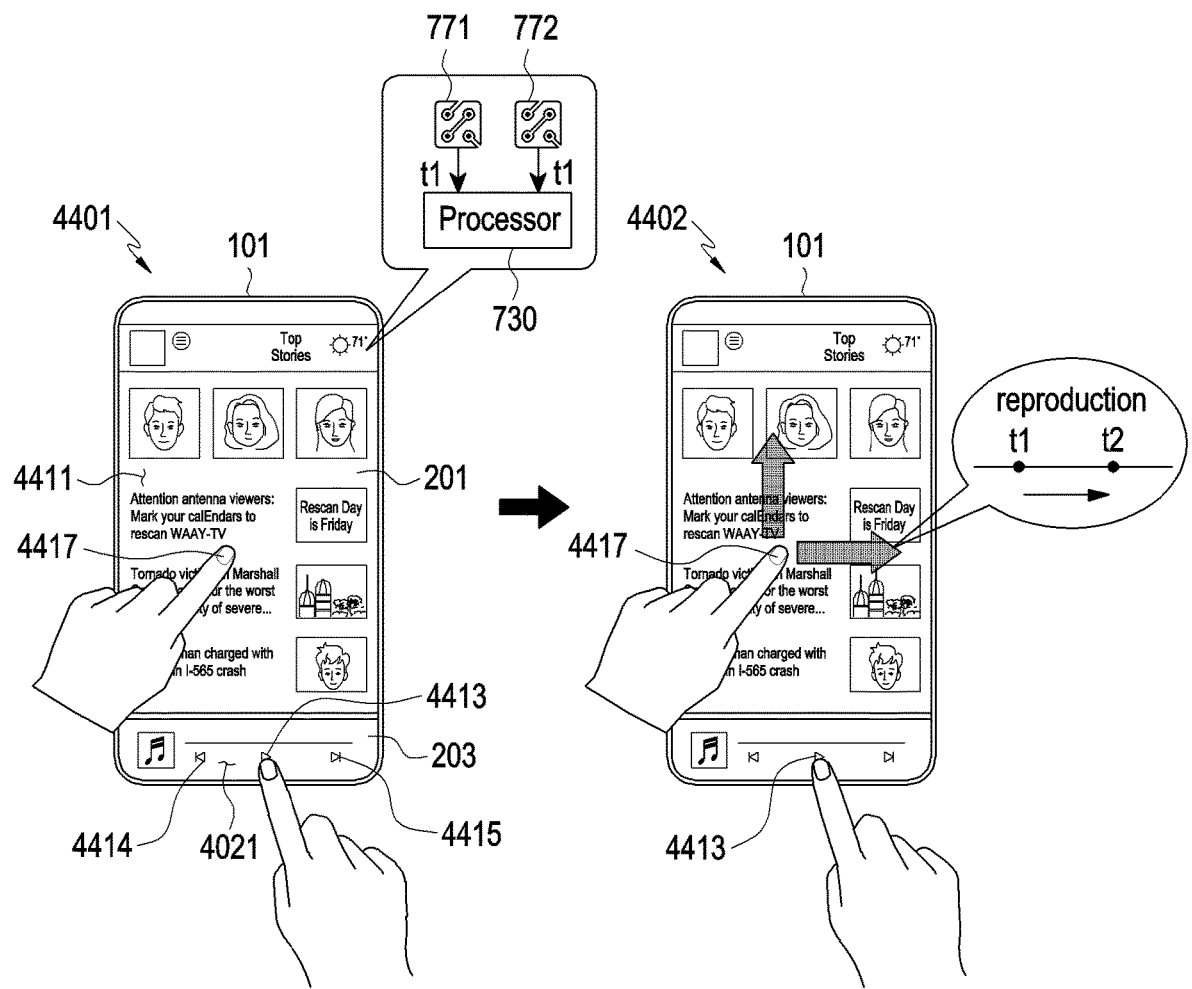
FIG. 44 is a view for describing an example in which an electronic device according to various embodiments performs, based on movement of a user input, a control operation related to a content displayed on a second display while multi-touch simultaneously received at positions unrelated to each other is maintained.

FIG. 44 is a view for describing an example in which an electronic device according to various embodiments performs, based on movement of a user input, a control operation related to a content displayed on a second display while multi-touch simultaneously received at positions unrelated to each other is maintained.

According to various embodiments, in operation 4301, an electronic device 101 may identify movement of a first input while the first input and a second input simultaneously received at different positions are maintained. For example, the electronic device 101 may display one content 4411 (e.g., an execution screen of one application) on the first display 201 and another content 4412 (e.g., an execution screen of another application) on the second display 203. The content 4412 displayed on the second display 203 may include an execution screen of a particular application (e.g., a music reproduction application), which includes objects 4413, 4414, and 4415 for controlling the particular application (e.g., reproduction time point control, volume control, etc.). As shown in reference numeral 4401 in FIG. 44, the electronic device 101 may receive a first user input 4417 on the first display 201, and may receive a second user input for selecting one object 4413 from among the objects 4413, 4414, and 4415 included in the execution screen of the particular application displayed on the rigid application.

According to various embodiments, in operation 4302, the electronic device 101 may control the application displayed on the rigid application. For example, as shown in reference numeral 4402 in FIG. 44, the electronic device 101 may perform, based on movement of the first user input 4417 on the first display 201, a particular-application (e.g., the music reproduction application) control operation (e.g., a reproduction time point control operation) related to a function (e.g., a reproduction time point control function) corresponding to the object 4413 selected by the second user input 4416 on the second display 203. The electronic device 101 may adjust the level of the control operation on the basis of the movement direction and/or movement distance of the first user input 4417. For example, the electronic device 101 may perform opposite control operations (e.g., turning-up of volume and turning-down of volume) according to movement directions (e.g., upward/downward/leftward/rightward directions). In another example, the electronic device 101 may perform the control operation at a level corresponding to the movement distance (e.g., may move a reproduction time point by a value corresponding to the movement distance).

Hereinafter, a description will be made of another example of an operation of the electronic device 101 according to various embodiments.

According to various embodiments, the electronic device 101 may provide predetermined light through a particular region 4601 of the first display 201, and the light may be diffused by the member 207, from below optical member 207, and thus be visible to a user.

Figure 45:
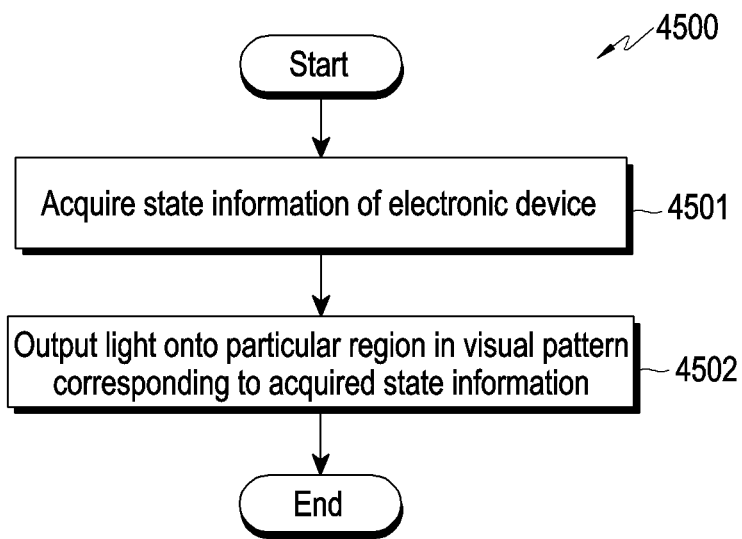
FIG. 45 is a flowchart for describing another example of an operation of an electronic device according to various embodiments.

FIG. 45 is a flowchart for describing another example of an operation of an electronic device according to various embodiments. Referring to FIG. 45, depicting flowchart 4500, according to various embodiments, operations illustrated in FIG. 45 may be performed in various orders without being limited to the illustrated order. Further, according to various embodiments, operations, which are more numerous than the operations illustrated in FIG. 45, may be performed or at least one operation, which is fewer than the operations illustrated in FIG. 45, may be performed. Hereinafter, the operations in FIG. 45 will be described with reference to FIGS. 46 and 47.

Figure 46:
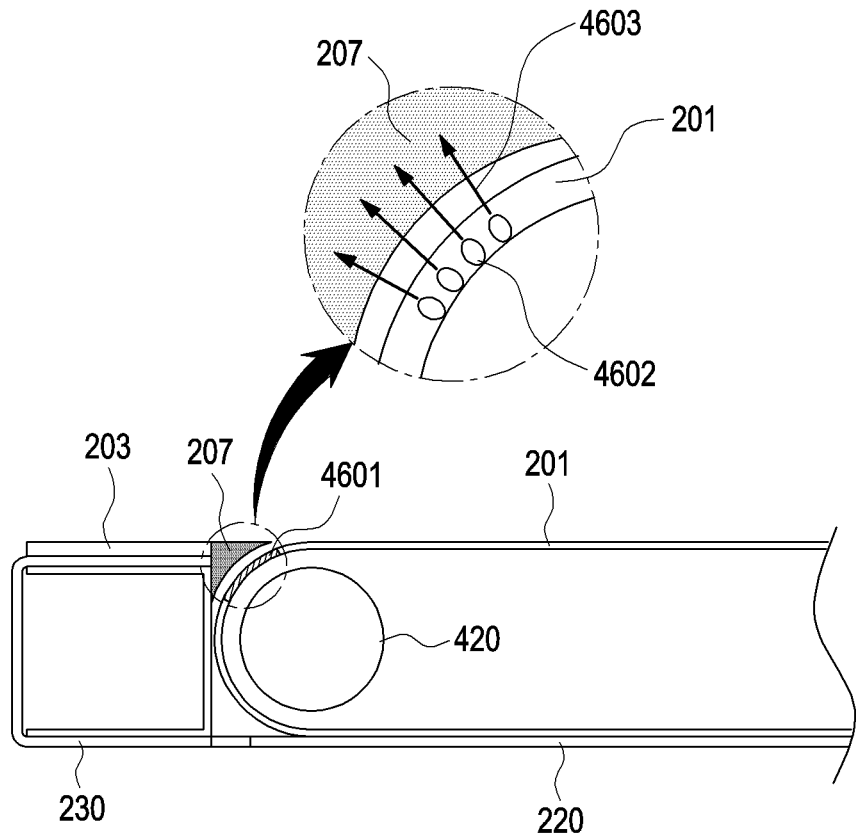
FIG. 46 is a view for describing an example in which an electronic device according to various embodiments outputs light.
Figure 47:
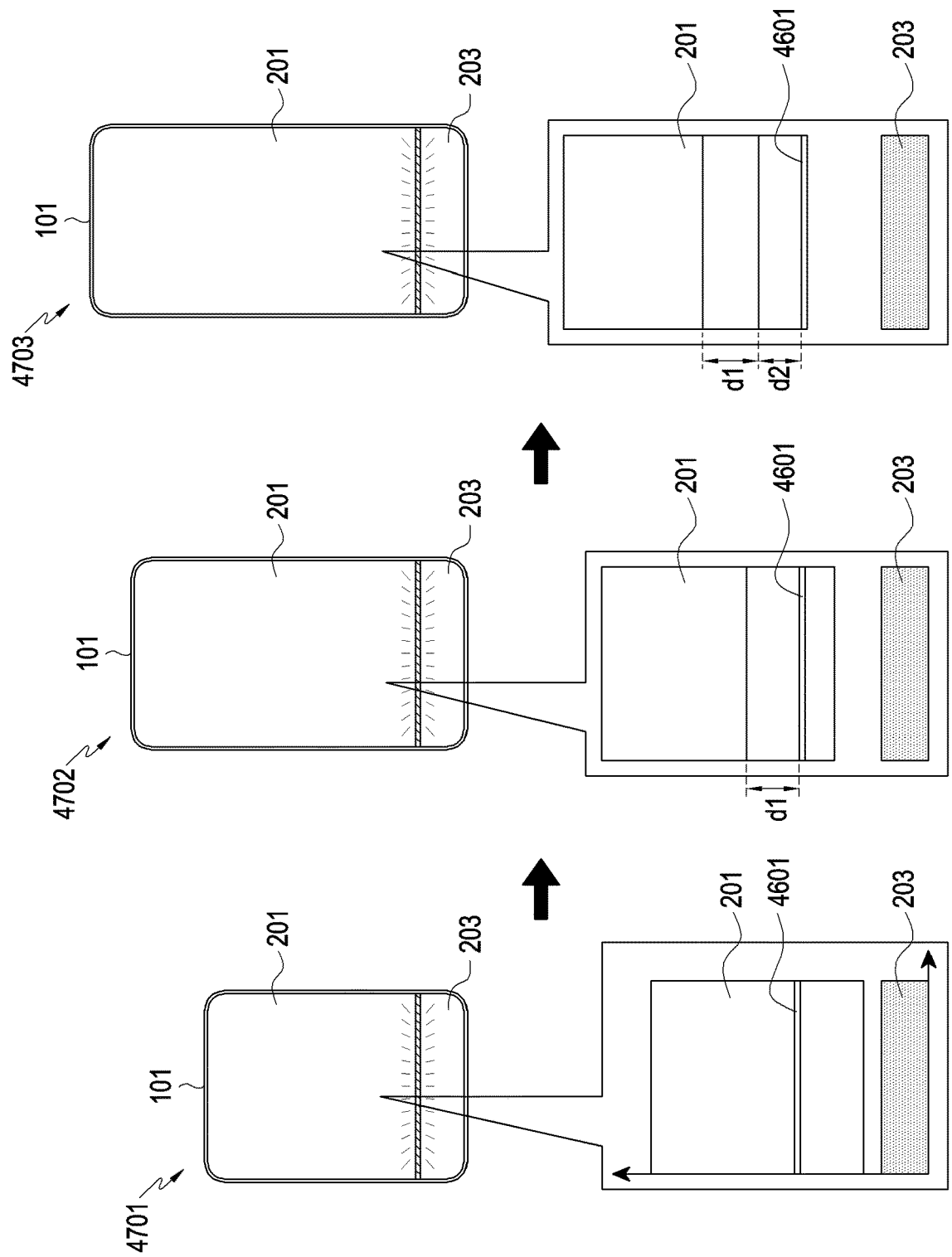
FIG. 47 is a view for describing an example in which an electronic device according to various embodiments outputs light on a basis of a change in an exposed region of a first display.

FIG. 46 is a view for describing an example in which an electronic device according to various embodiments outputs light. FIG. 47 is a view for describing an example in which an electronic device according to various embodiments outputs light on the basis of a change in an exposed region of a first display.

According to various embodiments, in operation 4501, an electronic device 101 may identify a particular region 4601 of a first display 201. For example, as illustrated in FIG. 46, the electronic device 101 may identify a region adjacent to the optical member 207 as the particular region 4601 for outputting light. Hereinafter, an example of the particular region 4601 will be described.

According to various embodiments, a particular region 4601 may be implemented on a first display 201. For example, as illustrated in FIG. 47, a particular region 4601 of a first display 201 may be a region facing one surface of an optical member 207, among the bent region of the first display 201 that corresponds to the position of the roller 420. Further, the particular region 4601 of the first display 201 may be a region connected to the exposed flat region among the bent region of the first display 201. When the optical member 207 is implemented so as to extend from the second display 203, as shown in reference numeral 602 in FIG. 6A, without being limited to the description, a partial region of the second display 203 that is connected to the optical member 207 may be the particular region 4601 for outputting light.

According to various embodiments, the particular region 4601 may be implemented in various shapes. For example, the particular region 4601 may be a region having the shape of a bar extending from the left end of the first display 201 toward the right end thereof. Further, without being limited to the description, the particular region 4601 may be implemented in a circular shape or in various polygonal shapes such as a triangle or the like. The shape of the particular region 4601 may be adjusted. For example, the transverse length and longitudinal length of the particular region 4601 may be adjusted by a user.

According to various embodiments, the electronic device 101 may identify the position of the particular region 4601 that corresponds to an exposed region of the first display 201. Hereinafter, a description will be made of examples in which the electronic device 101 identifies the position of the particular region 4601.

For example, the electronic device 101 may store information about a position of the particular region 4601 for outputting light in a particular state (e.g., a closed state or an open state), may update the stored position of the particular region 4601 according to sliding of the first display 201, and may identify the updated position thereof. In an example, as shown in reference numeral 4701 in FIG. 47, the electronic device 101 may pre-store information about a position of the particular region 4601 that corresponds to a closed state (e.g., a state in which the first display 201 is maximally drawn in). Subsequently, as shown in reference numerals 4702 and 4703 in FIG. 47, when the first display 201 slides (e.g., slides out), the electronic device 101 may identify a movement distance of the first display 201, and may update the position of the particular region 4601 by subtracting the identified movement distance from the position (e.g., a y-axis coordinate) of the particular region 4601. In another example, the electronic device 101 may store information about a position of the particular region 4601 in an open state, and may update the position of the particular region 4601 by adding a distance slid in by the first display 201 to a y-axis coordinate of the particular region 4601. The operation of identifying the movement distance of the first display 201 is identical to the above-described operation of the movement detection module, and thus a redundant description thereof will be omitted.

In another example, the electronic device 101 may pre-store information about a position (e.g., a coordinate) of the particular region 4601 for each region of the first display 201. Therefore, the electronic device 101 may identify, based on the pre-stored information, information about a position of the particular region 4601 that corresponds to the region of the first display 201 illustrated in each of reference numerals 4701, 4702, and 4703 in FIG. 47. The operation of identifying the region of the first display 201 is identical to the above-described operation of the movement detection module, and thus a redundant description thereof will be omitted.

In another example, the position of the particular region 4601 may correspond to a region (i.e., a light-receiving region) other than a light-blocking region formed in the optical member 207.

According to various embodiments, in operation 4502, the electronic device 101 may output light onto the particular region 4601. For example, as illustrated in FIG. 46, the electronic device 101 may perform control such that at least one light-emitting body 4602 (e.g., an organic light emitting diode (OLED)) disposed in the particular region of the first display 201 outputs light 4603. The electronic device 101 may output the light on the basis of various types of state information, and a description thereof will be described later with reference to FIGS. 48 to 51. As shown in reference numerals 4701, 4702, and 4703 in FIG. 47, the electronic device 101 may perform control such that at least one light-emitting body disposed in the particular region 4601, the position of which has been updated, outputs light. Therefore, even when the exposed region of the first display 201 is changed, light is visible to a user between the first display 201 and the second display 203 (e.g., in the optical member 207). Light incident to the optical member 207 may be diffused in the optical member 207. Light may be received into the optical member 207 through a region other than the light-blocking region formed in the optical member 207, and a description thereof is identical to the description that has been made with reference to FIG. 6A. Therefore, a redundant description thereof will be omitted.

Hereinafter, a description will be made of another example of an operation of the electronic device 101 according to various embodiments.

According to various embodiments, the electronic device 101 may manage visual attributes (e.g., the color of light, the output position of light, and the output pattern of light) for outputting light for information about each of various states (e.g., a battery and execution of a particular application) related to the electronic device 101, and may output light on the basis of visual attributes corresponding to currently identified state information.

Figure 48:
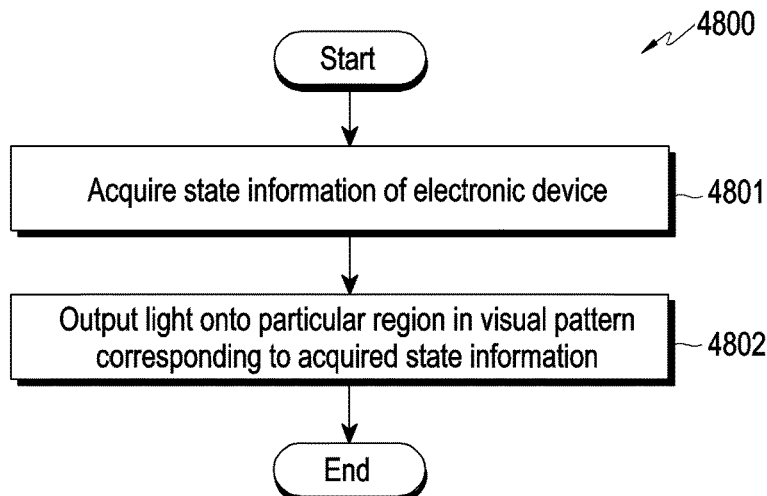
FIG. 48 is a flowchart for describing another example of an operation of an electronic device according to various embodiments.

FIG. 48 is a flowchart for describing another example of an operation of an electronic device according to various embodiments. Referring to FIG. 48, depicting flowchart 4800, according to various embodiments, operations illustrated in FIG. 48 may be performed in various orders without being limited to the illustrated order. Further, according to various embodiments, operations, which are more numerous than the operations illustrated in FIG. 48, may be performed or at least one operation, which is fewer than the operations illustrated in FIG. 48, may be performed. Hereinafter, the operations in FIG. 48 will be described with reference to FIGS. 49 to 51.

Figure 49:
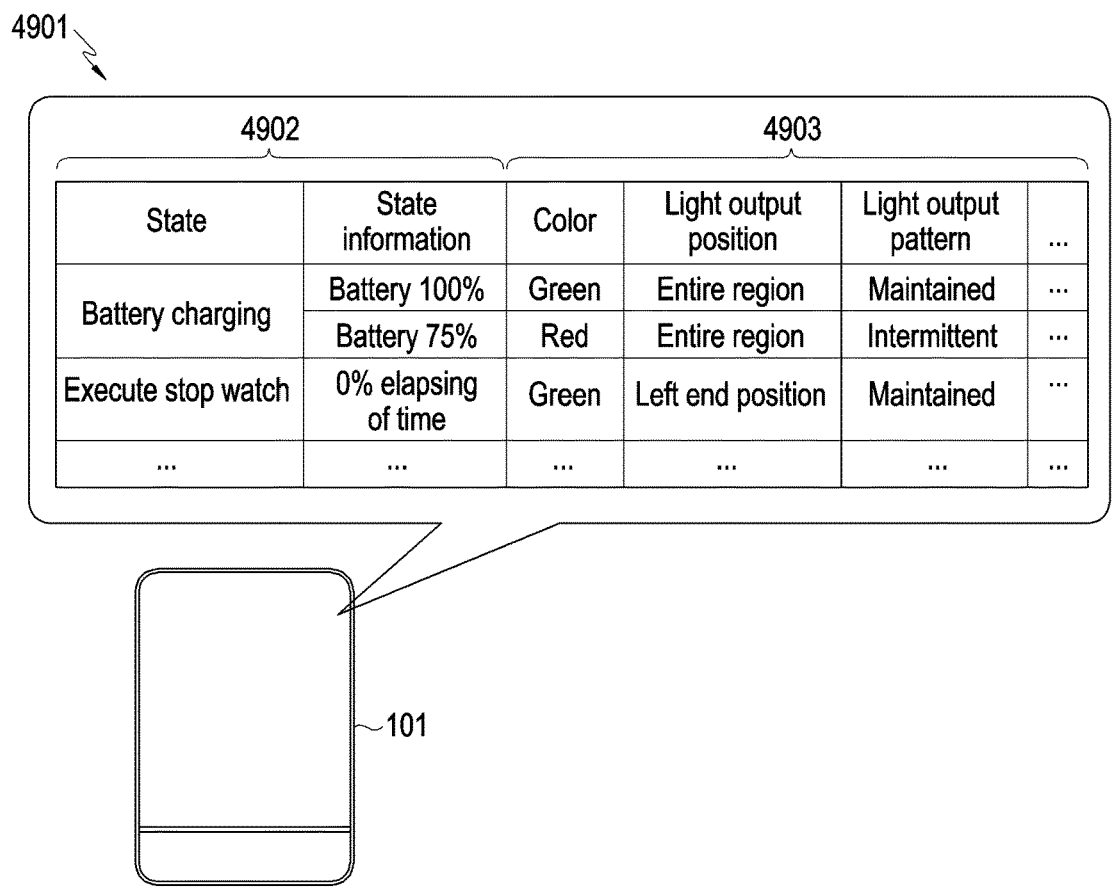
FIG. 49 is a view for describing an example in which an electronic device according to various embodiments identifies various types of state information related to the electronic device in order to output light.
Figure 50:
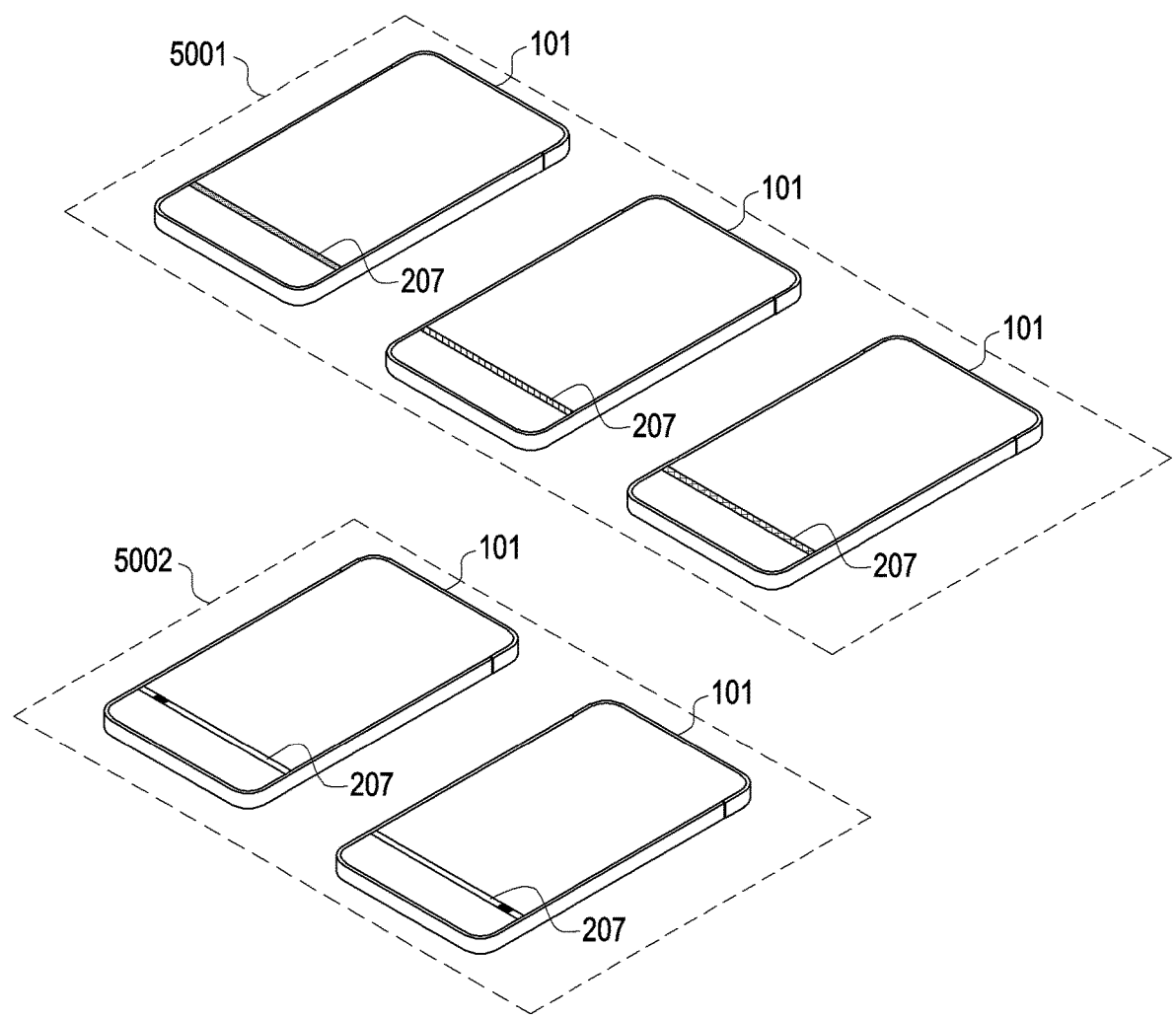
FIG. 50 is a view for describing various examples in which an electronic device according to various embodiments outputs light.
Figure 51:
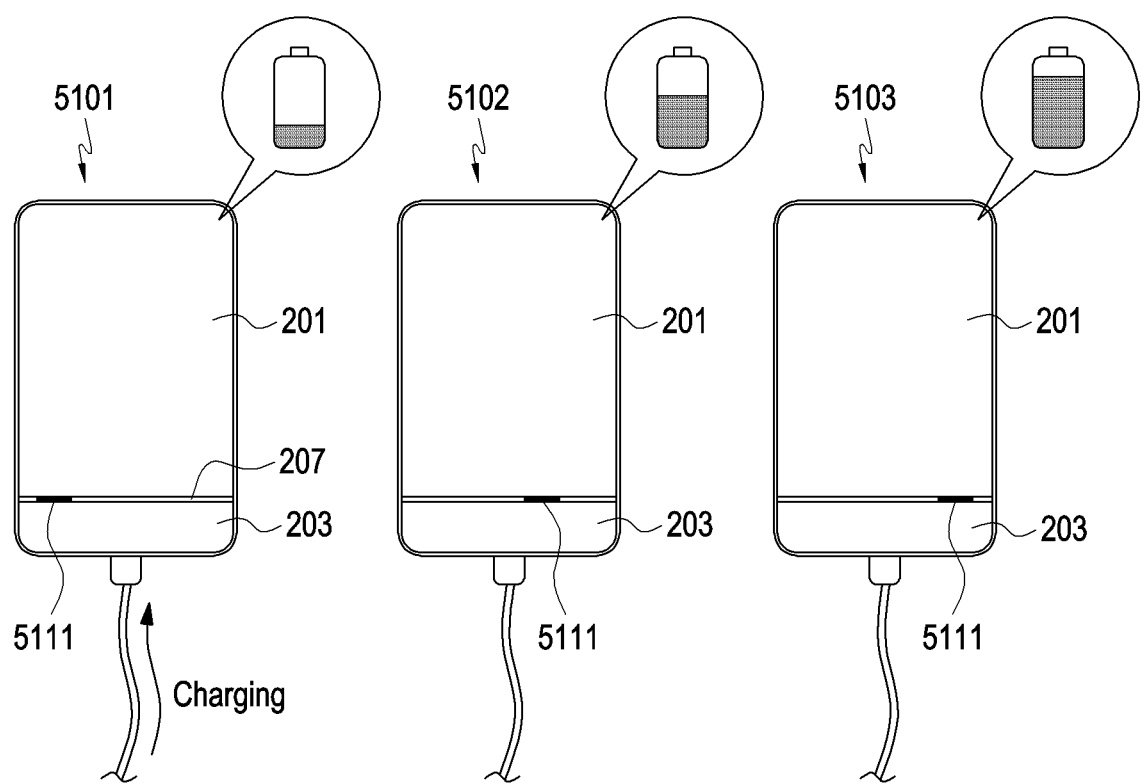
FIG. 51 is a view for describing an example in which an electronic device according to various embodiments outputs light on a basis of identified state information.
Figure 52:
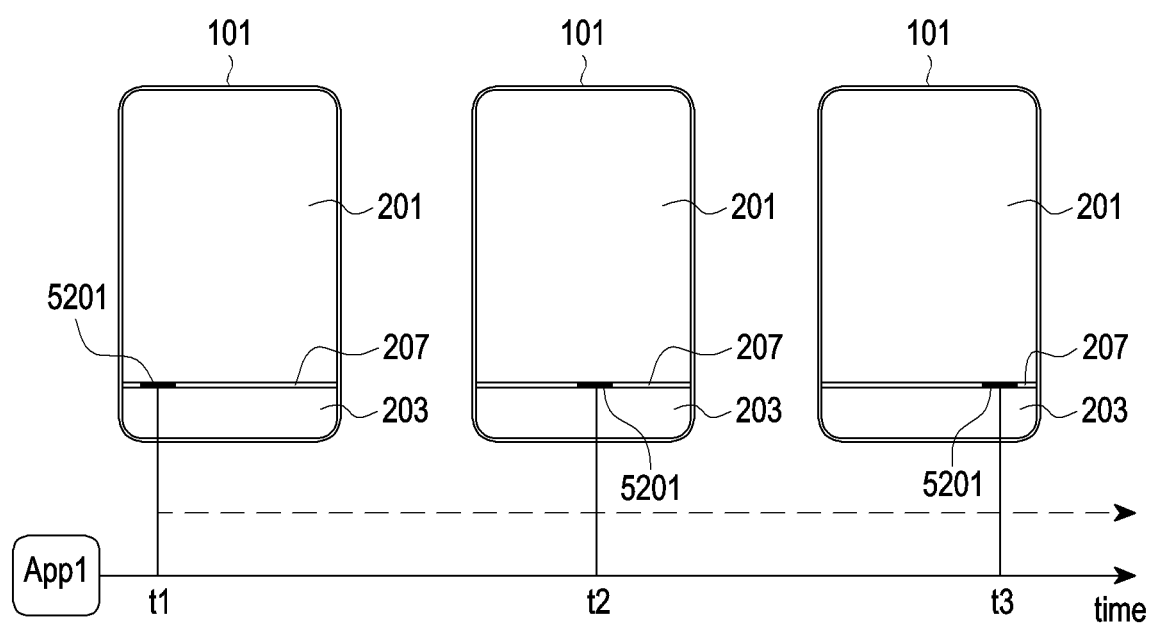
FIG. 52 is a view for describing an example in which an electronic device according to various embodiments outputs light on a basis of identified state information.

FIG. 49 is a view for describing an example in which an electronic device according to various embodiments identifies various types of state information related to an electronic device in order to output light. FIG. 50 is a view for describing various examples in which an electronic device according to various embodiments outputs light. FIG. 51 is a view for describing an example in which an electronic device according to various embodiments outputs light on the basis of identified state information. FIG. 52 is a view for describing an example in which an electronic device according to various embodiments outputs light on the basis of identified state information.

According to various embodiments, in operation 4801, the electronic device 101 may obtain state information of the electronic device 101. For example, the electronic device 101 may store information about visual attributes of light output through a particular region, wherein the visual attributes of light correspond to various types of state information of the electronic device 101. The electronic device 101 may determine the current state of the electronic device 101, and may identify, based on the stored information, visual attributes of light that correspond to information about the determined current state of the electronic device 101. The visual attributes of the light may include the color of light (reference numeral 5001 in FIG. 50), the brightness of light, the output position of light (e.g., the entire region on the particular region, a region at a particular position, etc.) (reference numeral 5002 in FIG. 50), and the output pattern of light (e.g., maintained output, intermittent output). Hereinafter, the various types of state information and the visual attribute of light will be further described.

According to various embodiments, as illustrated in FIG. 49, an electronic device 101 may store information 4901 about visual attributes 4903 of light (e.g., the color of light, the output position of light, and the output pattern of light) that correspond to state information 4902 for each of various types of states. The various types of states may be identified based on various types of information identified in the electronic device 101. For example, the various types of states may include: a current state of the electronic device 101 (e.g., a battery is being charged and screen brightness is set to a particular value); a state in which an event has occurred in the electronic device 101 (e.g., message reception); and an execution state of an application in the electronic device 101 (e.g., execution of a stopwatch application in a foreground mode). In an example, as illustrated in FIG. 49, information related to the current state of the electronic device 101 may be information indicating the current state of the electronic device 101, such as a state in which the battery is being charged and a state in which screen brightness is set to a particular value. In another example, the event which occurred in the electronic device 101 may include events than can occur in the electronic device 101, such as a message reception event and an event in which the first display 201 starts to slide. In another example, the execution state of an application in the electronic device 101 may indicate an execution state of each of various applications that are being executed in the electronic device 101. As illustrated in FIG. 49, the electronic device 101 may predetermine and store visual attributes (the color of light, the output position of light, and the output pattern of light) for each piece of state information (e.g., a battery state, a set screen brightness value, the number of reception messages, a time elapsed after a particular time is set in a stopwatch application) that can be obtained in states of the electronic device 101 (e.g., a current state, an event occurrence state, an application execution state). Without being limited to the description, the state information 4902 for each of the various types of states may include various types of information that can be calculated as particular values and can be identified in the electronic device 101.

Further, without being limited to the description, instead of the visual attributes of light that correspond to the information for each of the various types of states, the electronic device 101 may also determine visual attributes of light on the basis of the size of a value of currently received information. For example, the electronic device 101 may obtain values from the currently received information (e.g., battery information, a screen brightness value, and a set time), and may determine visual attributes of light on the basis of whether the obtained value is small or large. In an example, the electronic device 101 may output light at relatively right-side position in a particular region when the value is large, and may output light at relatively left-side position in the particular region when the value is small. In order to compare whether the obtained value is relatively small or large, the electronic device 101 may calculate a ratio of the obtained value to a predetermined value (e.g., the maximum value acquirable at the time of obtaining the value), and may also determine the visual attributes of the light on the basis of the calculated ratio.

According to various embodiments, in operation 4802, the electronic device 101 may output, to a particular region of the first display 201, light having visual attributes corresponding to the obtained state information. For example, when an output event for outputting light occurs, the electronic device 101 may output light with visual attributes corresponding to the identified state information. The output event may include an event in which the state of the electronic device 101 is changed (e.g., changed from a sleep state to a wake-up state), an event in which an input of a particular user is received (e.g., multi-touch is simultaneously received at positions related to each other), and an event in which particular information is updated (e.g., battery information is updated while a battery is charged, or a new message is received). Hereinafter, a description will be made of examples in which the electronic device 101 outputs light.

For example, as illustrated in FIG. 51, when an event for outputting light is identified, the electronic device 101 may output light having particular visual attributes, based on information about the battery charging amount identified as being in a battery charging state. In an example, as shown in reference numerals 5101, 5102, and 5103 in FIG. 51, the electronic device 101 may output light 5111 at different positions on a particular region on the basis of the battery charging amount (e.g., at a relatively right-side position on the particular region as the battery charging amount becomes larger. In another example, the electronic device 101 may output light having different colors (e.g., green for battery 100%, orange color for battery 75%, and red for battery under 30%) on the basis of the battery charging amount.

In another example, as illustrated in FIG. 52, when the event for outputting light is identified, the electronic device 101 may output light having particular visual attributes, based on information (e.g., an elapsed time) obtained by execution of a particular application (e.g., a stopwatch application). In an example, the electronic device 101 may configure a particular time (e.g., alarm time or limitation time), based on execution of a stopwatch application, and may obtain information about an elapsed time. As illustrated in FIG. 52, the electronic device 101 may output light 5201 at different positions according to the elapse of the time. In another example, the electronic device 101 may output light having a different color according to the elapsing of the time.

The above-described visual attributes of light that correspond to the state information is only one example, and thus may be variously set without being limited to the description. For example, it has been described that the output position of light is changed depending on the state information, but the color of light may also be configured to be changed. In another example, it has been described that the color of light is changed depending on the state information, but the output position of light may also be configured to be changed.

Hereinafter, a description will be made of another example of an operation of the electronic device 101 according to various embodiments.

According to various embodiments, the electronic device 101 may output light with particular visual attributes (e.g., an output position) on the basis of a distance the first display 201 is to slide. The electronic device 101 may receive a user's input (e.g., simultaneous multi-touch) for adjusting the position of the output light to adjust the position of the output light, thereby adjusting a distance that the first display 201 is to slide.

Figure 53:
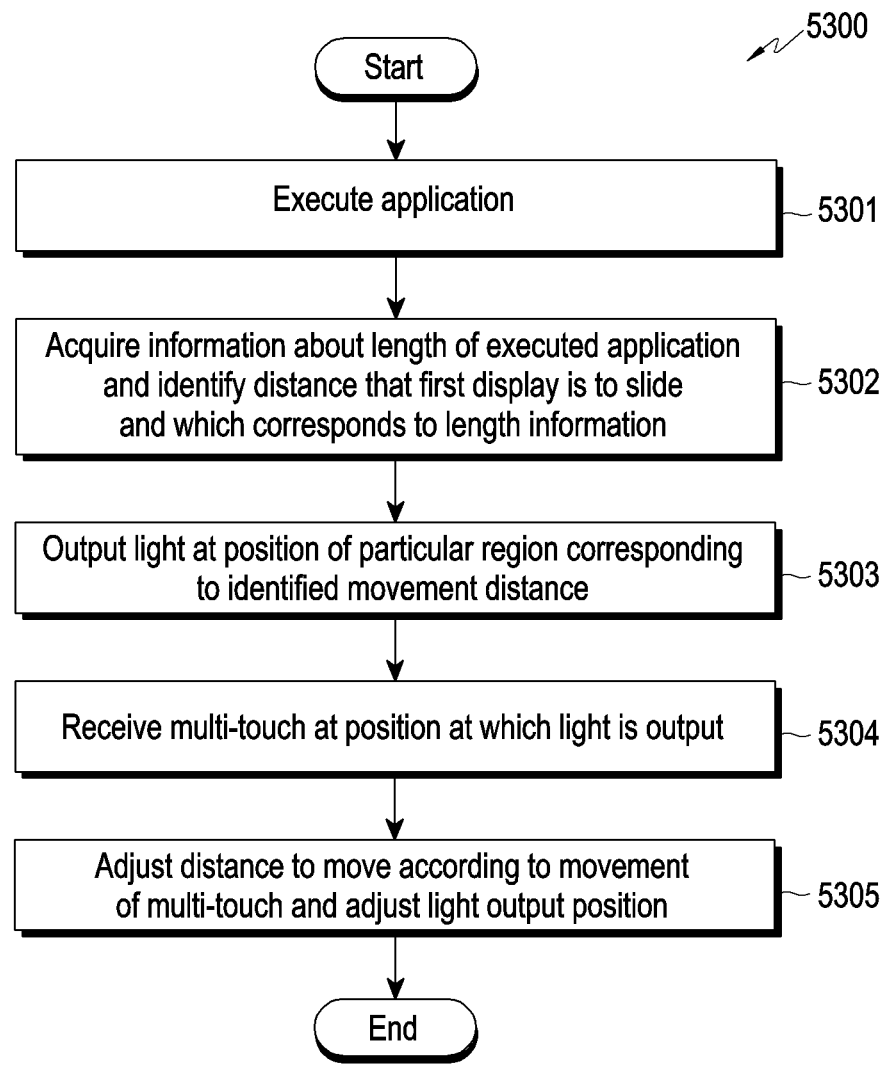
FIG. 53 is a flowchart for describing another example of an operation of an electronic device according to various embodiments.

FIG. 53 is a flowchart for describing another example of an operation of an electronic device according to various embodiments. Referring to FIG. 53 depicting flowchart 5300, according to various embodiments, operations illustrated in FIG. 53 may be performed in various orders without being limited to the illustrated order. Further, according to various embodiments, operations, which are more numerous than the operations illustrated in FIG. 53, may be performed or at least one operation, which is fewer than the operations illustrated in FIG. 53, may be performed. Hereinafter, the operations in FIG. 53 will be described with reference to FIG. 54.

Figure 54:
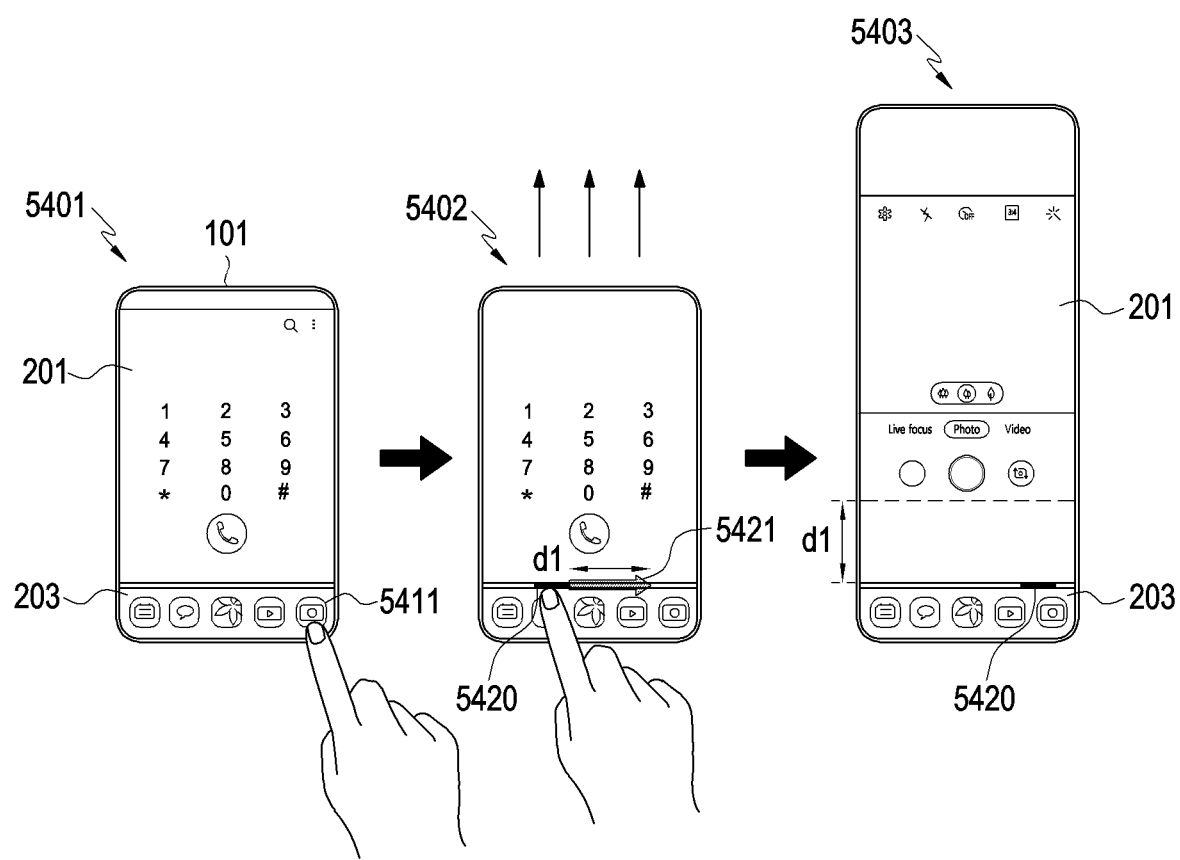
FIG. 54 is a view for describing an example of an operation of outputting light with particular visual attributes (e.g., an output position) on a basis of a distance that a first display according to various embodiments is to slide.

FIG. 54 is a view for describing an example of an operation of outputting light with particular visual attributes (e.g., an output position) on the basis of a distance that a first display according to various embodiments is to slide.

According to various embodiments, an electronic device 101 may execute an application in operation 5301, and in operation 5302, may obtain length information of the executed application and may identify a distance that corresponds to the length information and is to be slid by the first display 201. For example, the electronic device 101 may execute an application, and may obtain length information of the application from a memory or the application. In an example, as shown in reference numeral 5401 in FIG. 54, the electronic device 101 may receive a user input 5411 selecting one icon for executing one application from among a plurality of icons displayed on the second display 203. The electronic device 101 may compare the length of the application with the length of a currently exposed region of the first display 201 to identify (or calculate) a distance that the first display 201 is to slide. Operations 5301 and 5302 of the electronic device 101 may be performed like the operations of the electronic device 101 that have been described in relation to FIGS. 18 to 23, and thus a redundant description thereof will be omitted.

According to various embodiments, in operation 5303, as shown in reference numeral 5402 in FIG. 54, the electronic device 101 may output light 5420 at a position at a position in a particular region that corresponds to the identified distance to be slid. For example, the electronic device 101 may determine a position at which the light 5420 is output in proportion to the distance to be slid with reference to the end (e.g., the leftmost or rightmost side) of the particular region.

According to various embodiments, in operation 5304, the electronic device 101 may receive multi-touch at the position at which the light has been output. For example, as shown in reference numeral 5402 in FIG. 54, the electronic device 101 may simultaneously receive a user input 5421 in both a region of the first display 201 and a region of the second display 203 that are adjacent to the position at which the light 5420 is output.

According to various embodiments, in operation 5305, the electronic device 101 may adjust the distance to be moved according to movement of multi-touch. For example, as shown in reference numerals 5402 and 5403 in FIG. 54, when the received user input 5421 is moved while being maintained, the electronic device 101 may change the output position of the light 5420 to a position in a particular region that corresponds to a region to which the user input 5421 has been moved. Further, the electronic device 101 may identify a movement direction and a movement distance (d1), and may adjust a distance to be slid, based on the identified movement direction and movement distance. In an example, when the user input moves in the rightward direction, the electronic device 101 may increase a distance to be slid by the first display 201 by a distance corresponding to the movement distance (d1) of the user input. When the user input moves in the leftward direction, the electronic device 101 may reduce the distance to be slid by the first display 201 by a distance corresponding to the movement distance (d1) of the user input. Without being limited to the description, the electronic device 101 may reduce a sliding distance on the basis of the rightward movement of the user input, and may increase the sliding distance on the basis of the leftward movement of the user input. When the user input is released, the electronic device 101 may cause the first display 201 to slide the adjusted movement distance. Although not illustrated, the electronic device 101 may also display a preview of a content to be displayed (e.g., an execution screen of an application corresponding to an icon) while a user input moves.

According to various embodiments, the electronic device (e.g., electronic device 101) may include: a housing; a first display (e.g., first display 201) configured to be slidable through the housing, wherein a portion of the first display (e.g., first display 201) is exposed to an outside through the housing, and wherein a region of the first display (e.g., first display 201), exposed to the outside, is capable of being changed based on sliding of the first display (e.g., first display 201) through the housing; a second display (e.g., second display 203) spaced a certain distance apart from the exposed portion of the first display (e.g., first display 201) and disposed to form a flat surface with the exposed portion of the first display (e.g., first display 201); and an optical member (e.g., member 207) positioned on a portion of the second housing associated with the exposed at least part of the first display (e.g., first display 201); at least one processor disposed in the housing, wherein the at least one processor is configured to: output a light through a first portion of the first display (e.g., first display 201) associated with the optical member (e.g., member 207), wherein the light is diffused through the optical member (e.g., member 207).

According to various embodiments, the upper surface of the optical member (e.g., member 207) is positioned between the at least portion of the first display (e.g., first display 201) and the second display (e.g., second display 203).

According to various embodiments, the bottom surface of the optical member (e.g., member 207) is a first distance apart from the first display.

According to various embodiments, the electronic device (e.g., electronic device 101) may further include a brush member is disposed at a space corresponding to the first distance.

According to various embodiments, the bottom surface of the optical member (e.g., member 207) faces a surface of a first portion connected to the exposed at least part of the first display (e.g., first display 201), the first portion having a curvature.

According to various embodiments, the optical member (e.g., member 207) includes a material having optical properties to block light, a density of the material is different for each part of the optical member (e.g., member 207).

According to various embodiments, the material is applied on at least part of the bottom surface of the optical member (e.g., member 207).

According to various embodiments, the electronic device (e.g., electronic device 101) may further include: at least one sensor; wherein the at least one processor is configured to: based on a value identified using the at least one sensor, identify a length related to the exposed at least part of the first display (e.g., first display 201), and identify the first portion of the first display (e.g., first display 201).

According to various embodiments, the at least one processor is configured to: based on a value received through the at least one sensor when the first display (e.g., first display 201) is slide-moved, identify a distance in which the first display (e.g., first display 201) is slide-moved, based on the identified distance, identify a second portion of the first display (e.g., first display 201) different from the first portion, and output the light through the second portion of the first display (e.g., first display 201).

According to various embodiments, the first portion of the first display (e.g., first display 201) is adjacent to the second display (e.g., second display 203).

According to various embodiments, the first portion of the first display (e.g., first display 201) is a region connected the exposed at least part of the first display (e.g., first display 201), wherein the region is adjacent the second display (e.g., second display 203) and has curvature.

According to various embodiments, the electronic device (e.g., electronic device 101) may further include: at last one sensor; and servo motor configured to move the optical member (e.g., member 207); wherein the at least one processor is configured to: identify a value using the at least one sensor when the exposed at least part of the first display (e.g., first display 201) is moved to one direction, and based on the identified value, drive the servo motor, wherein the optical member (e.g., member 207) is moved to a direction vertical to the one direction.

According to various embodiments, the at least one processor is configured to: store at least one visual attribute of the light corresponding to a plurality of state information of the electronic device (e.g., electronic device 101), wherein the at least one visual attribute of the light includes at least one of color of the light, or a position on the first portion in which the light is outputted, identify a current state information of the electronic device (e.g., electronic device 101), and based on the stored at least one visual attribute of the light, output the light based on a first visual attribute corresponding to the current state information.

According to various embodiments, the at least one processor is configured to: identify a charging state of the electronic device (e.g., electronic device 101) as the current state information of the electronic device (e.g., electronic device 101), and output the light comprising a first color corresponding to the charging state of the electronic device (e.g., electronic device 101).

According to various embodiments, the at least one processor is configured to: identify a time information related to the electronic device (e.g., electronic device 101) as the current state information of the electronic device (e.g., electronic device 101), and output the light on a first position on the first portion corresponding to the identified time information.

According to various embodiments, the at least one processor is configured to: identify a distance in which the first display (e.g., first display 201) is slide-moved as the current state information of the electronic device (e.g., electronic device 101), and output the light on a first position on the first portion corresponding to the identified distance.

According to various embodiments, the electronic device (e.g., electronic device 101) may include: a housing; a first display (e.g., first display 201) configured to be slidable through the housing, wherein at least portion of the first display (e.g., first display 201) is exposed to an outside through the housing; and a second display (e.g., second display 203) having a length smaller than a length of the exposed portion of the first display (e.g., first display 201); an optical member (e.g., member 207) positioned on a portion of the second housing associated with the exposed at least part of the first display (e.g., first display 201); and at least one processor disposed in the housing, wherein the at least one processor is configured to: output a light through a first portion of the first display (e.g., first display 201) associated with the optical member (e.g., member 207), wherein the light is diffused through the optical member (e.g., member 207).

According to various embodiments, the upper surface of the optical member (e.g., member 207) is positioned between the at least portion of the first display (e.g., first display 201) and the second display (e.g., second display 203).

According to various embodiments, the bottom surface of the optical member (e.g., member 207) is a first distance apart from the first display.

According to various embodiments, the electronic device (e.g., electronic device 101) may include: a housing; a first display (e.g., first display 201) configured to be slidable through the housing, wherein at least portion of the first display (e.g., first display 201) is exposed to an outside through the housing; a second display (e.g., second display 203) spaced a certain distance apart from the exposed portion of the first display (e.g., first display 201) and disposed to form a flat surface with the exposed portion of the first display (e.g., first display 201), a length of the second display (e.g., second display 203) being smaller than a length of the first display (e.g., first display 201), a width of the second display (e.g., second display 203) corresponding to a width of the first display (e.g., first display 201); an optical member (e.g., member 207) positioned on a portion of the second housing associated with the exposed at least part of the first display (e.g., first display 201); at least one processor disposed in the housing, wherein the at least one processor is configured to: output a light through a first portion of the first display (e.g., first display 201) associated with the optical member (e.g., member 207), wherein the light is diffused through the optical member (e.g., member 207).

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   a housing;
   a first display configured to be slidable through the housing, wherein at least a portion of the first display is exposed to an outside through the housing, and wherein a region of the first display, exposed to the outside, is capable of being changed based on a sliding of the first display through the housing;
   a second display spaced a certain distance apart from the portion of the first display being exposed to the outside and disposed to form a flat surface with the portion of the first display being exposed to the outside, wherein the first display slides out from a space between the first display and the second display and slides into the space between the first display and the second display;
   an optical member disposed in the space between the first display and the second display; and
   at least one processor disposed in the housing,
   wherein the at least one processor is configured to:
      output a light through a first portion of the first display associated with the optical member, and
   wherein the light is diffused through the optical member.

2. The electronic device of claim 1, wherein an upper surface of the optical member is positioned between the portion of the first display being exposed to the outside and the second display.

3. The electronic device of claim 2, wherein a bottom surface of the optical member is spaced a first distance apart from the first display.

4. The electronic device of claim 3, further comprising:
   a brush member disposed in a space corresponding to the first distance.

5. The electronic device of claim 3,
   wherein the bottom surface of the optical member faces a surface of the first portion of the first display connected to the portion of the first display being exposed to the outside, and
   wherein the first portion comprises a curvature.

6. The electronic device of claim 1,
   wherein the optical member includes a material having optical properties to block light, and
   wherein a density of the material is different for each part of the optical member.

7. The electronic device of claim 6, wherein the material is applied on at least a part of a bottom surface of the optical member.

8. The electronic device of claim 1, further comprising:
   at least one sensor,
   wherein the at least one processor is further configured to:
      based on a value identified using the at least one sensor, identify a length of the portion of the first display being exposed to the outside, and
      identify the first portion of the first display.

9. The electronic device of claim 8, wherein the at least one processor is further configured to:
   based on a value received through the at least one sensor when the first display is slide-moved, identify a distance in which the first display is slide-moved;
   based on the identified distance, identify a second portion of the first display different from the first portion; and
   output the light through the second portion of the first display.

10. The electronic device of claim 9,
wherein the first portion of the first display includes the region of the first display connected to the portion of the first display being exposed to the outside, and
wherein the region is adjacent to the second display and has curvature.

11. The electronic device of claim 1, further comprising:
at least one sensor; and
a servo motor configured to move the optical member,
wherein the at least one processor is further configured to:
identify a value using the at least one sensor when the portion of the first display being exposed to the outside is moved in one direction, and
based on the identified value, drive the servo motor, and
wherein the optical member is moved in a direction vertical to the one direction.

12. The electronic device of claim 1, wherein the at least one processor is further configured to:
store at least one visual attribute of the light corresponding to a plurality of state information of the electronic device, wherein the at least one visual attribute of the light includes at least one of a color of the light or a position on the first portion in which the light is outputted;
identify current state information of the electronic device; and
based on the stored at least one visual attribute of the light, output the light based on a first visual attribute corresponding to the current state information.

13. The electronic device of claim 12, wherein the at least one processor is further configured to:
identify a charging state of the electronic device as the current state information of the electronic device; and
output the light comprising a first color corresponding to the charging state of the electronic device.

14. The electronic device of claim 12, wherein the at least one processor is further configured to:
identify time information related to the electronic device as the current state information of the electronic device; and
output the light on a first position on the first portion corresponding to the identified time information.

15. The electronic device of claim 12, wherein the at least one processor is further configured to:
identify a distance in which the first display is slide-moved as the current state information of the electronic device; and
output the light on a first position on the first portion corresponding to the identified distance.

16. An electronic device comprising:
a housing;
a first display configured to be slidable through the housing, wherein at least a portion of the first display is exposed to an outside through the housing;
a second display spaced a certain distance apart from the portion of the first display being exposed to the outside, and having a length smaller than a length of the portion of the first display being exposed to the outside, wherein the first display slides out from a space between the first display and the second display and slides into the space between the first display and the second display;
an optical member disposed in the space between the first display and the second display; and
at least one processor disposed in the housing,
wherein the at least one processor is configured to:
output a light through a first portion of the first display associated with the optical member, and
wherein the light is diffused through the optical member.

17. The electronic device of claim 16, wherein an upper surface of the optical member is positioned between the portion of the first display being exposed to the outside and the second display.

18. The electronic device of claim 17, wherein a bottom surface of the optical member is spaced a first distance apart from the first display.

19. An electronic device comprising:
a housing;
a first display configured to be slidable through the housing, wherein at least a portion of the first display is exposed to an outside through the housing;
a second display spaced a certain distance apart from the portion of the first display being exposed to the outside and disposed to form a flat surface with the portion of the first display being exposed to the outside, a length of the second display being smaller than a length of the first display, a width of the second display corresponding to a width of the first display, wherein the first display slides out from a space between the first display and the second display and slides into the space between the first display and the second display;
an optical member disposed in the space between the first display and the second display; and
at least one processor disposed in the housing,
wherein the at least one processor is configured to:
output a light through a first portion of the first display associated with the optical member, and
wherein the light is diffused through the optical member.

* * * * *